US011989709B2

(12) United States Patent
Wright

(10) Patent No.: US 11,989,709 B2
(45) Date of Patent: May 21, 2024

(54) AUGMENTED REALITY AND MESSAGING

(71) Applicant: Rocky Jerome Wright, Corona, CA (US)

(72) Inventor: Rocky Jerome Wright, Corona, CA (US)

(*) Notice: Subject to any disclaimer, the term of this patent is extended or adjusted under 35 U.S.C. 154(b) by 0 days.

(21) Appl. No.: 17/691,027

(22) Filed: Mar. 9, 2022

(65) Prior Publication Data

US 2023/0026498 A1 Jan. 26, 2023

Related U.S. Application Data

(63) Continuation of application No. 16/359,895, filed on Mar. 20, 2019, now abandoned.

(Continued)

(51) Int. Cl.
*G06T 13/40* (2011.01)
*G06Q 20/12* (2012.01)
(Continued)

(52) U.S. Cl.
CPC ....... *G06Q 20/123* (2013.01); *G06Q 20/3274* (2013.01); *G06Q 30/0641* (2013.01);
(Continued)

(58) Field of Classification Search
CPC .... A61F 13/00; A63F 13/216; A63F 13/5372; A63F 13/5375; A63F 2300/205; A63F 2300/306; A63F 2300/5573; G06F 3/011; G06F 16/387; G06F 16/487; G06F 16/5866; G06F 16/587; G06F 16/686; G06F 16/687; G06F 16/7867; G06F 16/787; G06F 16/909; G06F 2221/2111; G06Q 20/123;
(Continued)

(56) References Cited

U.S. PATENT DOCUMENTS 10,025,377 B1 7/2018 Bastide et al.
11,024,065 B1 * 6/2021 Baron ................... G06T 19/006
(Continued)

OTHER PUBLICATIONS

G. J. Garateguy, G. R. Arce, D. L. Lau and O. P. Villarreal, "Qr images: optimized image embedding in QR codes", IEEE transactions on image processing, vol. 23, No. 7, pp. 2842-2853 (Year: 2014).*

(Continued)

*Primary Examiner* — Diane M Wills
(74) *Attorney, Agent, or Firm* — Morgan, Lewis & Bockius LLP

(57) ABSTRACT

The various implementations described herein include methods, systems, and devices for Augmented Reality (AR) based messaging. In one aspect, a method includes processing a user request to create and place an avatar (e.g., a virtual representation of a user) at a user-specified location. In another aspect, a system manages placement of avatars at various geo locations, allows users to interact with avatars, and manages avatar-avatar interactions with or without user controls. In yet another aspect, a device is provided allowing a user to create, manage, and view avatar-based tags. Additionally, various user interfaces are provided to support the user to create, manage, and view avatars.

5 Claims, 46 Drawing Sheets

(31 of 46 Drawing Sheet(s) Filed in Color)

Related U.S. Application Data

(60) Provisional application No. 62/645,537, filed on Mar. 20, 2018.

(51) Int. Cl.
    *G06Q 20/32*         (2012.01)
    *G06Q 30/0601*    (2023.01)
    *G06T 19/00*        (2011.01)
    *H04L 51/04*        (2022.01)

(52) U.S. Cl.
    CPC ......... *G06Q 30/0643* (2013.01); *G06T 13/40* (2013.01); *G06T 19/006* (2013.01); *H04L 51/04* (2013.01)

(58) Field of Classification Search
    CPC ... G06Q 20/1235; G06T 17/05; G06T 19/006; H04L 51/04
    See application file for complete search history.

(56) References Cited

U.S. PATENT DOCUMENTS

| | | |
|---|---|---|
| 2003/0156135 A1 | 8/2003 | Lucarelli |
| 2011/0225498 A1 | 9/2011 | Goldman et al. |
| 2013/0051548 A1* | 2/2013 | Chavez ................ G06Q 10/101 379/265.09 |
| 2014/0204119 A1 | 7/2014 | Malamud et al. |
| 2015/0234477 A1 | 8/2015 | Abovitz et al. |
| 2017/0243403 A1 | 8/2017 | Daniels et al. |
| 2019/0094981 A1* | 3/2019 | Bradski ................ H04N 21/414 |
| 2019/0107990 A1* | 4/2019 | Spivack .................. G06T 11/60 |
| 2019/0188895 A1 | 6/2019 | Miller et al. |
| 2019/0272661 A1* | 9/2019 | Reeves ................ H04W 12/08 |
| 2019/0295056 A1 | 9/2019 | Wright |
| 2020/0211291 A1* | 7/2020 | Miller ....................... G06T 1/20 |
| 2020/0219323 A1* | 7/2020 | Varshney ................ H04L 51/52 |
| 2020/0380486 A1 | 12/2020 | Wright |

OTHER PUBLICATIONS

Rocky Jerome Wright, International Search Report and Written Opinion, PCT/US2019/023252, Jun. 12, 2019, 13 pgs.

Rocky Jerome Wright, International Preliminary Report on Patentability, PCT/US2019/023252, Sep. 22, 2020, 5 pgs.

Rocky Jerome Wright, Non-Final Office Action, U.S. Appl. No. 16/634,398, Feb. 5, 2021, 20 pgs.

Rocky Jerome Wright, Restriction Requirement and Preinterview First Office Action, U.S. Appl. No. 16/359,895, Jan. 6, 2021, 18 pgs.

Rocky Jerome Wright, Final Office Action, U.S. Appl. No. 16/359,895, Sep. 9, 2021, 17 pgs.

\* cited by examiner

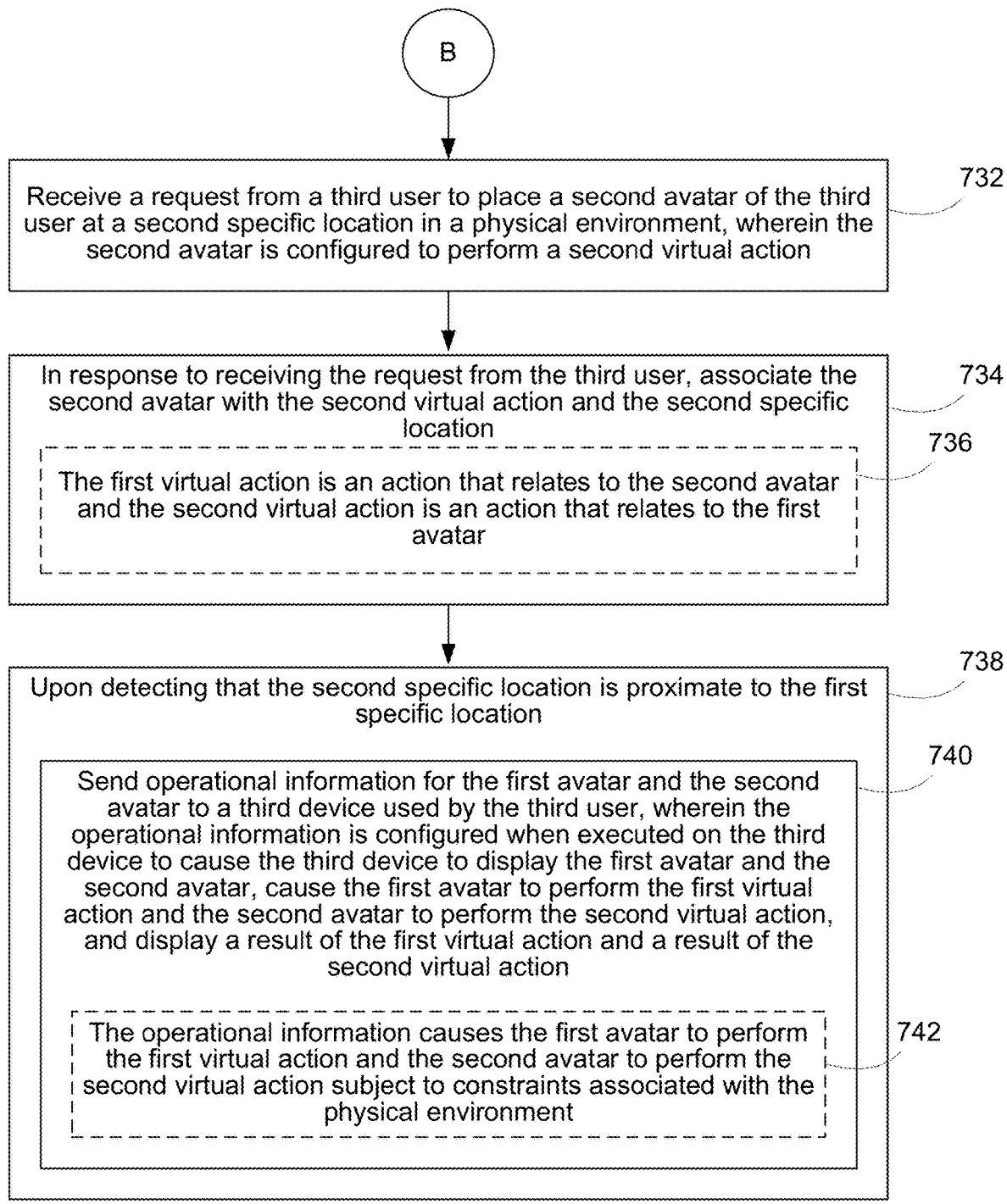

AUGMENTED REALITY AND MESSAGING

This application is a continuation of U.S. application Ser. No. 16/359,895, filed Mar. 20, 2019, entitled "Augmented Reality and Messaging" which claims priority to U.S. Provisional Application No. 62/645,537, filed Mar. 20, 2018, entitled "Ability to send Augmented Reality video content to a recipient who when viewing the content sees it also in Augmented Reality," each of which is herein fully incorporated by reference in its respective entirety.

RELATED FIELD

Technical Field

The disclosed implementations relate generally to augmented reality, and more particularly, to methods and systems for messaging using augmented reality.

Background

Augmented Reality (AR) provides a view of the real world that is enhanced by digital information and media, such as video, graphics, and GPS overlays. AR applications continue to integrate with daily life in improving productivity, and efficiency. While AR gains popularity, messaging platforms continue to add social networking features. There is a need for social messaging platforms that incorporate AR concepts. It is also desirable to provide a more realistic and interactive AR user experience through the messaging platforms.

SUMMARY

Accordingly, there is a need for an electronic device with a messaging system and/or a messaging server system that incorporates methods and systems for AR-based messaging. The device and/or the server system may be configured to allow users to generate and place personalized avatars in the real world, to interact with the avatars, to message other users using the avatars, and to have the avatars interact amongst themselves.

The system allows a user to send AR video content to a recipient who can view the content in augmented reality. Thus, augmented reality content can not only be viewed in augmented reality by its creator, but that content can be sent to a recipient who may then experience that same content in augmented reality from their own device. A recipient can interact with received AR content in their own augmented reality world rather than watch a recorded video of the content in a sender's augmented reality or environment. Rather than just creating AR content, the system allows a creator to place AR content tagged to specific locations. When a recipient is in proximity of the locations, the recipient can not only watch the AR content but also interact with that content in their own Augmenter Reality versus just watching a recorded video.

Some implementations of the system allow a user to produce a virtual sales person, a virtual companion, virtual pets, and other virtual beings. In some implementations, the system allows a creator to create a three-dimensional animated avatar of themselves. In some implementations, the system allows a user to selects a surface to place an avatar upon. In some implementations, the system allows a creator to click a "View BLAVATAR™" icon to view his avatar in his own real world (sometimes called physical world) using augmented reality. In some implementations, the system allows a creator to select a microphone button and record an audio. In some implementations, the system allows a creator to select a friend and send or share the content. In some implementations, the system allows a recipient (e.g., a friend) to receive a notification that they have content (top open/view) from a sender. In some implementations, an application opens (e.g., in response to a recipient selecting a message) and the recipient can view an avatar in a received message. In some implementations, a recipient selects a "REAL WORLD" icon. In some implementations, an application launches a recipient's camera where he/she views a room the recipient is in and a sender's avatar (situated in the room) speaks to the recipient. In some implementations, a recipient can interact with the sender's avatar in the room. In some implementations, the system includes an application that allows a recipient to receive and engage with AR content.

In some implementations, when a creator of AR content shares his/her content, the content is sent to a cloud based server. In some implementations, a notification is delivered to a recipient. In some implementations, when a receiver accepts the notification, an application is launched. In some implementations, the recipient will then see the avatar sent by the creator. In some implementations, when the recipient selects a "REAL WORLD" icon, an application launches the recipient's phone camera, and the recipient gets to see their current location (e.g., a room) through their camera. In some implementations, in that same view, the recipient will see a "View BLAVATAR™" icon. When the recipient selects the icon, the sender's avatar will show up in the camera view, and thus in the recipient's location. In some implementations, the recipient will be able to hear the message accompanying the content and even interact with the content as if the content were physically there in the same room as they are.

In some implementations, the system allows a user to create an avatar using an application that would allow creators to create video content in Augmented Reality. In some implementations, the system allows a recipient to view that content in Augmented Reality from their own mobile device. In some implementations, the system includes modifications to mobile device hardware and/or software applications. In some implementations, a user can e-mail the AR content or a link to the content to another user. In some implementations, a user can view the AR content by selecting a link in an e-mail or view the content in the e-mail.

In some implementations, the system allows a user to send Augmented Reality content to kids with autism, so the recipient kids have "someone" with them in the same room to communicate with. In some implementations, the system also can be used for medical reasons. In some implementations, the system allows a user to create a virtual sales person and let customers see and engage with the virtual sales person in their own real world In accordance with some implementations, a method is provided for placing an avatar in a real world location. The method includes receiving a request from a first user to place an avatar of the first user in a first user-specified location in a physical environment. In response to receiving the request from the first user, the method includes obtaining an avatar of the first user, and associating the avatar with a first location in the physical environment (e.g., by using a geo-tagging technique). In some implementations, the first location is a position on or around an object in the physical environment. The method also includes receiving a request from a second user to view the avatar. In response to receiving the request from the second user, the method includes determining a second location of the second user in the physical environment, and determining if the second location is proximate to the first location. In accordance with a determination that the second location is proximate to the first location, the method includes obtaining a first image of the physical environment at the first location, creating an overlay image by overlaying a second image of the avatar onto the first image (e.g., in a manner consistent with an orientation of the second user), and causing the overlay image to be displayed on an electronic device used by the second user. In some implementations, to obtain the first image of the physical environment at the first location, the method includes retrieving an image from an image database, generating a generic image of the physical environment at the first location, receiving an image from the first user, and/or receiving an image from the second user In some implementations, to obtain an avatar of the first user, the method includes capturing an image of the first user using a camera application executed on a first electronic device, and generating an avatar of the first user based on the image of the first user. In some implementations, generating the avatar of the first user includes applying an algorithm that minimizes perception of an uncanny valley in the avatar. In some implementations, the avatar is one of or more of an animated, emotional, and/or interactive three-dimensional (3D) representation of the first user. In some implementations, the method includes receiving a user input from the first user corresponding to one or more animated, emotional, and/or interactive 3D representation of the first user, and generating the avatar of the first user based on the user input. In some implementations, the method further includes uploading the avatar to a computer distinct from the first electronic device.

In some implementations, the method includes determining if a third user is in the vicinity of the first location, and, in accordance with a determination that the third user is in the vicinity of the first location, notifying the third user about the avatar at the first location.

In some implementations, the method includes associating an audio file with the first avatar, and, in response to receiving the request from the second user, and in accordance with the determination that the second location is proximate to the first location, causing the electronic device used by the second user to play the audio file in addition to displaying the overlay image. In some implementations, the method includes receiving the audio file from the first user via a microphone on an electronic device used by the first user.

In accordance with some implementations, a non-transitory computer readable storage medium stores one or more programs. The one or more programs include instructions, which, when executed by a computing system causes the computing system to perform a method that supports user interaction with one or more avatars and/or interaction amongst the one or more avatars. The method includes receiving a request from a first user to place a first avatar of the first user at a first specific location in a physical environment. The first avatar is configured to perform a first virtual action. In response to receiving the request from the first user, the method includes associating the first avatar with the first virtual action and the first specific location. In some implementations, the first virtual action comprises one of performing a gift exchange operation between the first user and the second user, displaying marketing information associated with the first user, and exchanging payments between the first user and the second user.

In accordance with some implementations, upon detecting that a second user is proximate to the first specific location, the method includes sending operational information for the first avatar to a second device, wherein the operational information is configured when executed on the second device to enable first interactions of the second user with the first avatar, including causing the first avatar to perform the first virtual action. In some implementations, the second user's first interactions with the first avatar causes the first avatar to perform the first virtual action subject to constraints associated with the physical environment. The method also includes receiving, from the second device, first session information regarding the second user's first interactions with the first avatar, and updating online status of the first user, first avatar and/or the second user to reflect the first session information. In some implementations, the method includes updating databases that store information corresponding to the first user, first avatar, and/or second user to reflect the first session information.

In some implementations, the method includes associating the first avatar with a resource, and performing the first virtual action comprises presenting the resource to the second user and enabling second interactions of the second user with the first avatar, including accepting or rejecting the resource. In some implementations, the method includes receiving, from the second device, second session information regarding the second user's second interactions with the first avatar. The method also includes, in response to receiving the second session information, determining, based on the second session information, if the second user's second interactions with the first avatar corresponds to the second user accepting the resource, and, in accordance with a determination that the second user accepted the resource, updating a resource table with the information that the resource has been accepted by the second user.

In some implementations, the method includes receiving a request from a third user to place a second avatar of the third user at a second specific location in a physical environment. The second avatar is configured to perform a second virtual action. In response to receiving the request from the third user, the method includes associating the second avatar with the second virtual action and the second specific location. In some implementations, the first virtual action is an action that relates to the second avatar and the second virtual action is an action that relates to the first avatar. Upon detecting that the second specific location is proximate to the first specific location, the method includes sending operational information for the first avatar and the second avatar to a third device used by the third user. The operational information is configured when executed on the third device to cause the third device to display the first avatar and the second avatar, cause the first avatar to perform the first virtual action and the second avatar to perform the second virtual action, and display a result of the first virtual action and a result of the second virtual action, according to some implementations. In some implementations, the operational information causes the first avatar to perform the first virtual action and the second avatar to perform the second virtual action subject to constraints associated with the physical environment. In some implementations, the method includes determining whether the first virtual action and/or the second virtual action can be executed by the third device (e.g., by probing the third device). In accordance with a determination that the third device is unable to execute the first virtual action and/or the second virtual action, the method includes executing a part or whole of the first virtual action and/or the second virtual action on a fourth device distinct from the third device.

According to some implementations, an electronic device includes one or more processors, memory, a display, and one or more programs stored in the memory. The programs are configured for execution by the one or more processors and are configured to perform a method for generating and/or interacting with tags that embed avatars on matrix barcodes, according to some implementations. The method includes receiving a request from a first user to place a custom image on a matrix barcode associated with an online resource. In response to receiving the request from the first user, the method includes obtaining the custom image from the first user, obtaining an image of the matrix barcode, creating a tag by overlaying the custom image onto the image of the matrix barcode, associating the tag with an avatar corresponding to the custom image, and creating a digital downloadable format of the tag for the first user, wherein the digital downloadable format is associated with the online resource.

In some implementations, the method includes receiving a request from a second user to scan the tag. In response to receiving the request, the method includes receiving scanner information corresponding to the tag from a first electronic device used by the second user, retrieving the avatar associated with the tag using the scanner information, and causing a second electronic device used by the second user to display the avatar, according to some implementations. In some implementations, the first action comprises one of playing an audio or a video file, displaying an animation sequence, and displaying product or company information corresponding to the online resource. In some implementations, the method includes causing the second electronic device used by the second user to scan the tag (e.g., using a barcode scanner). In some implementations, the method includes deciphering the avatar associated with the tag using a disambiguation algorithm (e.g., an algorithm that uses error codes to distinguish between barcodes).

In some implementations, the method includes obtaining the custom image from the first user by receiving a request from the first user to create a custom image, and, in response to receiving the request, retrieving a first image from an image database, receiving an input from the first user to select one or more customizations to apply to the first image, and, in response to receiving the input, applying the one or more customizations to the first image thereby producing the custom image.

Thus methods, systems, and graphical user interfaces are disclosed that allow users to create and interact using AR-based content and/or messages.

Both the foregoing general description and the following detailed description are exemplary and explanatory, and are intended to provide further explanation of the invention as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described implementations, reference should be made to the Description of Implementations below, in conjunction with the following drawings in which like reference numerals refer to corresponding parts throughout the figures.

FIGS. 7A-7C show a flow diagram illustrating a method for avatar-user interactions and avatar-avatar interactions, in accordance with some implementations.

Like reference numerals refer to corresponding parts throughout the several views of the drawings.

DESCRIPTION OF IMPLEMENTATIONS

Figure 1:
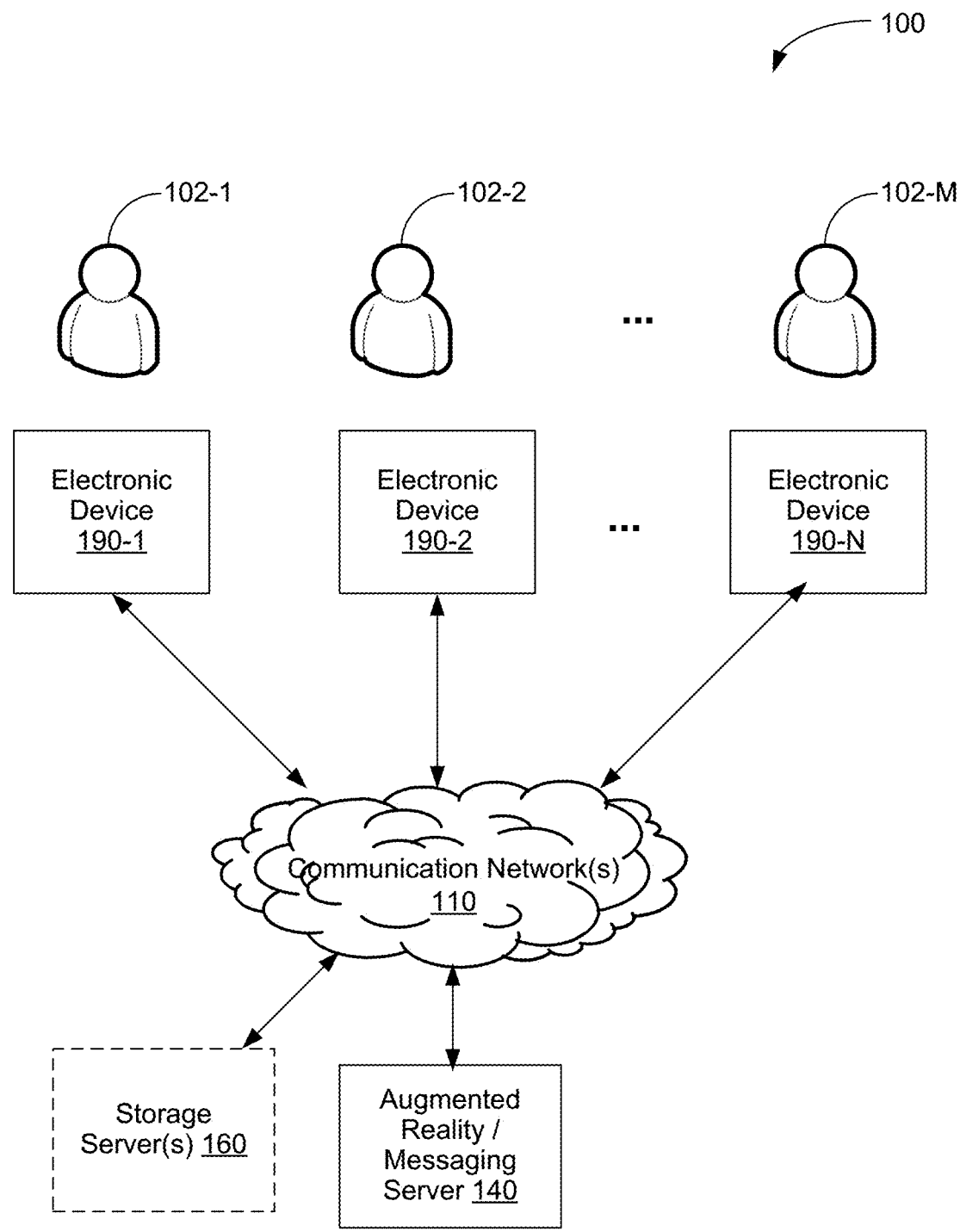
FIG. 1 is an example operating environment in accordance with some implementations.

FIG. 1 is an example operating environment 100 in accordance with some implementations. The operating environment 100 includes one or more electronic devices 190 (also called "devices", "client devices", or "computing devices"; e.g., electronic devices 190-1 through 190-N) that are communicatively connected to an augmented reality or messaging server 140 (also called "messaging server", "messaging system", "server", or "server system") of a messaging service via one or more communication networks 110. In some implementations, the electronic devices 190 are communicatively connected to one or more storage servers 160 that are configured to store and/or serve content 162 to users of the devices 190 (e.g., media content, programs, data, and/or augmented reality programs, or augmented realty content).

In some implementations, the client devices 190 are computing devices such as laptop or desktop computers, smart phones, personal digital assistants, portable media players, tablet computers, or other appropriate computing devices that can be used to communicate with a social network or a messaging service. In some implementations, the messaging system 140 is a single computing device such as a computer server. In some implementations, the server system 140 includes multiple computing devices working together to perform the actions of a messaging server system (e.g., cloud computing). In some implementations, the network(s) 110 include a public communication network (e.g., the Internet, cellular data network, dialup modems over a telephone network), or a private communications network (e.g., private LAN, leased lines) or a combination of such communication networks.

Users 102-1 through 102-M of the client devices 190-1 through 190-M access the messaging system 140 to subscribe to and participate in a messaging service (also called a "messaging network") provided by the messaging server system 140. For example, one or more of the client devices 190 execute mobile or browser applications (e.g., "apps" running on smart phones) that can be used to access the messaging network.

Users 102 interacting with the client devices 190 can participate in the messaging network provided by the server 140 by posting information, such as text comments, digital photos, videos, links to other content, or other appropriate electronic information. Users of the messaging server 140 can also annotate information posted by other users. In some implementations, information can be posted on a user's behalf by systems and/or services external to the server system 140. For example, when a user posts a review of a movie to a movie review website, with proper permissions that website can cross-post the review to a social network managed by the server 140 on the user's behalf. In another example, a software application executing on a mobile device, with proper permissions, uses global positioning system capabilities to determine the user's location and automatically update the social network with the user location.

The electronic devices 190 are also configured to communicate with each other through the communication network 110. For example, the electronic devices 190 can connect to the communication networks 110 and transmit and receive information thereby via a cellular connection, a wireless network (e.g., a WiFi, Bluetooth, or other wireless Internet connection), or a wired network (e.g., a cable, fiber optic, or DSL network). In some implementations, the electronic devices 190 are registered in a device registry of the messaging service and thus are known to the messaging server 140. In some implementations, the environment 100 also includes one or more storage server(s) 160. A storage server 160 stores information corresponding to the messaging service, according to some implementations.

In some implementations, an electronic device 190 may be associated with multiple users having respective user accounts in the user domain. Any of these users, as well as users not associated with the device, may use the electronic device 190. In such implementations, the electronic device 190 receives input from these users 102-1 through 102-M (including associated and non-associated users), and the electronic device 190 and/or the messaging server 140 proceeds to identify, for an input, the user making the input. With the user identification, a response to that input may be personalized to the identified user.

In some implementations, the environment 100 includes multiple electronic devices 190 (e.g., devices 190-1 through 190-N). The devices 190 are located throughout the environment 100 (e.g., all within a room or space in a structure, or spread throughout multiple cities or towns). When a user 102 makes an input or sends a message or other communication via a device 190, one or more of the devices 190 receives the input, message or other communication, typically via the communication networks 110.

In some implementations, one or more storage server(s) 160 are disposed in the operating environment 100 to provide, to one or more users 102, messaging, AR-related content, and/or other information. For example, in some implementations, storage servers 160 store avatars and location information for the avatars associated with the one or more users 102.

Figure 2:
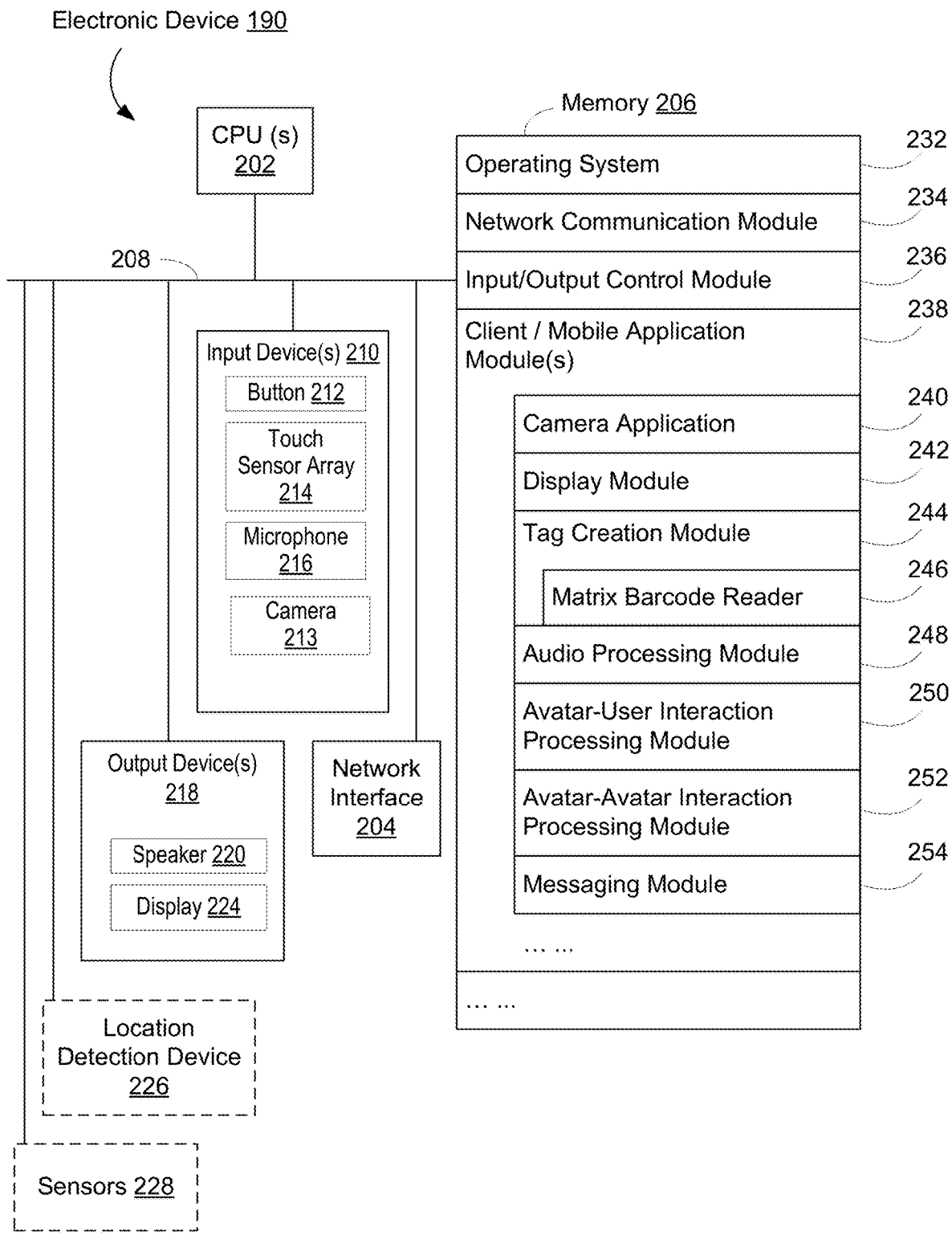
FIG. 2 is a block diagram illustrating an example electronic device in an operating environment in accordance with some implementations.

FIG. 2 is a block diagram illustrating an example electronic device 190 in an operating environment (e.g., operating environment 100) in accordance with some implementations. The electronic device 190 includes one or more processing units (CPUs) 202, one or more network interfaces 204, memory 206, and one or more communication buses 208 for interconnecting these components (sometimes called a chipset). The electronic device 190 includes one or more input devices 210 that facilitate user input, such as a button 212, a touch sense array 214, one or more microphones 216, and one or more cameras 213. The electronic device 190 also includes one or more output devices 218, including one or more speakers 220, and a display 224. In some implementations, the electronic device 190 also includes a location detection device 226 (e.g., a GPS module) and one or more sensors 228 (e.g., accelerometer, gyroscope, light sensor, etc.).

The memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

Operating system 232 including procedures for handling various basic system services and for performing hardware dependent tasks;

Network communication module 234 for connecting the electronic device 190 to other devices (e.g., the server system 140, one or more cast devices, one or more client devices, one or more smart home devices, and other electronic device(s) 190) via one or more network interfaces 204 (wired or wireless) and one or more networks 110, such as the Internet, other wide area networks, local area networks (e.g., local network 104), metropolitan area networks, and so on;

Input/output control module 236 for receiving inputs via one or more input devices and enabling presentation of information at the electronic device 190 via one or more output devices 218; and One or more client or mobile application module(s), including:

Camera application 240 to allow the user to capture photos, or video using camera 213;

Display module 242 to display content using display 224;

Optionally, a tag creation module 244 including a matrix barcode reader 246 to create tags;

Audio processing module 248 to process audio;

Optionally, an Avatar-User Interaction Processing module 250 to process interaction between one or more users and one or more avatars;

Optionally, an Avatar-Avatar Interaction Processing module 252 to process interaction between a plurality of avatars; and Messaging module 254 that processes input (e.g., messages) and invokes one or more of the above mentioned client or mobile application modules.

In some implementations, the device 190 or an application running on the electronic device 190 creates avatars independently (e.g., without communication with the server 140). In some implementations, the device 190 takes photos of environments for avatar placement (e.g., with or without user intervention, with or without server 140). In some implementations, the electronic device 190 executes one or more operations to interact with avatar(s). In some implementations, the electronic device 190 implements operations to simulate user interactions with avatars, and avatar-avatar interactions. In some implementations, the device 190 reports session information to the server 140. In some implementations, the device 190 receives and displays notifications (e.g., regarding an avatar) from the server 140. In some implementations, the device 190 creates avatar-enabled tags, and/or reads or scans avatar-enabled tags.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, the memory 206 optionally stores a subset of the modules and data structures identified above. Furthermore, the memory 206, optionally, stores additional modules and data structures not described above. In some implementations, a subset of the programs, modules, and/or data stored in the memory 206 can be stored on and/or executed by the server system 140.

Figure 3:
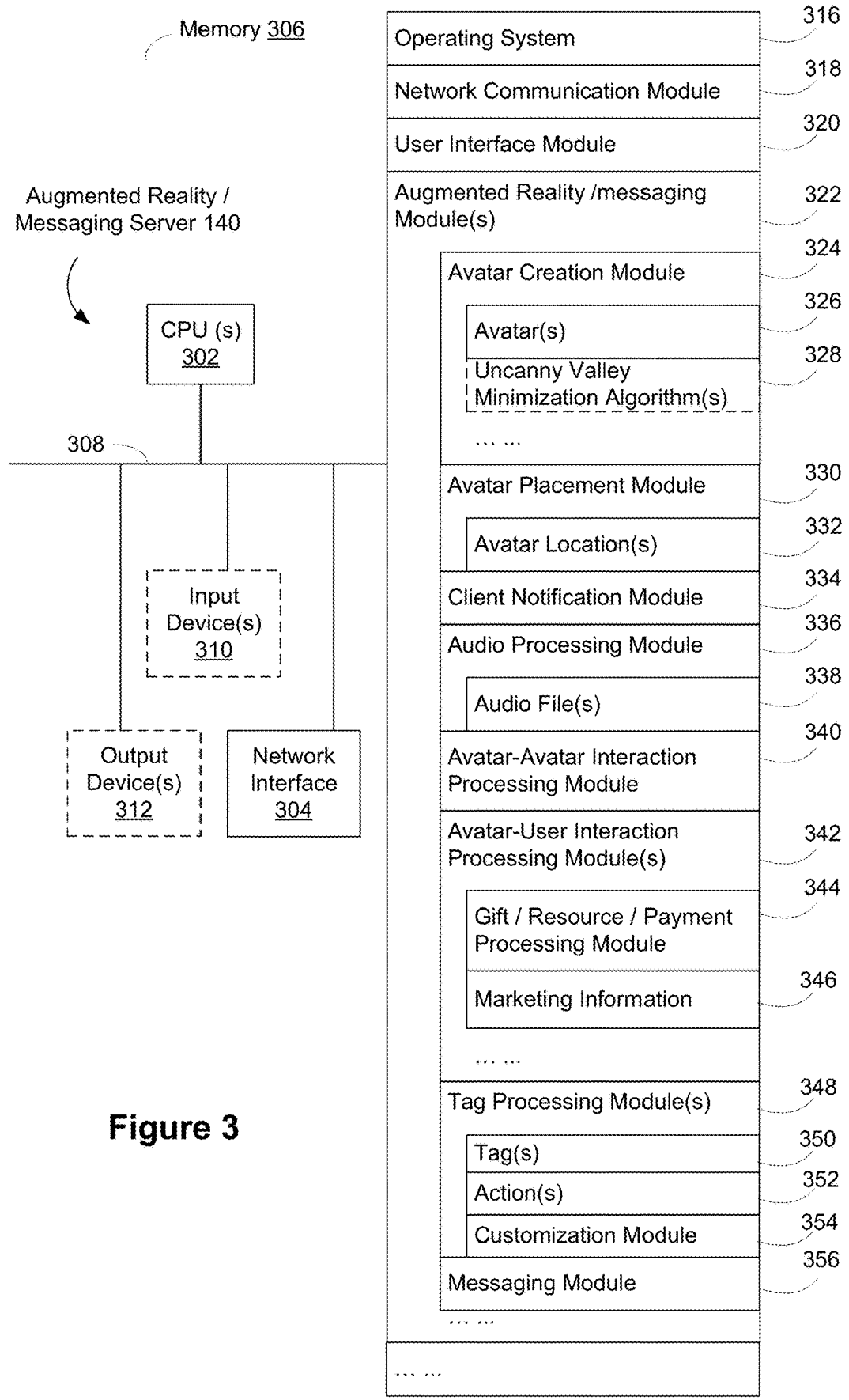
FIG. 3 is a block diagram illustrating an example server in the server system of an operating environment in accordance with some implementations.

FIG. 3 is a block diagram illustrating an example augmented reality or messaging server 140 of an operating environment (e.g., operating environment 100) in accordance with some implementations. The server 140 includes one or more processing units (CPUs) 302, one or more network interfaces 304, memory 306, and one or more communication buses 308 for interconnecting these components (sometimes called a chipset). The server 140 could include one or more input devices 310 that facilitate user input, such as a keyboard, a mouse, a voice-command input unit or microphone, a touch screen display, a touch-sensitive input pad, a gesture capturing camera, or other input buttons or controls. Furthermore, the server 140 could use a microphone and voice recognition or a camera and gesture recognition to supplement or replace the keyboard. In some implementations, the server 140 includes one or more cameras, scanners, or photo sensor units for capturing images, for example, of graphic series codes printed on the electronic devices. The server 140 could also include one or more output devices 312 that enable presentation of user interfaces and display content, including one or more speakers and/or one or more visual displays.

The memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

Operating system 316 including procedures for handling various basic system services and for performing hardware dependent tasks;

Network communication module 318 for connecting the server system 140 to other devices (e.g., various servers in the server system 140, client devices, cast devices, electronic devices 190, and smart home devices) via one or more network interfaces 304 (wired or wireless) and one or more networks 110, such as the Internet, other wide area networks, local area networks, metropolitan area networks, and so on;

User interface module 320 for enabling presentation of information (e.g., a graphical user interface for presenting application(s), widgets, websites and web pages thereof, and/or games, audio and/or video content, text, etc.) at a client device; and Augmented Reality or messaging module(s) 322, including:

Avatar creation module 324 to create one or more avatar(s) 326, and optionally one or more uncanny valley minimization algorithm(s) 328 that minimize uncanny valley associated with each avatar 326 and a respective user the respective avatar represents;

Avatar placement module 330 to place avatars at avatar location(s) 332;

Client notification module 334 to notify users (e.g., via an alert) about avatars (e.g., in proximity);

Audio processing module 336, including audio file(s) 338;

Avatar-Avatar Interaction processing module 340 to process interaction between avatars;

Avatar-User interaction processing module(s) 342 to process interaction between one or more users and one or more avatars;

Gift or resource or payment processing module 344 to process gift, resource, or payments;

Marketing information module 346 to store, supply, or generate marketing information associated with avatars;

Tag processing module(s) 348 to process tag(s) 350, action(s) 352 associated with the tags, and customization module(s) 354 to customize tags; and Messaging module 356 that processes input (e.g., messages) and invokes one or more of the above mentioned augmented reality of messaging modules.

In some implementations, the avatars have a one-to-one correspondence with a user. For example, an avatar can be addressed to a specific individual who is a participant in an electronic communication (e.g., a messaging conversation with a sender/creator of the avatar, which can be an individual or a commercial user, such as an advertiser or a business). In some implementations, the avatars are one-to-many, meaning that they can be seen by any user within a group (e.g., users at a particular location, of a particular demographic category, or members in a particular organization, to name a few possibilities). In some implementations, the server 140 maintains a geographical database of all avatars and operational information. In some implementations, the server maintains a database of all users. In some implementations, the server 140 maintains a database of all users/avatars and avatar/avatar interactions. In some implementations, the server 140 generates avatars that avoid the uncanny valley problem associated with virtual representations.

Figure 4A:
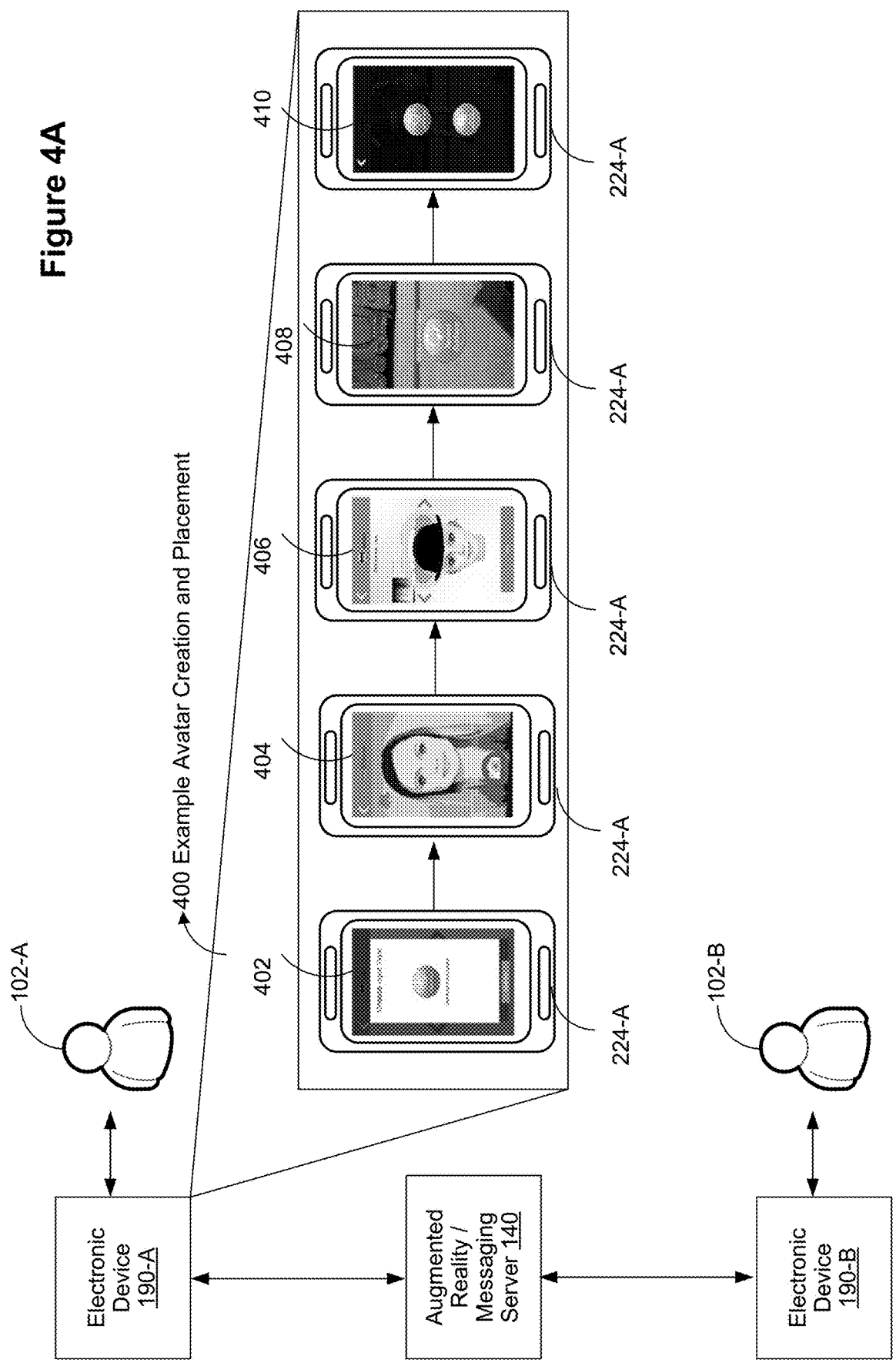
FIGS. 4A-4E illustrate examples of avatar creation and placement, avatar-user interaction, avatar-avatar interaction, avatar-based tag creation, and interaction with avatar-based tags in accordance with some implementations.

FIGS. 4A-4E illustrate examples of avatar creation and placement, avatar-user interaction, avatar-avatar interaction, avatar-based tag creation, and interaction with avatar-based tags in accordance with some implementations. FIG. 4A is an illustration of avatar creation and placement 400, according to some implementations. In the example shown, a user 102-A uses an electronic device 190-A (with display 224-A, and a camera 213 (not shown)) to create an avatar representation of herself (steps 402, 404, and 406), and places the avatar in a selected location (steps 408 and 410), according to some implementations (e.g., in this example, a carpet in front of a piece of furniture). FIG. 4A also illustrates that user 102-B could interact with the avatar created in step 406, via the messaging server 140, in accordance with some implementations.

In some implementations, a user creating an avatar can interact with the avatar via a displayed set of affordances. For example, a user can interact via touch, or the user can employ a voice interface provided by the electronic device 190 to verbally designate a selected avatar interaction to be performed. In some implementations, the displayed affordances include: a "View BLAVATAR™" icon, an "Edit BLAVATAR™" icon, a microphone icon, which a user can select to record, or playback, audio for use by the avatar (e.g., to enter a message that can be spoken by the avatar when displayed by a message recipient), a pin icon (e.g., to designate an avatar location in an environment), and a rotate icon (e.g., to cause the avatar to be shown from a user-specified angle when displayed on a device 190). In some implementations, a user viewing an avatar can lock down or select an appearance of the avatar as the avatar's default appearance, select a particular appearance or an alternative appearance for the avatar, or edit another avatar (e.g., an avatar created by a different user or an avatar created for a different user). It is noted that the term avatar is used here to refer to virtual representations that embody augmented reality characteristics (e.g., dynamic avatars with AR characteristics), not just conventional avatars without the augmented reality capabilities.

Figure 4B:
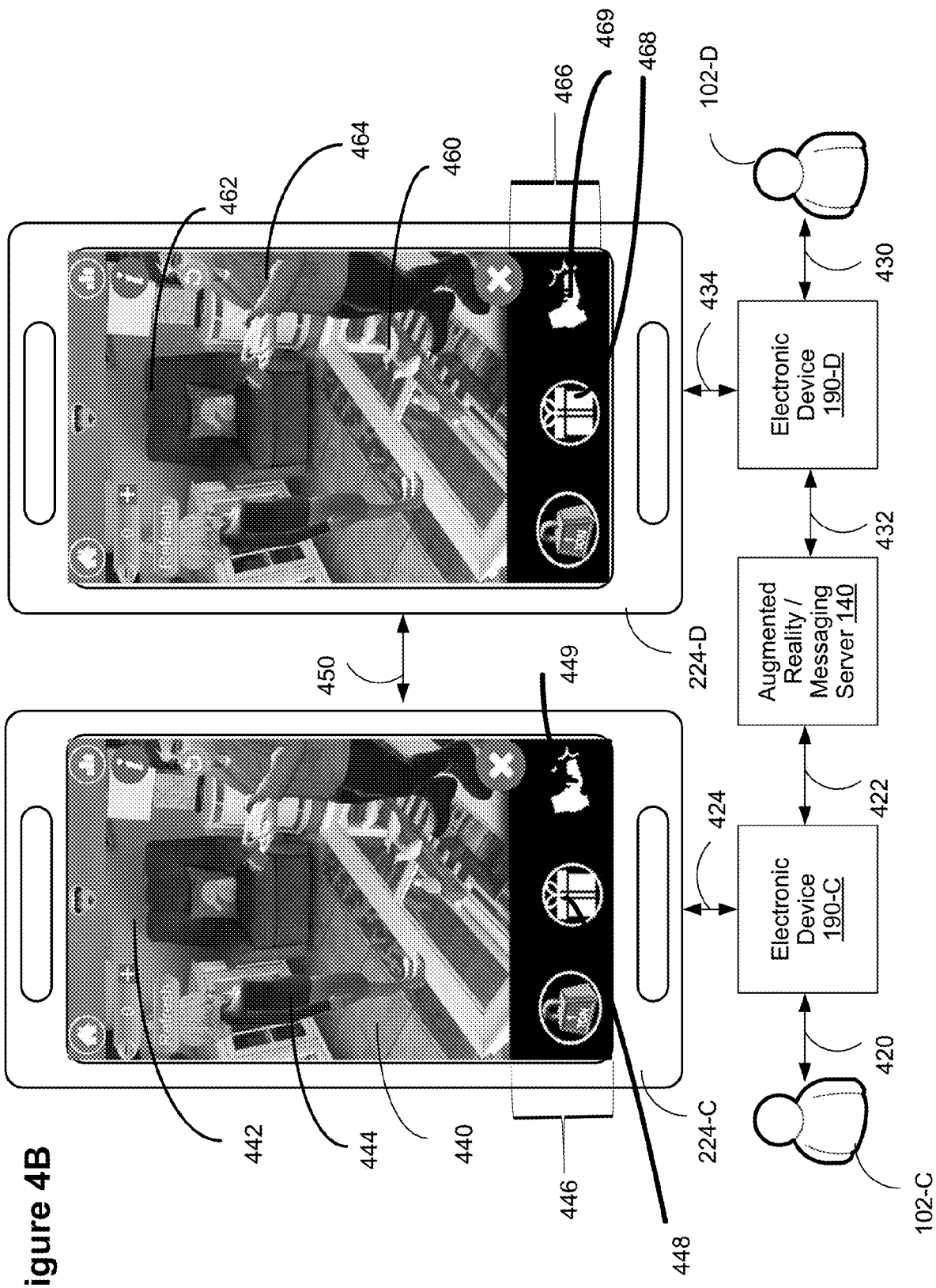
Figure 4C:
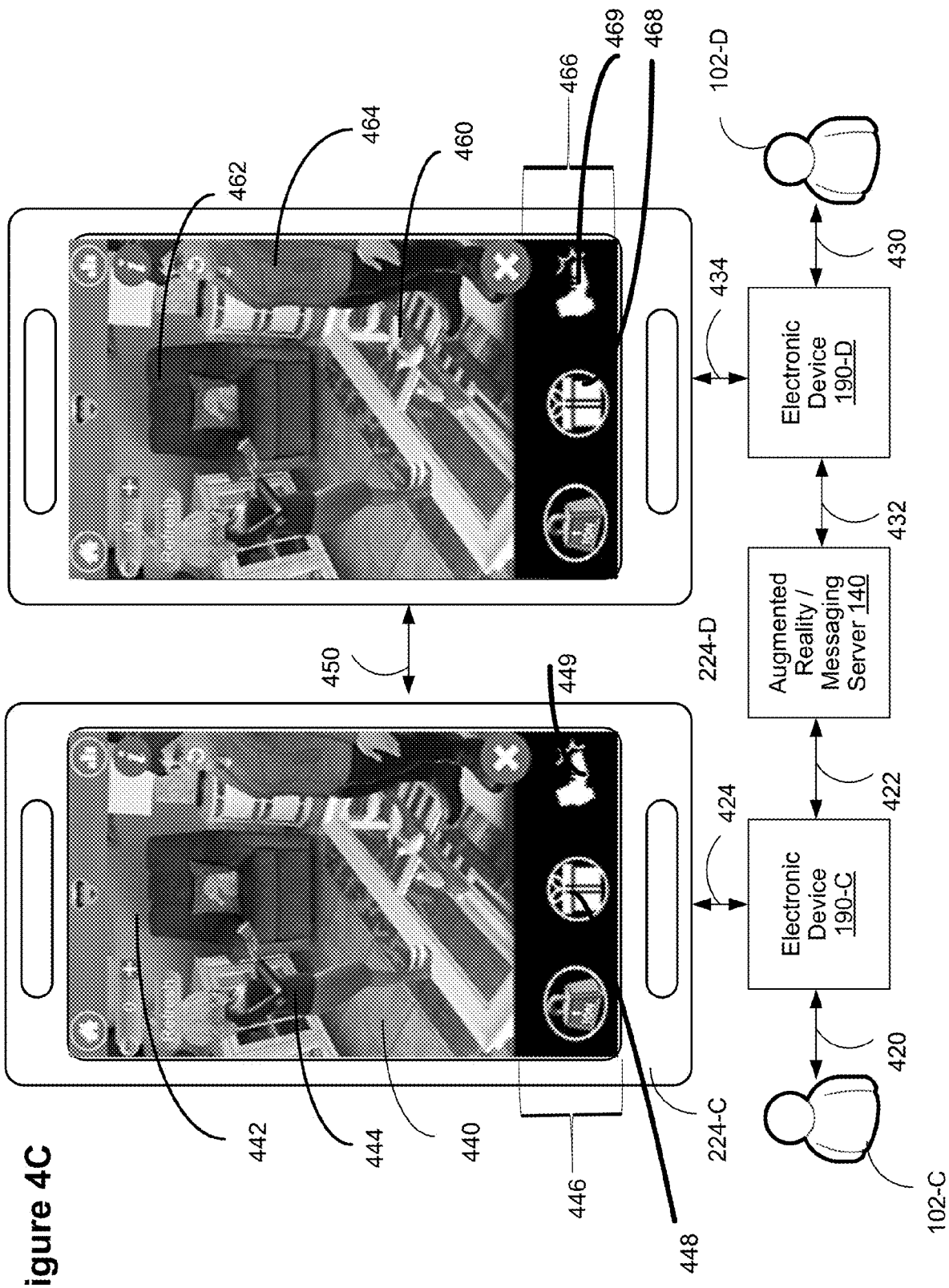
Figure 4D:
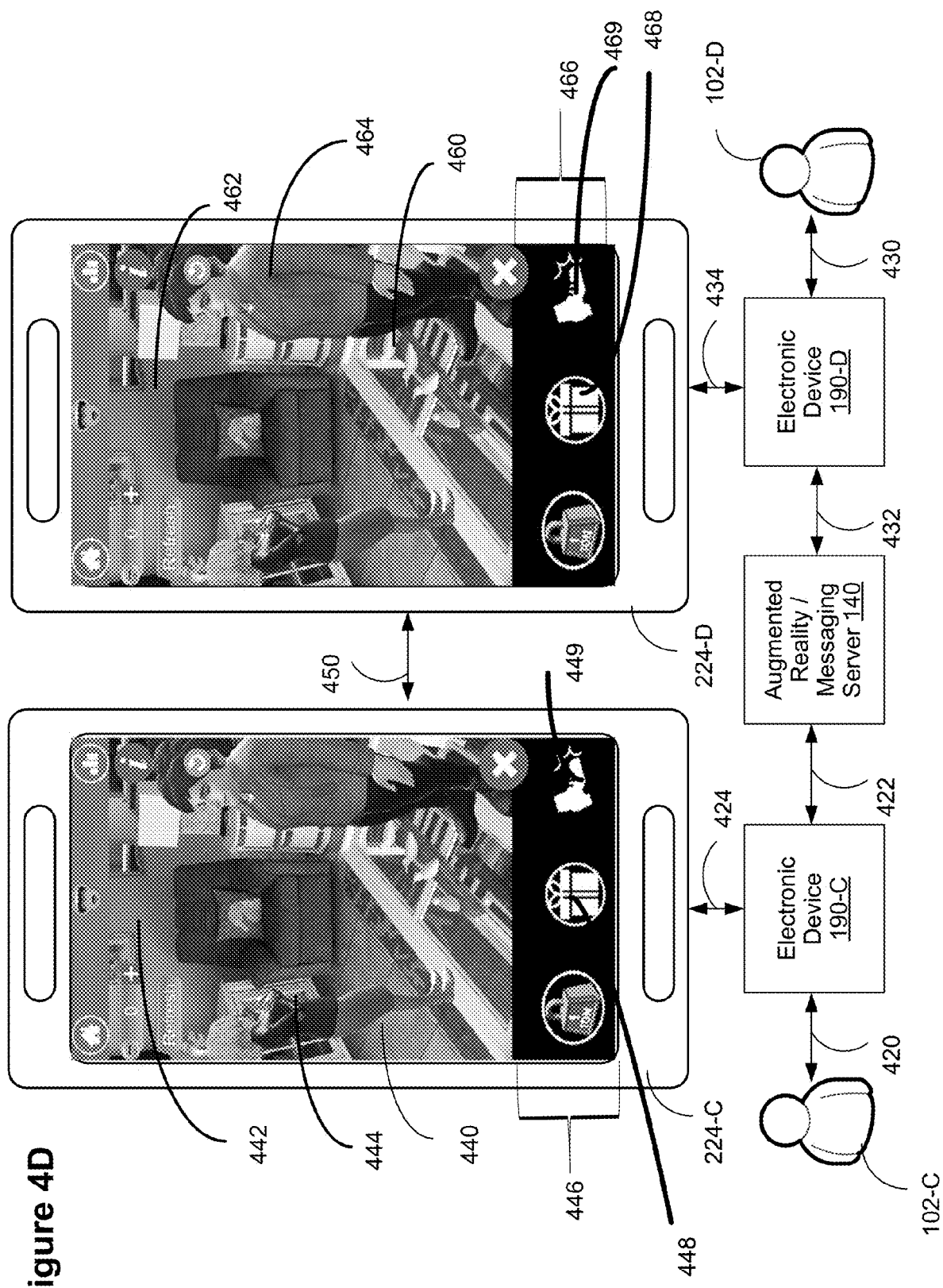

FIGS. 4B-4D illustrate avatar-user and avatar-avatar interactions according to some implementations. In the example shown, a user 102-C uses (420) an electronic device 190-C that controls (424) display 224-C to display a user interface 440, and user 102-D uses (430) an electronic device 190-D that controls (434) display 224-D to display a user interface 460. In this example, the interfaces 440 and 460 each show two avatars 444 and 464. As described above in reference to FIG. 4A, avatars 444 and 464 are created by the respective users (user 102-C and user 102-D in the current example) and placed in respective locations 442 and 462 (e.g., the location specified by the users 102-C and 102-D in step 408 as described above in reference to FIG. 4A). Electronic devices 190-C and 190-D are connected to the messaging server 140. The server 140 determines that locations 442 and 462 match or are nearby locations (e.g., within a proximity) and invokes actions corresponding to the respective avatars 444 and 464. The respective users 102-C and 102-D can view the resulting actions and/or changes to the respective avatars on their respective displays. Although the illustration shows the user interfaces 440 and 460 displaying similar perspectives or views (e.g., a location as viewed from a similar perspective or angle), in some implementations, the user interfaces 440 and 460 show different views depending on how the individual users approached the particular scene or location.

In the example shown, the user interface 440 displays a collection of available avatar interactions, which can be selected via user 102-C interaction with affordances 446 displayed on the user interface 440. Similarly, the user interface 460 displays a collection of available avatar interactions, which can be selected via user 102-D interaction with affordances 466 displayed on the user interface 440. Although the illustrated example shows similar choices in affordances 446 and 466, some implementations display different affordances or available avatar interactions for the different users. In some implementations, the displayed affordances are chosen automatically by the server 140 depending on consideration of one or more factors, such as locations of users, locations of avatars, past actions of respective avatars and/or users, and a preferred set of actions or outcomes as selected by respective users. In some implementations, the server 140 can automatically (e.g., without user input) select one or more actions from a set of actions stored for each avatar based on location, or user information. A user can interact with the avatars via touch inputs on a display screen or other touch input device, or can employ a voice interface provided by the electronic device 190 to verbally designate a selected avatar interaction to be performed. In some implementations, the displayed affordances are similar to those presented on the user interface 440 or 460, but also include: a music note icon that can be used by the user 102-D to add or listen to a digital music snippet to accompany the avatar when displayed (e.g., to accompany an avatar that has been programmed to dance when displayed).

FIGS. 4B-4D illustrate a gift exchange as a way of explaining avatar-avatar interaction, according to some implementations. In FIG. 4B, a user 102-D (or the avatar 464 as controlled by the server 140) chooses to gift a user 102-C (or the avatar 444 as controlled by the server 140) via the gift affordance 468 in the affordances 466. In FIG. 4C, the avatar 444 receives the gift (e.g., by selecting affordance 448 in the affordances 446) sent by the user 102-D (or the avatar 464 as controlled by the server 140). The avatar 444 (via the user 102-C) also has the option of rejecting the gift sent by the user 102-D (or the avatar 464 as controlled by server 140). This can be done via the affordance 449. In FIG. 4D, the avatar 444 interacts with the received gift (e.g., opens the gift, smells the gift). The respective user interfaces 440 and 460 are updated to show the gift exchange interaction. The affordances 446 and 466 provide the respective users with options to steer or control the interactions (e.g., even as the server 140 makes some automatic decisions to progress the interactions). In some implementations, an affordance (e.g., affordance 449 or 469 resembling a shoe) is provided to allow a user to reject an action or an overture (e.g., reject a gift, or reject an offer to go out on a date) by an avatar of another user.

In some implementations, avatar-user interactions and avatar-avatar interactions include the ability of a first avatar created by a first user to interact with a second user or a second avatar created by the second users. These interactions include performing actions, such as exchanging gifts, offering a kiss, or slapping one avatar by another. In some implementations, the interactions include decision interactions where one avatar asks another avatar out to perform an action (e.g., to go out on a date to a picnic, movie, go out to eat). In some implementations, users can view one or more results of the actions in the real word. For example, a gift accepted by a user's avatar results in delivering a real gift (e.g., a toy or a TV) delivered or scheduled to be delivered to the user. Further, the server 140 can add additional actions or interactions between users, users and avatars, or between avatars in a dynamic fashion (e.g., based on environment, time of day, or preferences of users at the time of creation of avatars). Some implementations also include merchandising attributes (e.g., with gifts) and associate commerce engines to process and generate revenue (e.g., for gift exchange) based on interactions. Some implementations process and generate actual revenue from users purchasing specific merchandise via the interactions. Outcomes of interactions are logged by the server 140, which can initiate charges or new promotional messages based on the outcomes and which can also incorporate the outcomes as factors in future avatar-avatar and/or avatar-user interactions options and recommendations.

Figure 4E:
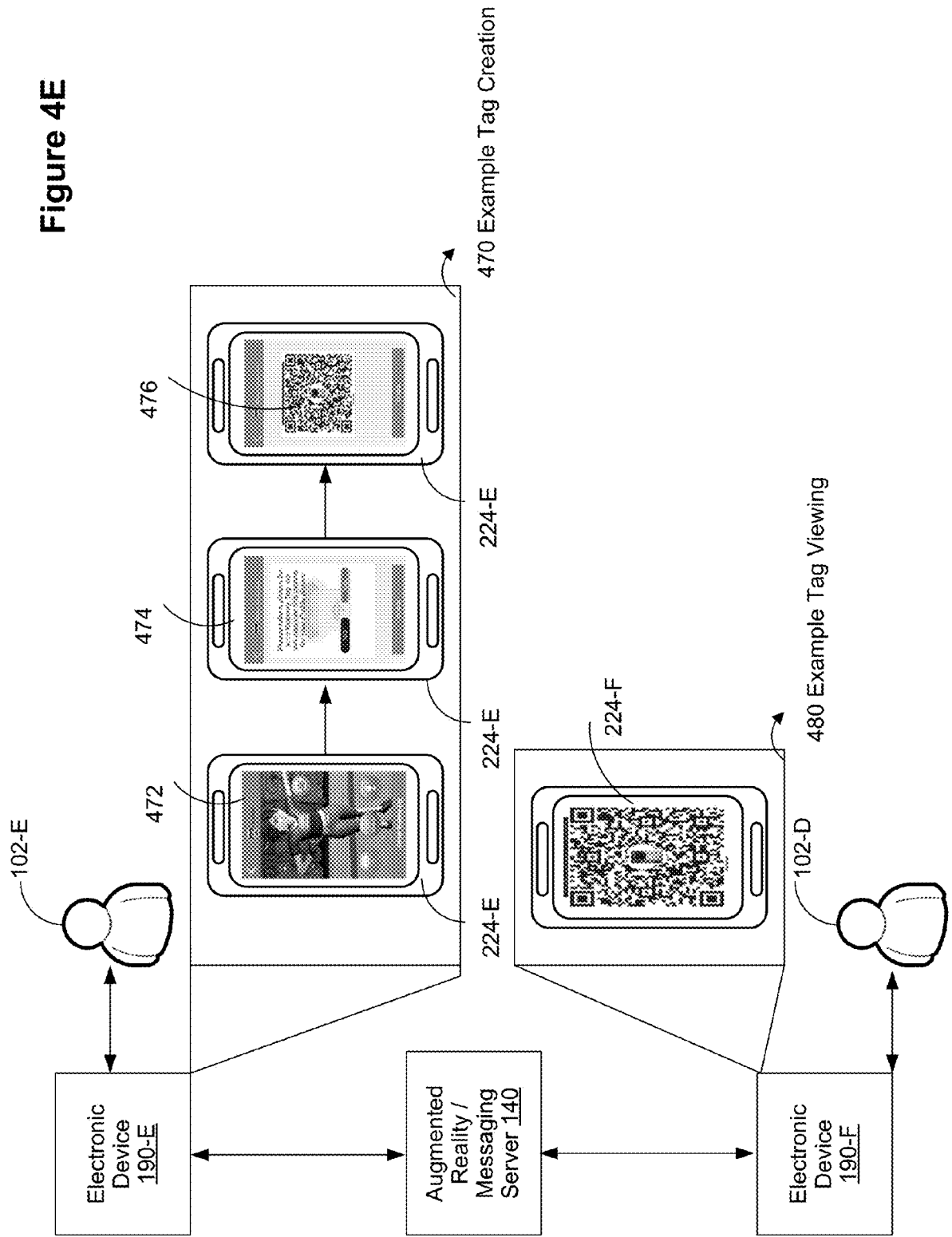

FIG. 4E illustrates tag creation (470) and tag viewing (480) operations in accordance with some implementations. In the example shown, a user 102-E uses an electronic device 190-E that controls (424) the display 224-E to display an avatar 472 in a tag-creation user interface (e.g., an interface provided by a messaging application). As part of the tag creation process, the user 102-E is prompted by the messaging application to create a tag (474) and is given the option of taking a picture for the tag using the camera of the electronic device 190-E (e.g., as shown in FIG. 4E, the image could be a picture of a remote control device). The picture taken by the user 102-E is then transmitted to the sever 140, which creates a tag 476 that is optionally a combination of a displayable machine readable code object (e.g., a matrix or two-dimensional barcode, such as a QR code, or a one dimensional bar code) and the photo transmitted by the user 102-E. This tag is uniquely associated with information entered by the tag creator 102-E that is stored by the messaging server 140 and/or the storage server(s) 160 for presentation in associated with user interaction with the tag. The stored information can include, without limitation, audio and/or video content, a promotional offer, advertising, and/or a message from the tag creator or associated organization (e.g., non-profit group, school, or business). The stored information can also include information regarding the creator of the tag and/or the tag creator's associated organization and their associated avatars, and can be configured to implement and exhibit the technical capabilities and behaviors of avatars described herein. For example, information associated with a tag can be presented by an avatar selected by the tag's creator, and that avatar can support user-avatar and avatar-avatar interactions, can be pinned to a specific geographic location, can be edited and/or manipulated in accordance with the tag creator's specifications, and can be configured to respond dynamically to questions from the user regarding the information associated with the tag. In some implementations, an avatar associated with a tag (474) includes one or more characteristics of a BLAVATAR™ (e.g., action and/or interaction capabilities).

Referring again to FIG. 4E, after receiving a message associated with the tag 476, another user 102-D uses an electronic device 190-F that controls the display 224-F to display and interact with the tag 476. In some implementations, when a message with a tag 476 is transmitted by a user 102-E to another user 102-D via the Messaging server 140, a tag-enabled messaging application executing on the electronic device 190-F causes the device 190-F to display the tag shown in display 224-F and to enable interaction by the user 102-D with the tag 476 in accordance with avatar capabilities as described herein. In some implementations, the server 140 responds to a request from device 190-F (which is controlled by the user 102-D) to show one or more avatar-based tags that are associated with messages transmitted to the user, organizations of which the user is a registered member, or tags that are associated with a current or popular location associated with the user.

Figure 5A:
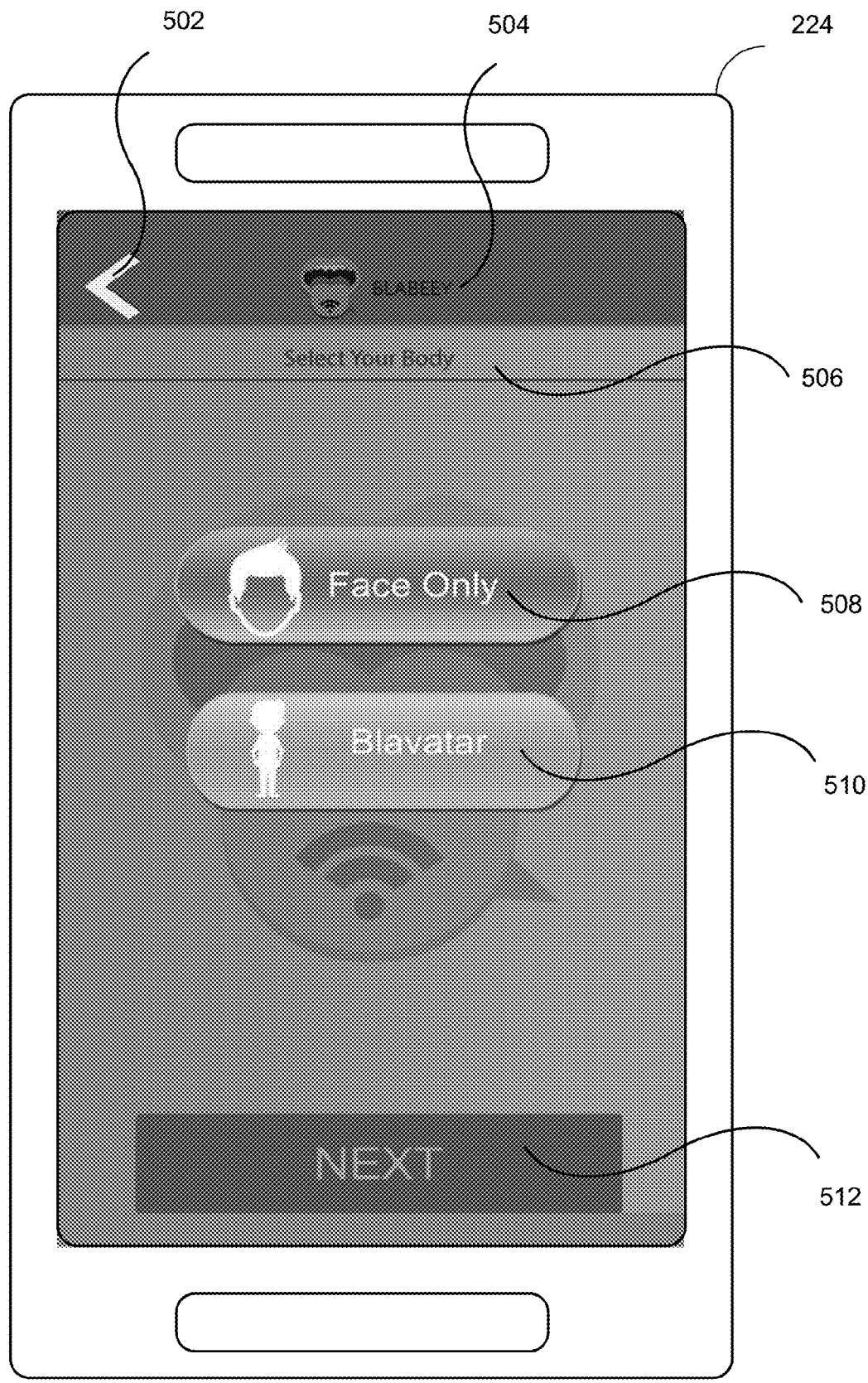
FIG. 5A-5Z illustrate example user interfaces for avatar creation and placement, avatar-user interaction, avatar-avatar interaction, avatar-based tag creation, and interaction with avatar-based tags, in accordance with some implementations.
Figure 5B:
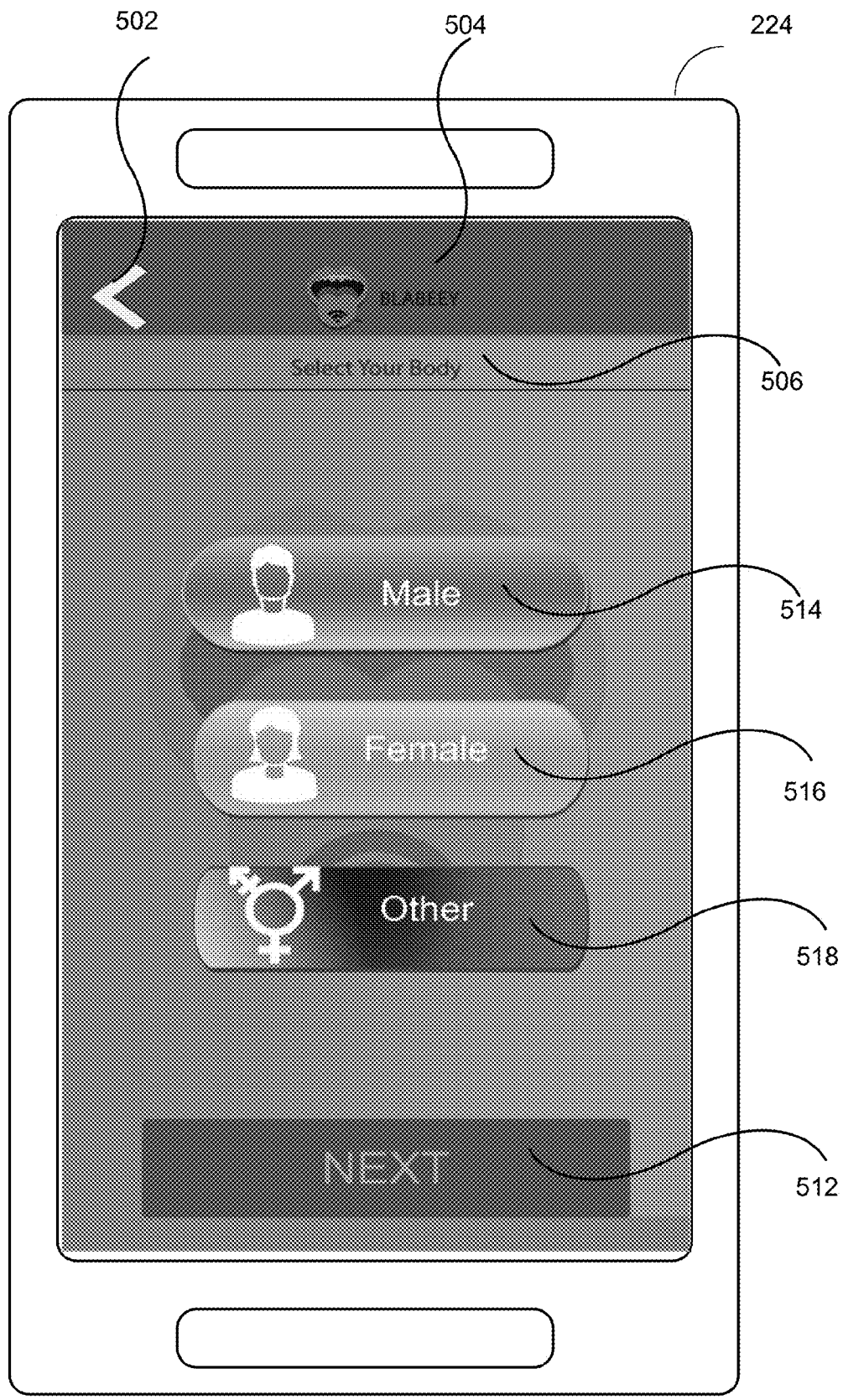
Figure 5C:
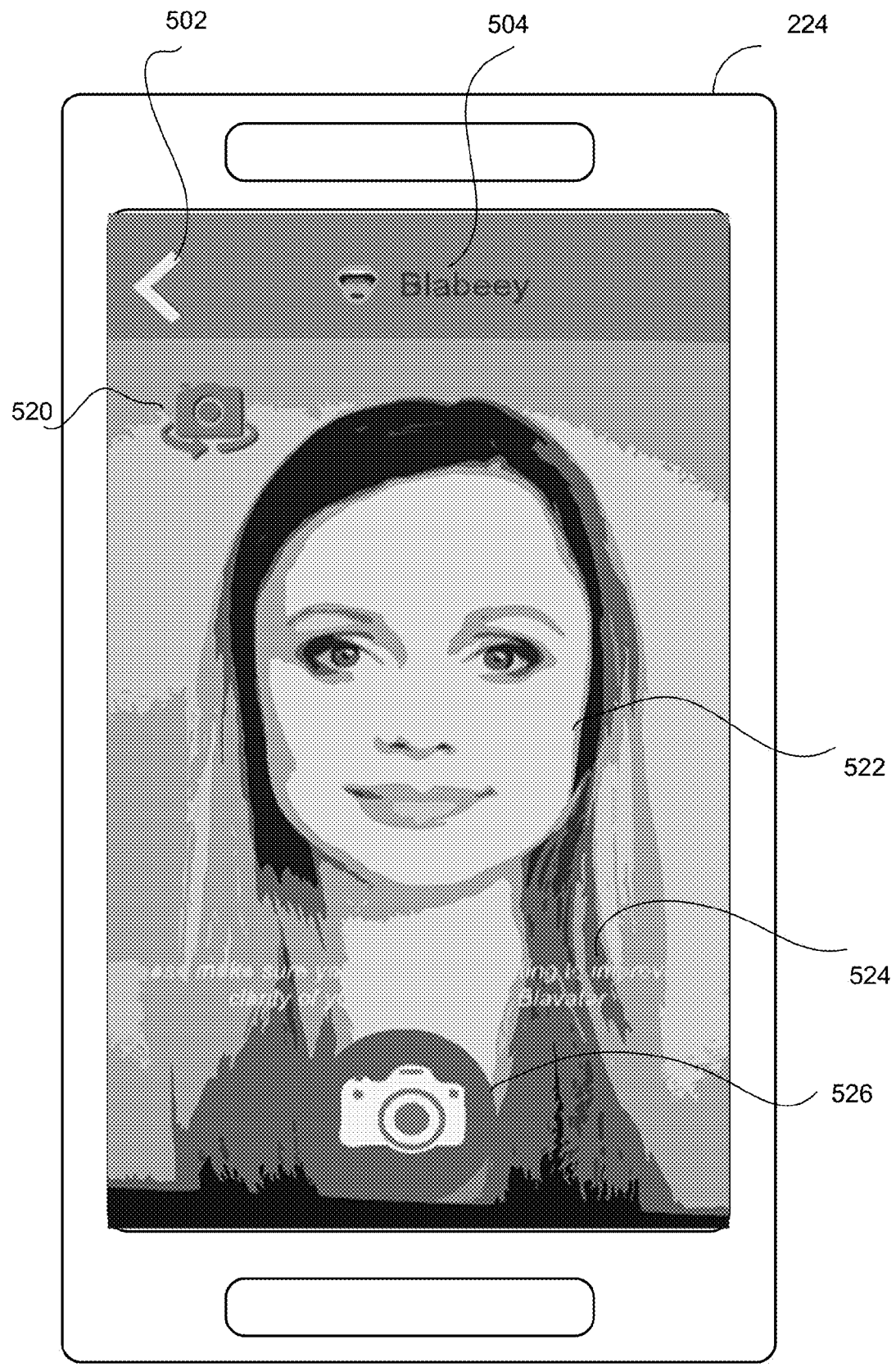
Figure 5D:
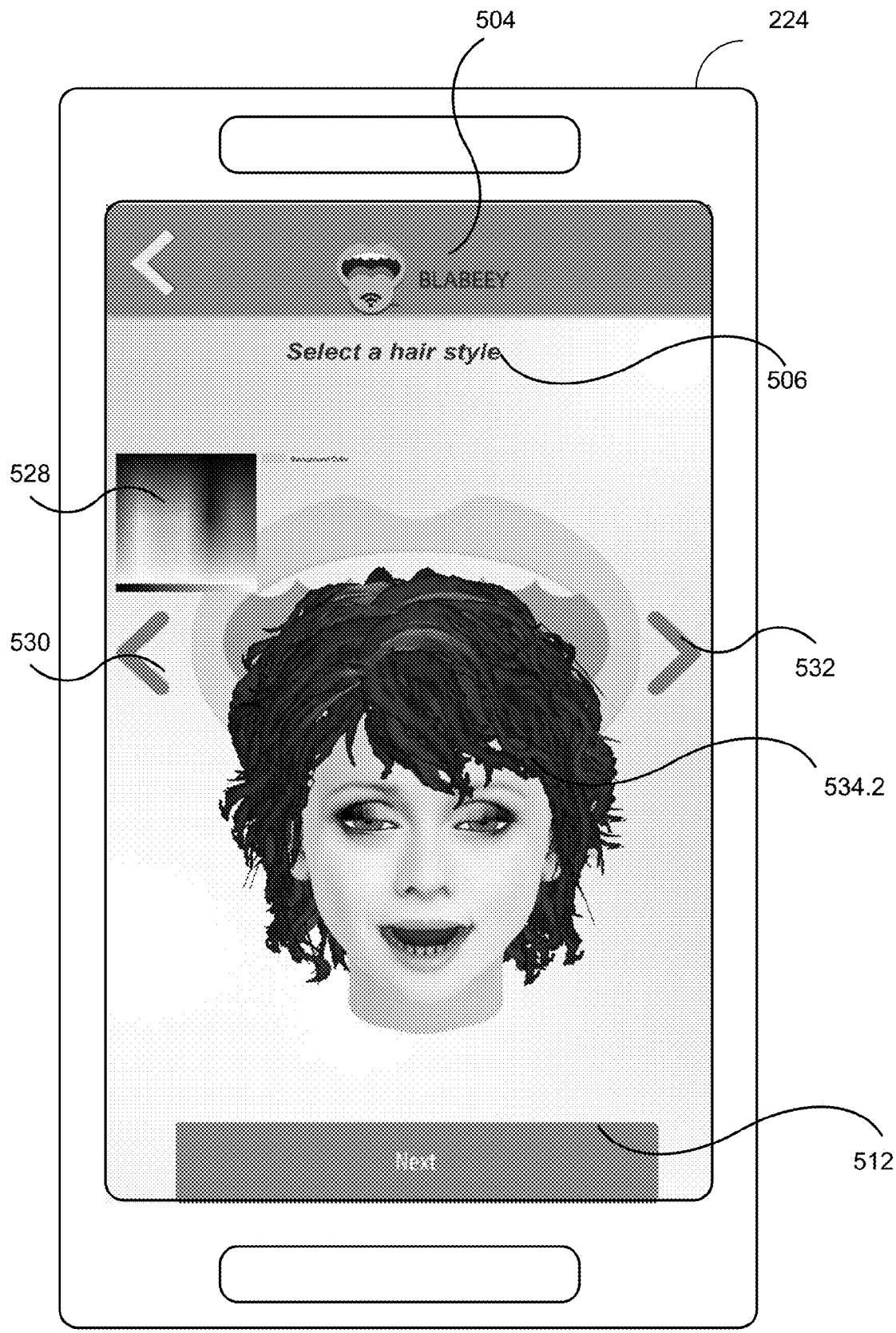
Figure 5E:
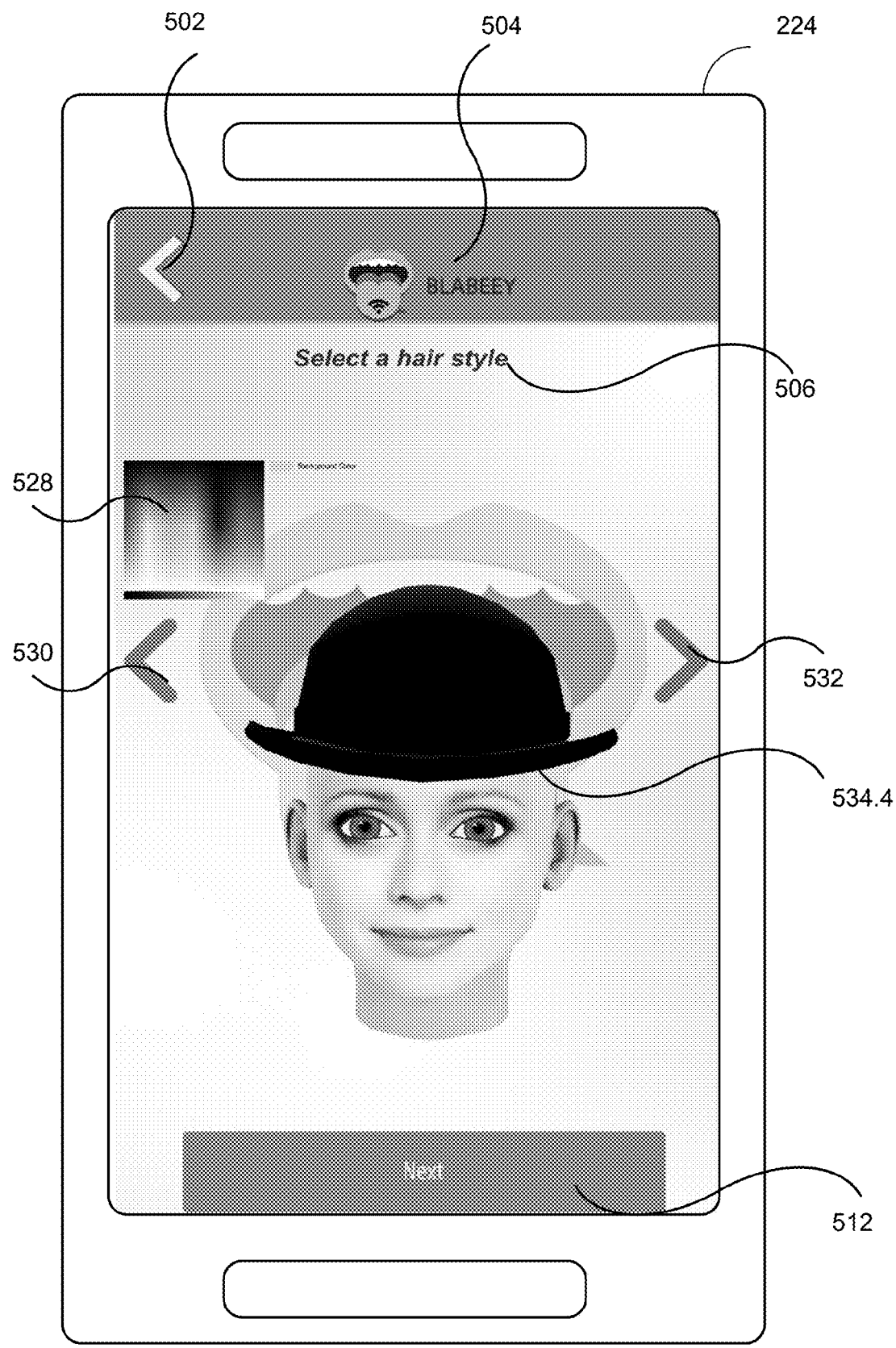
Figure 5F:
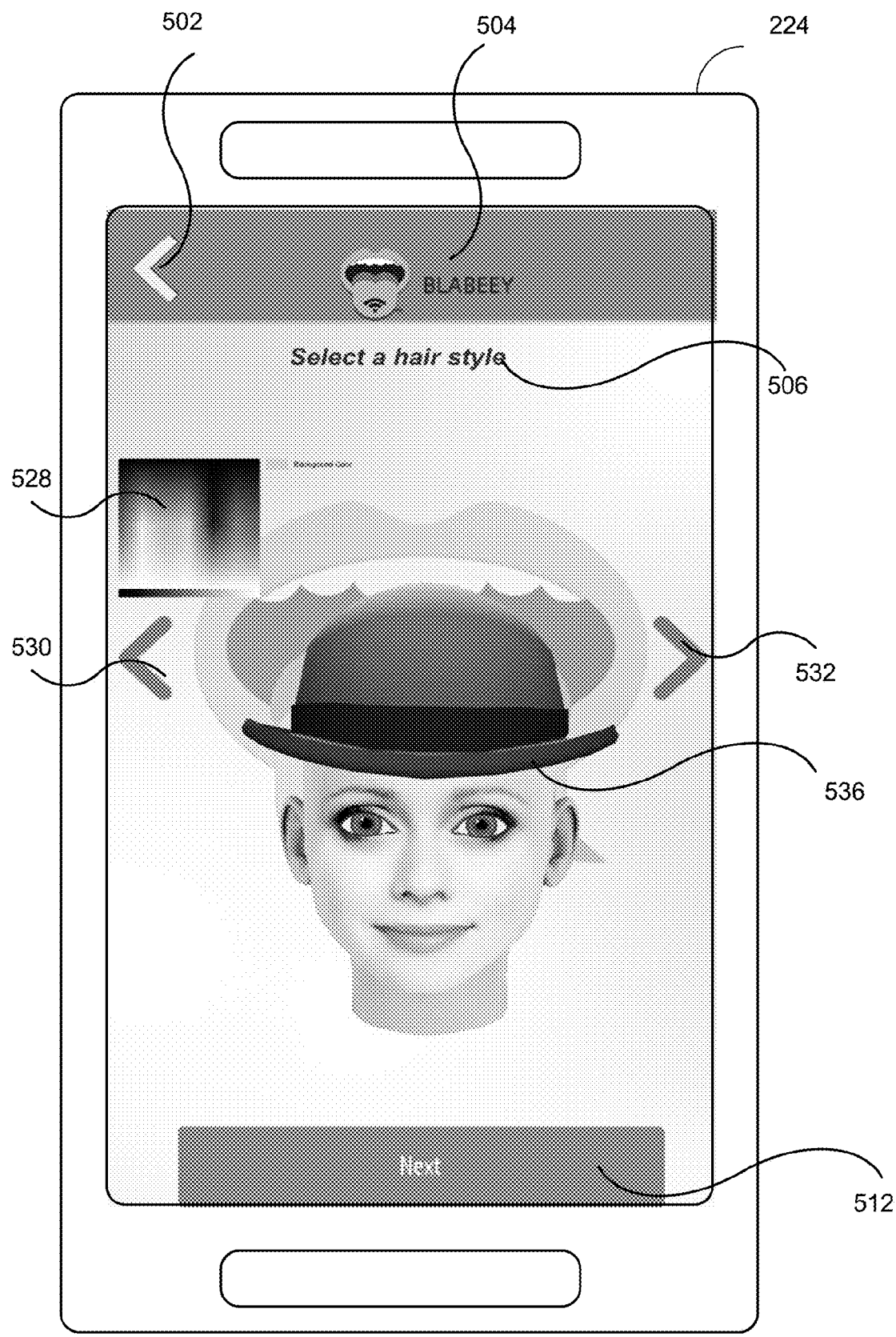
Figure 5G:
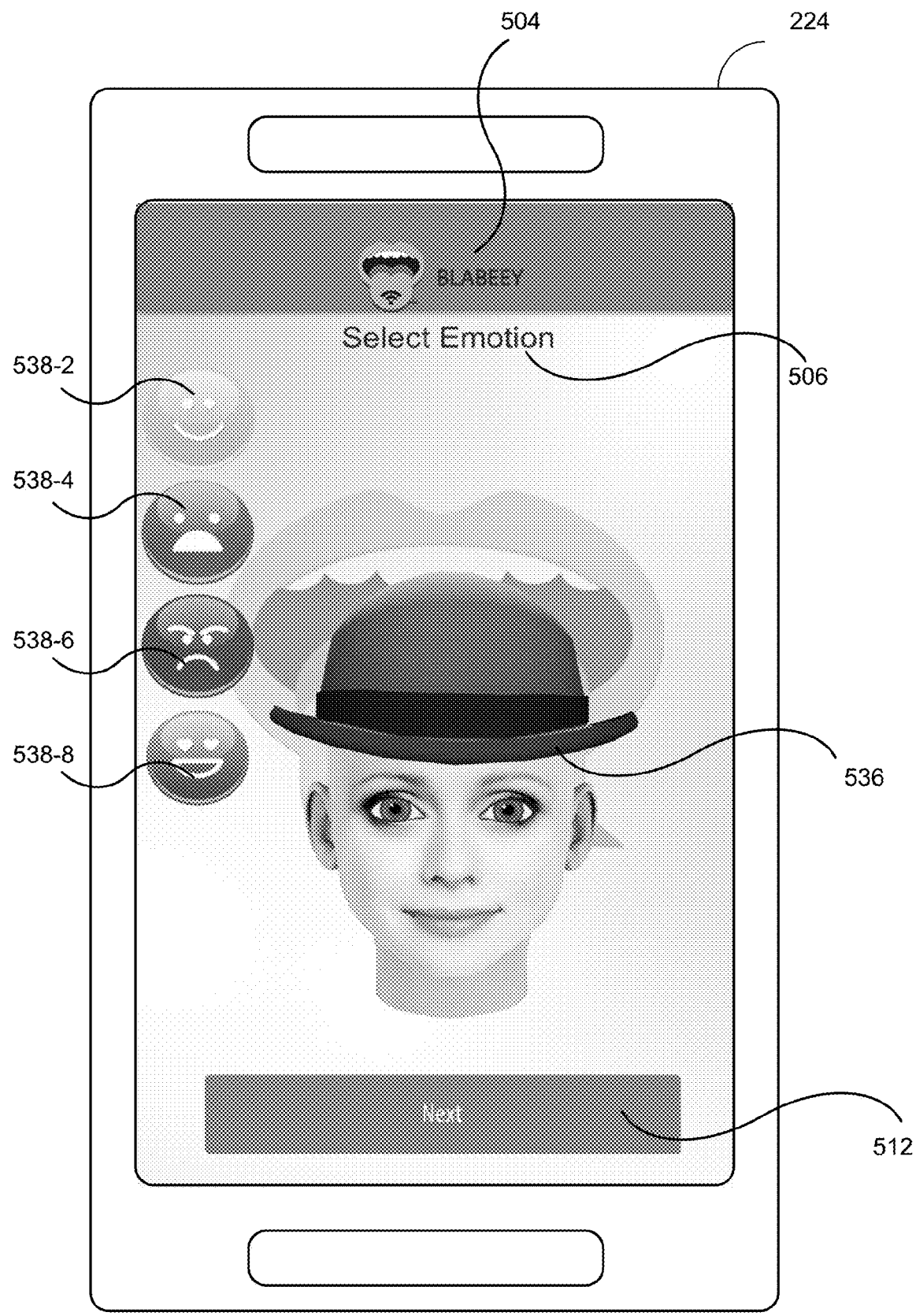
Figure 5H:
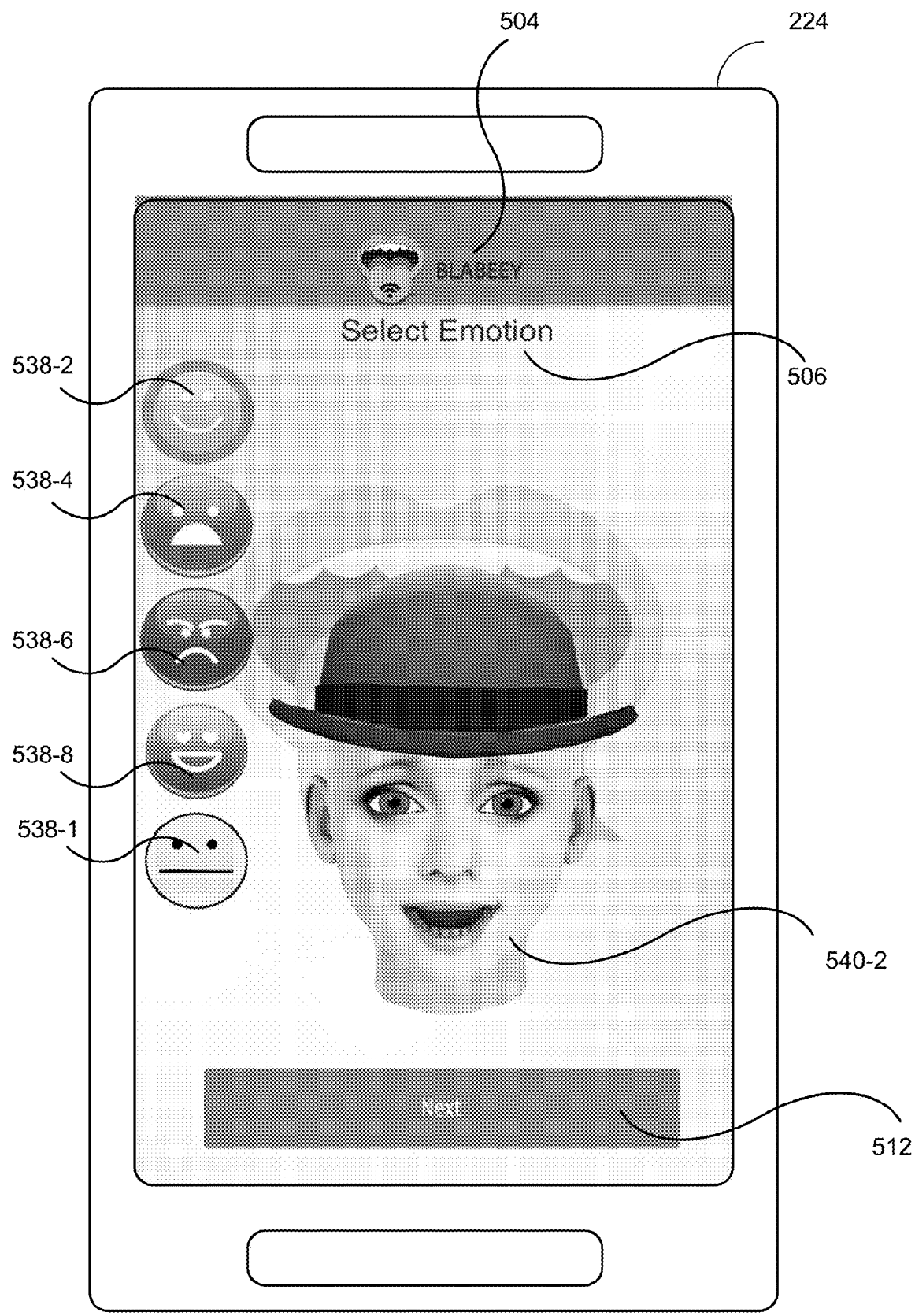
Figure 5I:
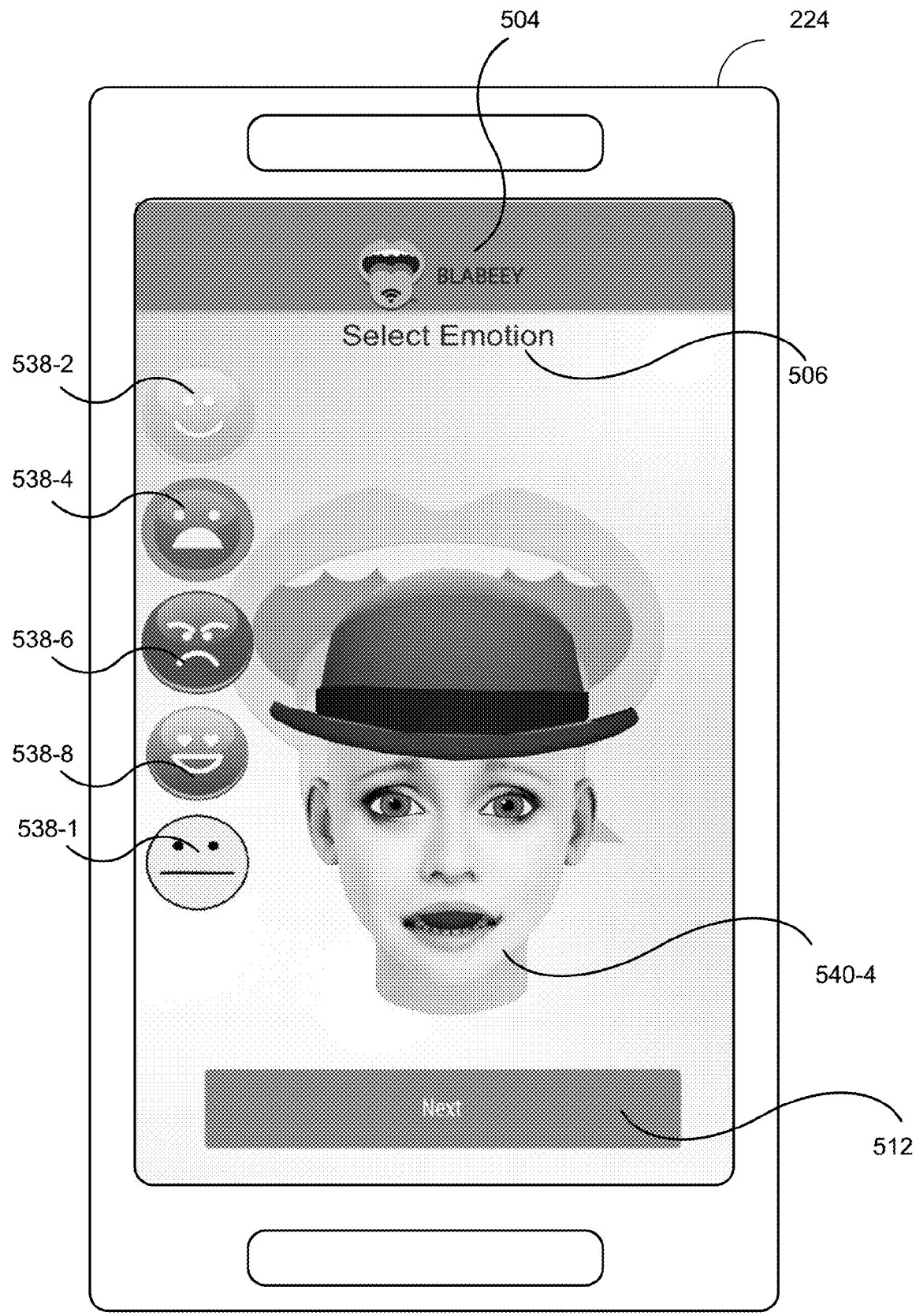
Figure 5J:
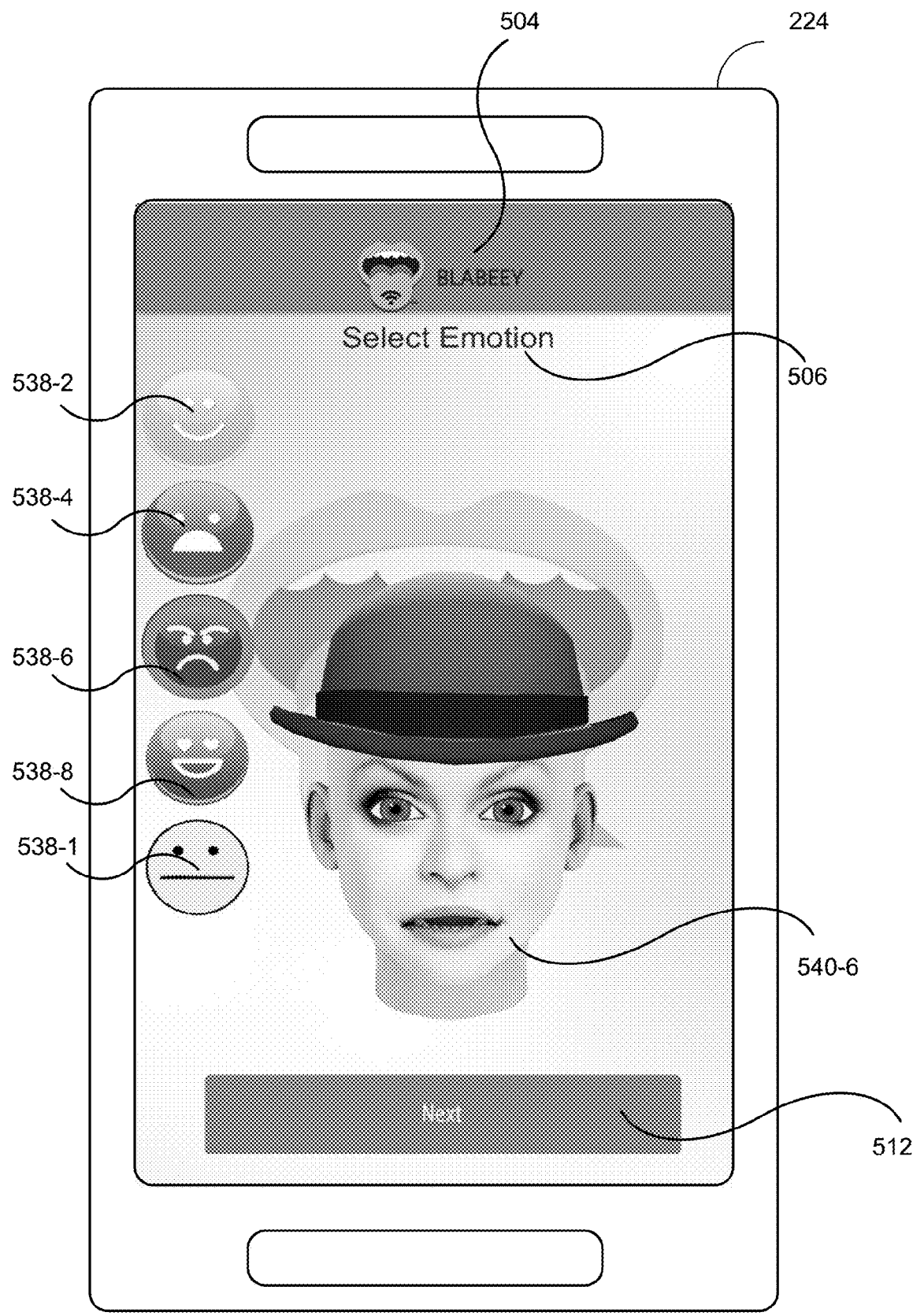
Figure 5K:
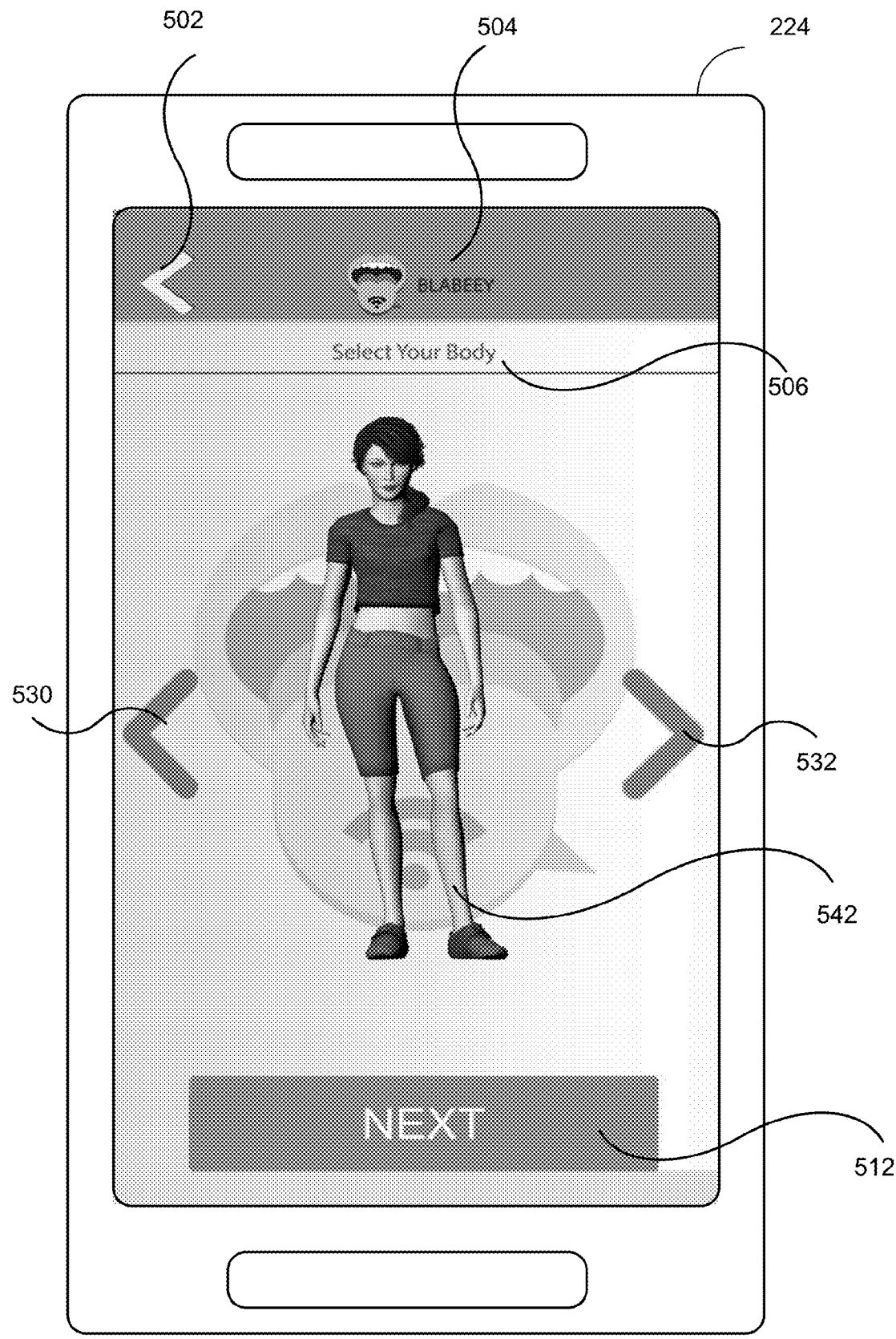
Figure 5L:
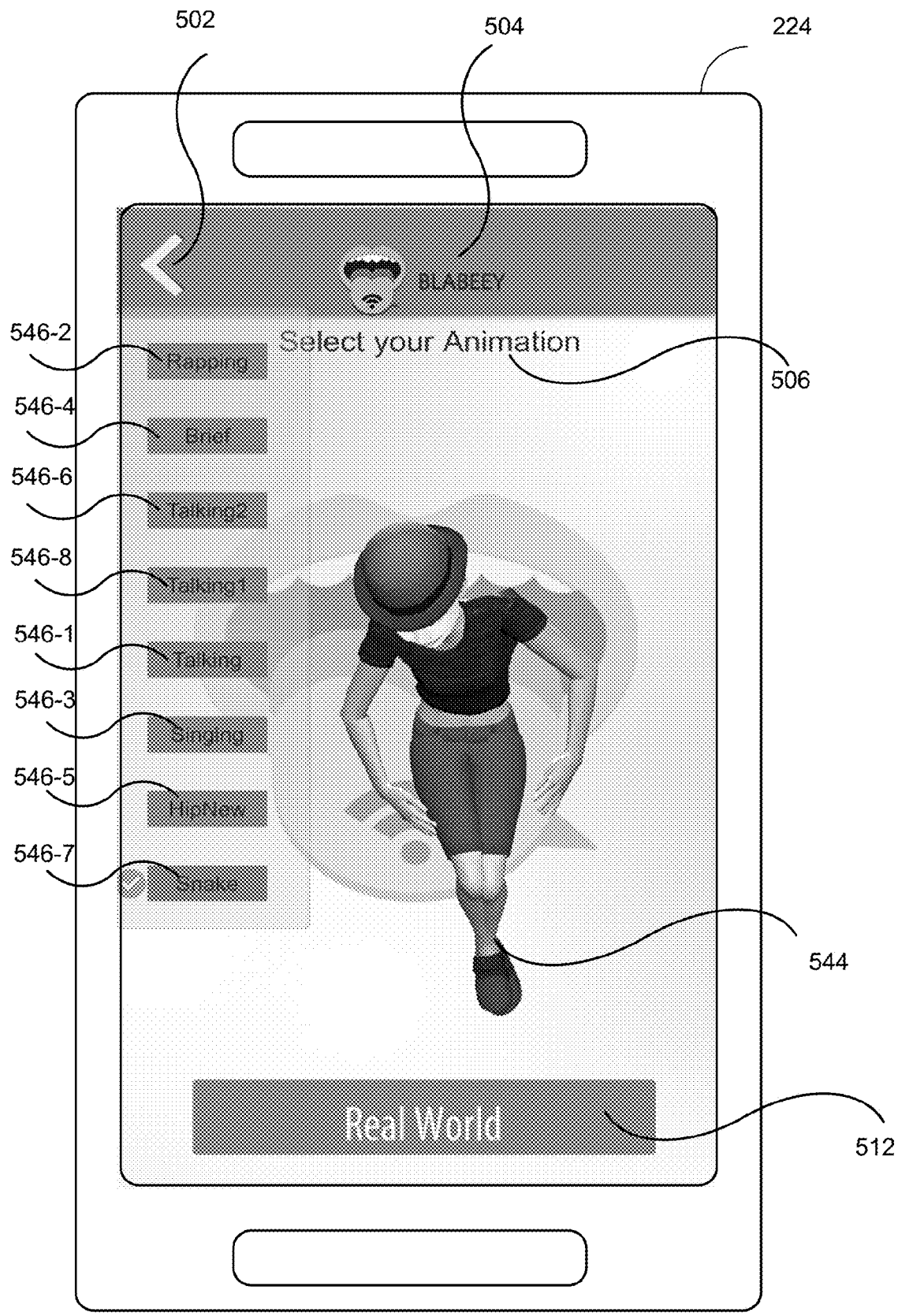
Figure 5M:
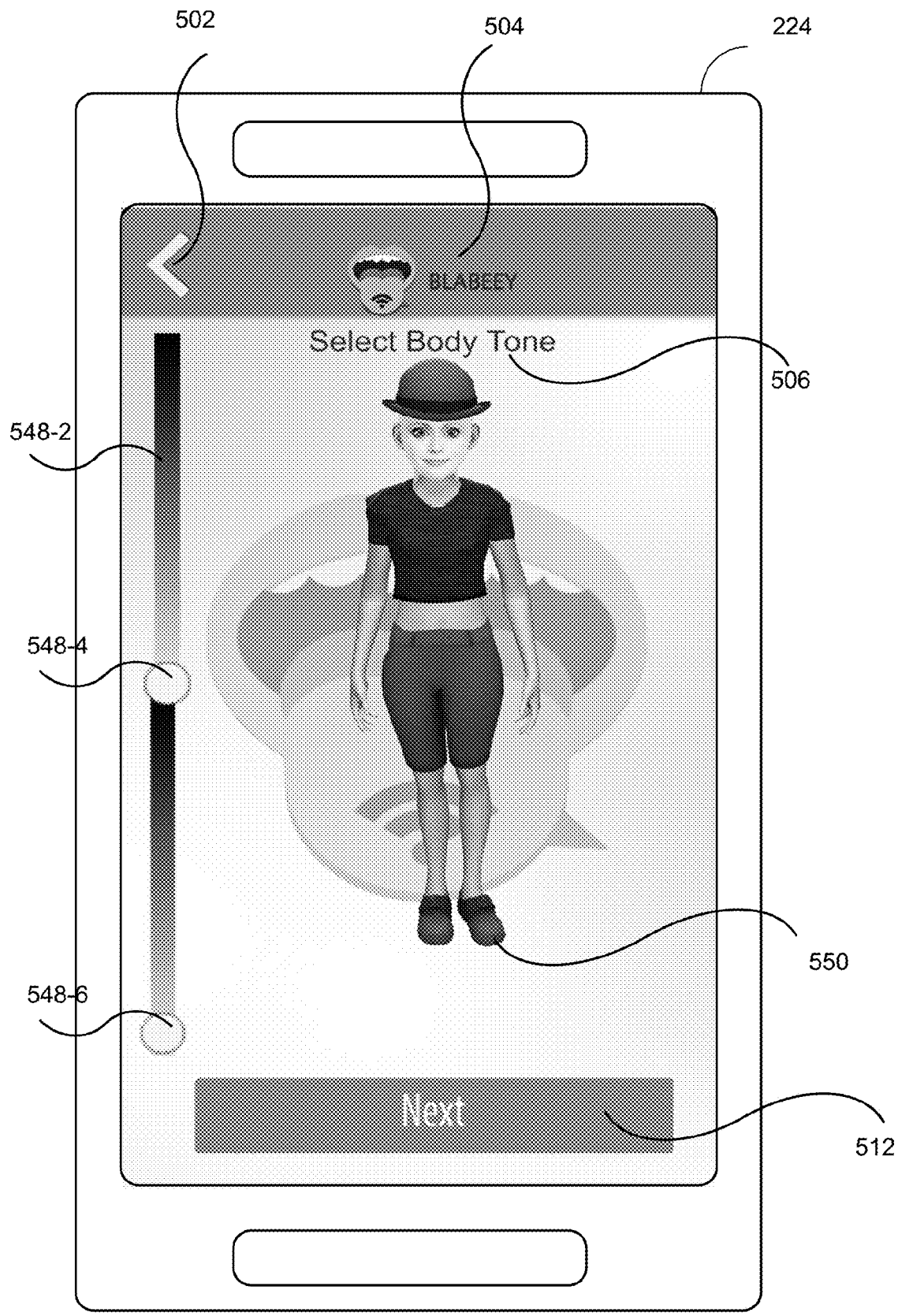
Figure 5N:
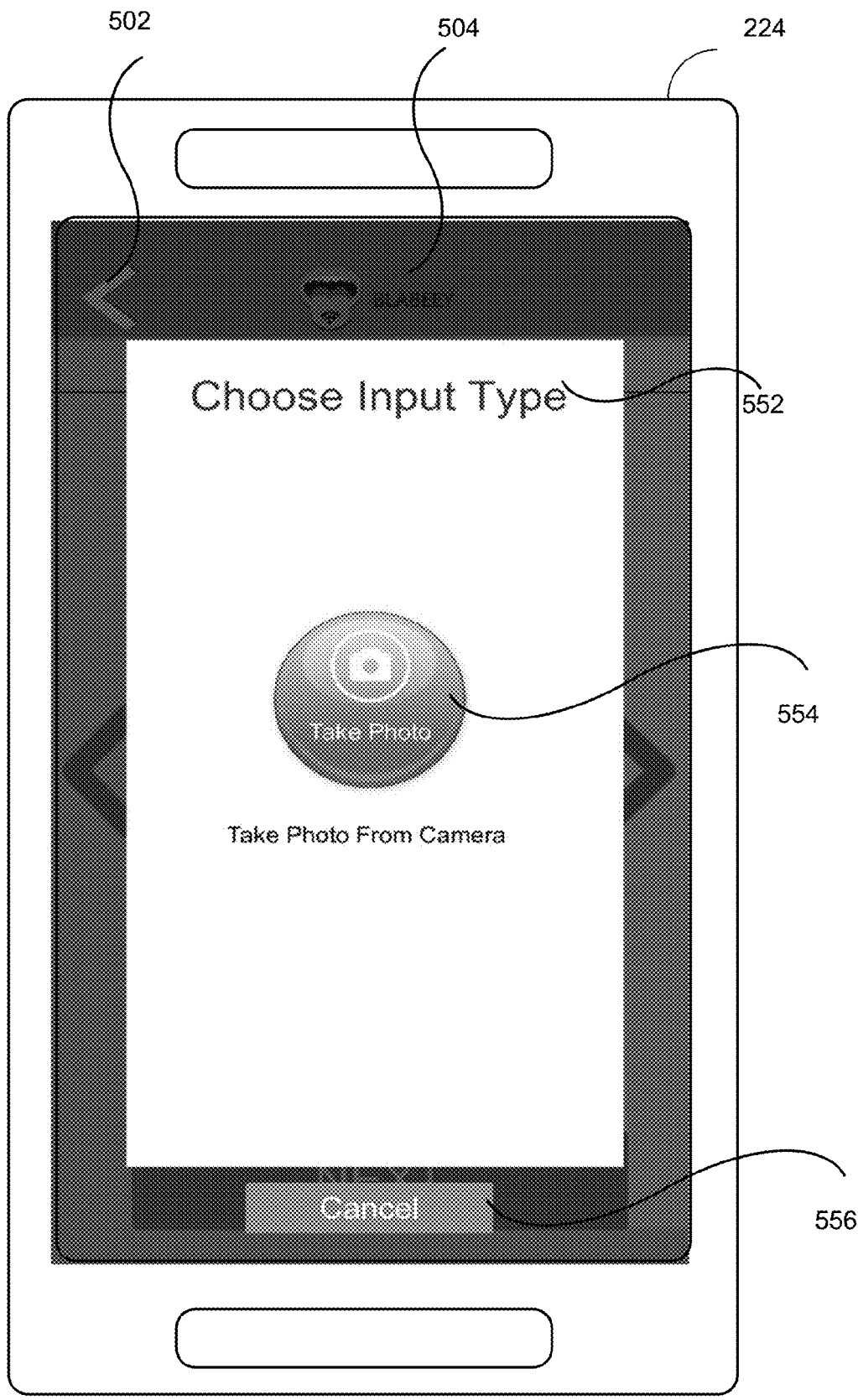
Figure 5O:
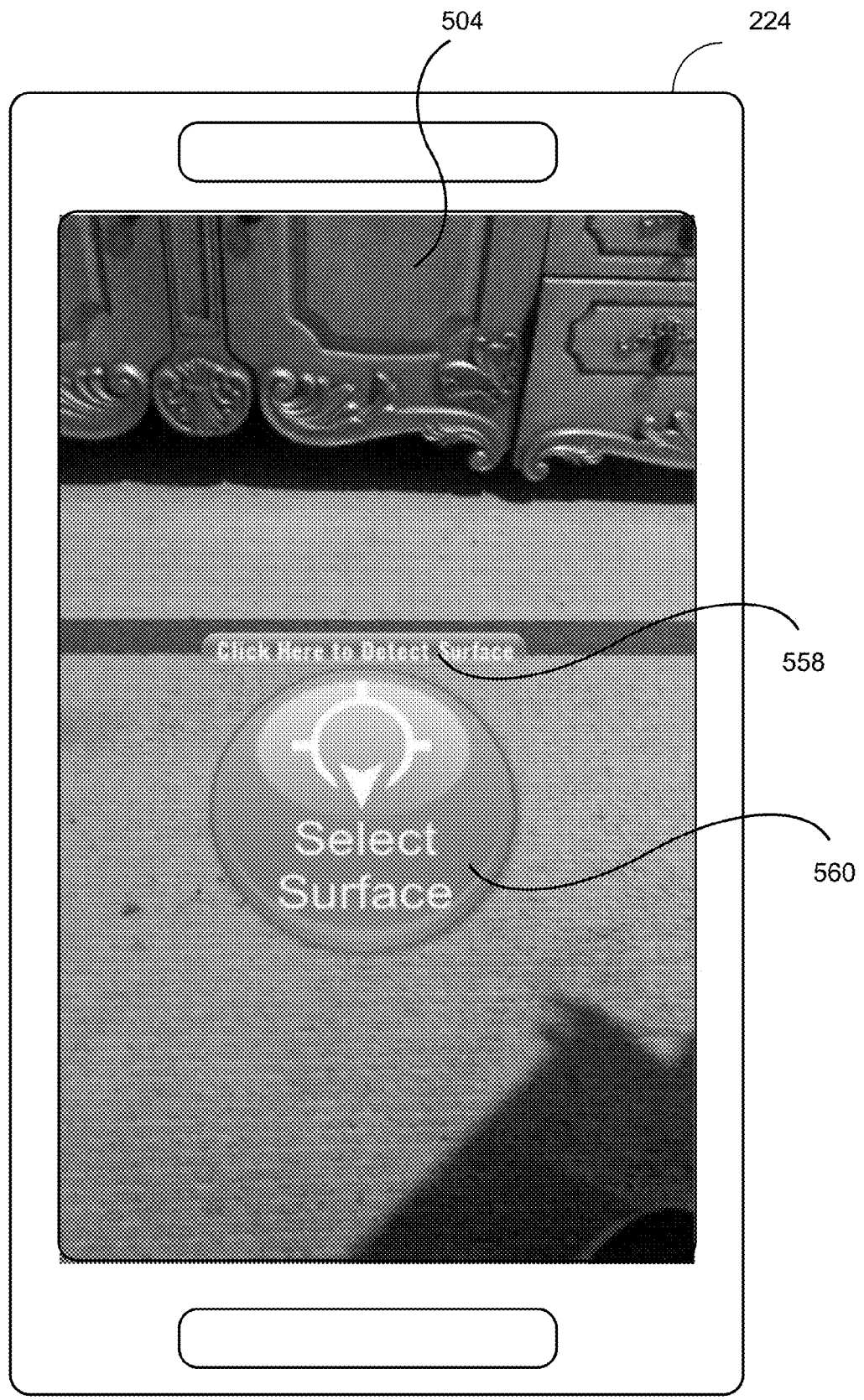
Figure 5P:
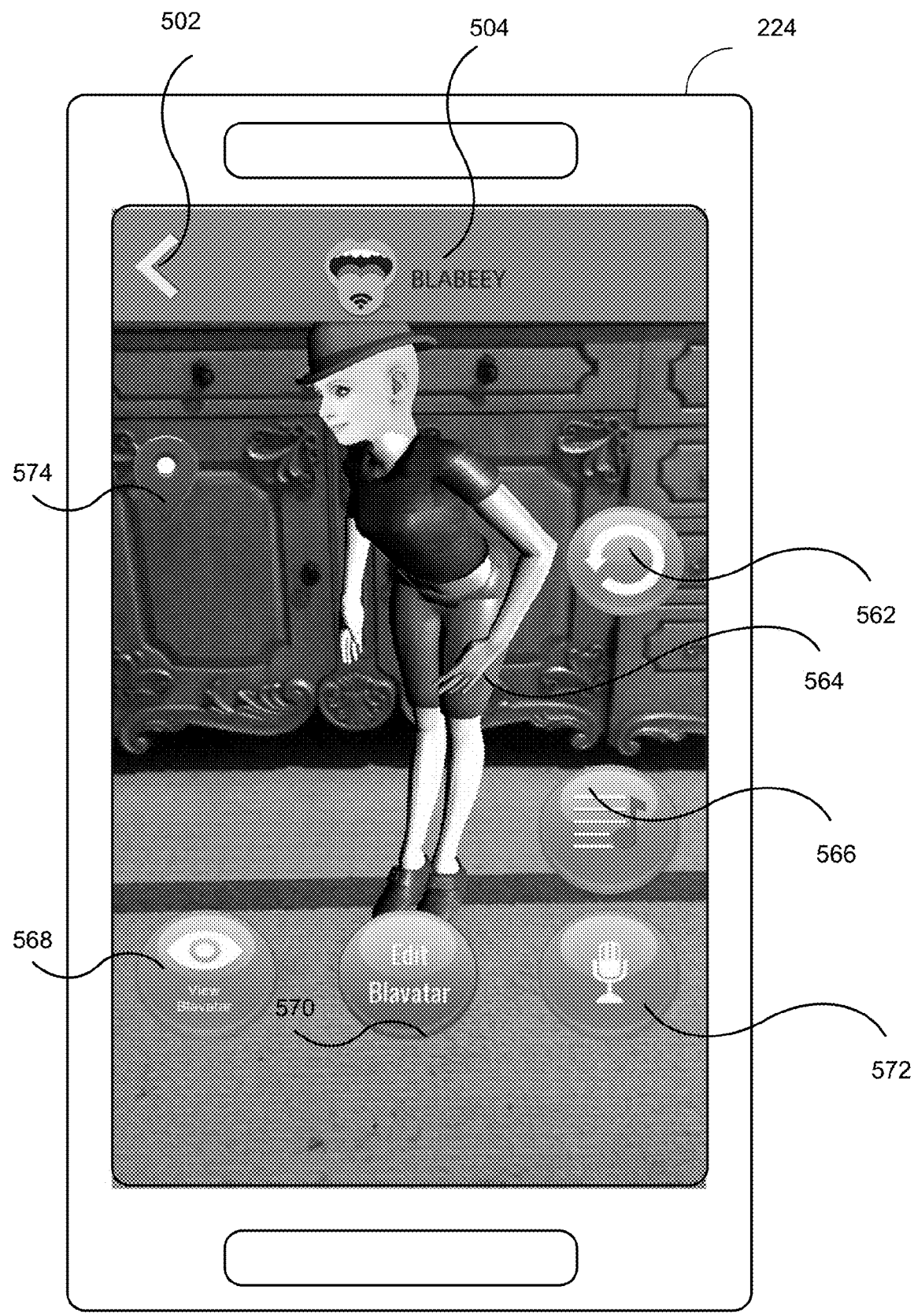
Figure 5Q:
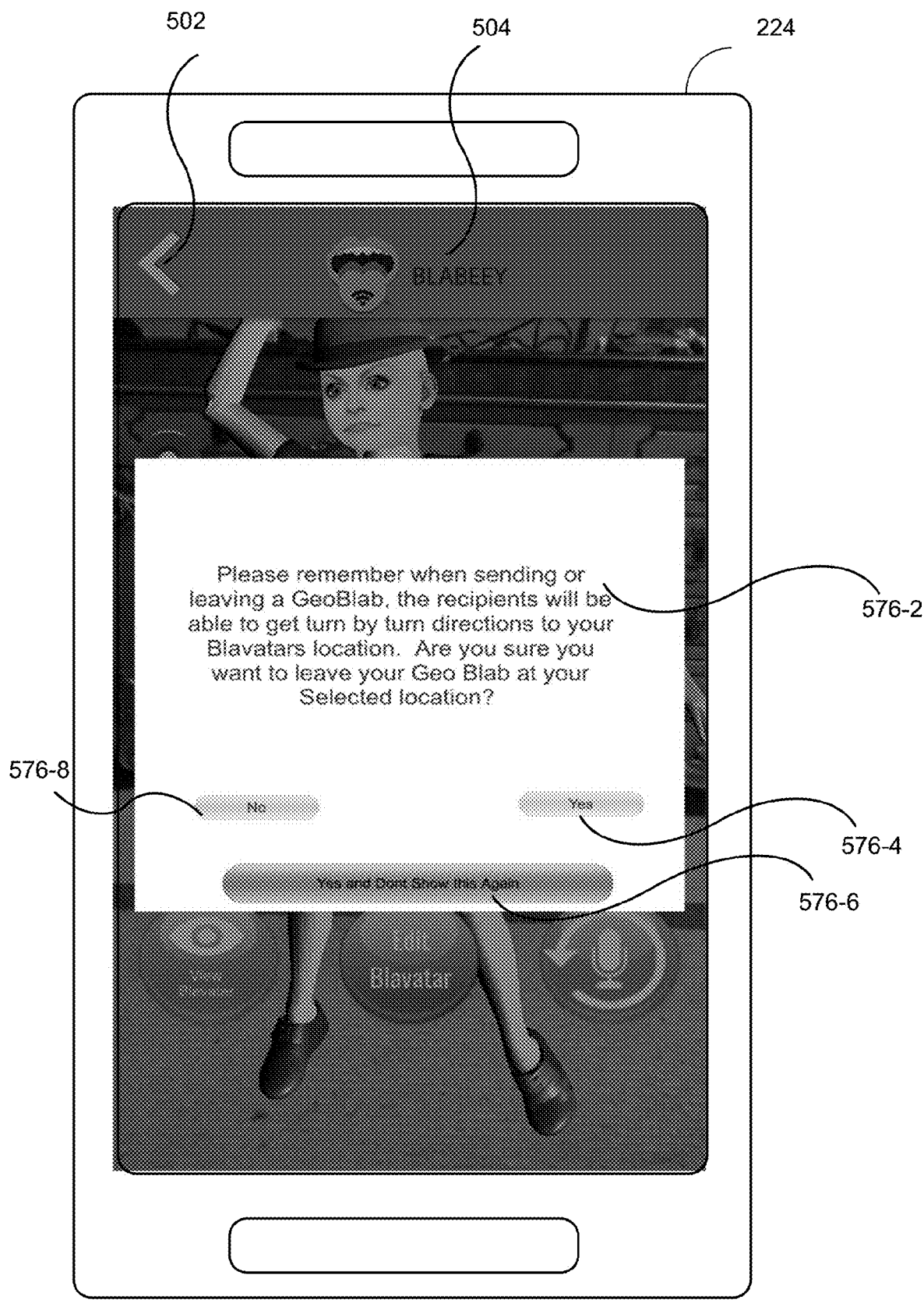
Figure 5R:
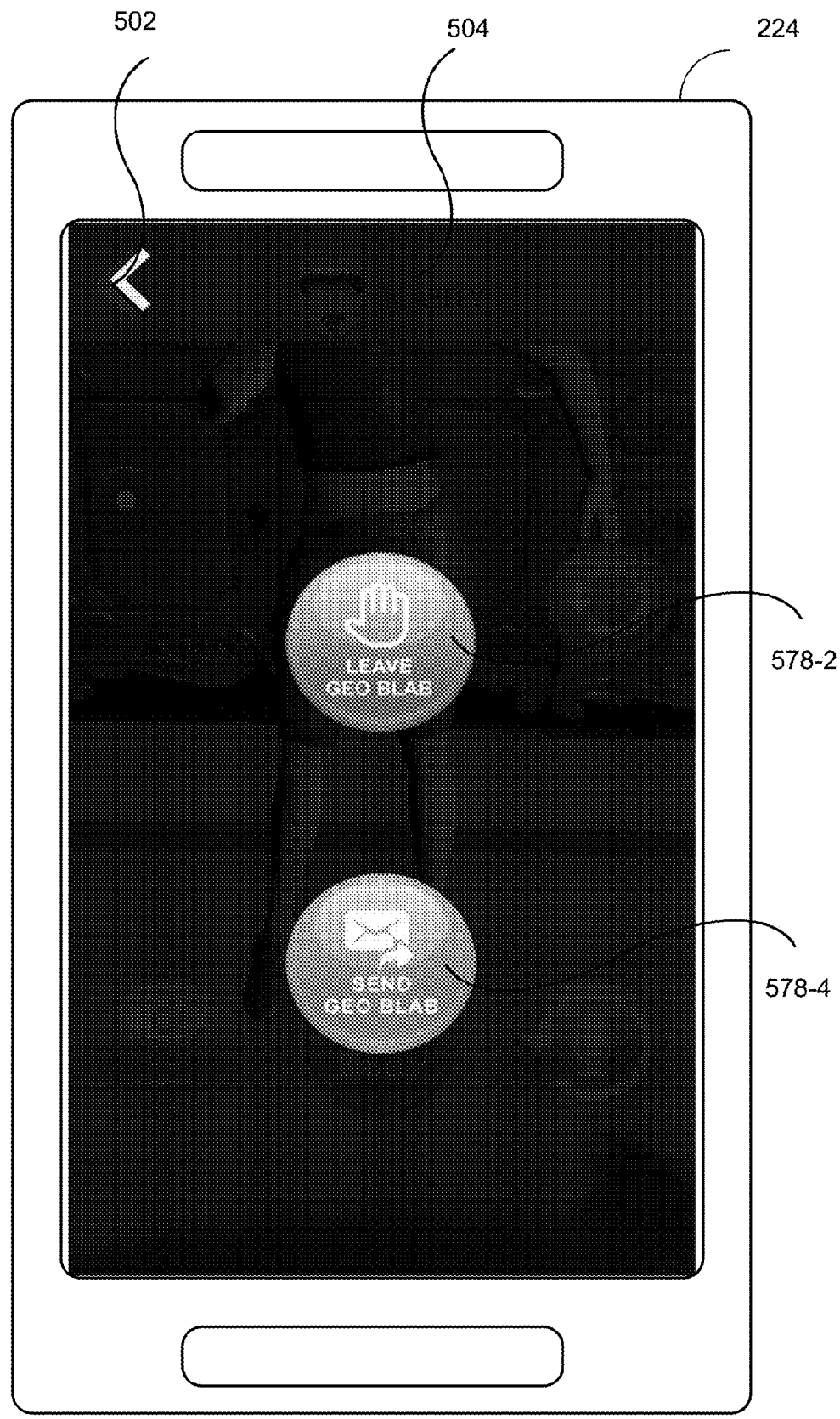
Figure 5S:
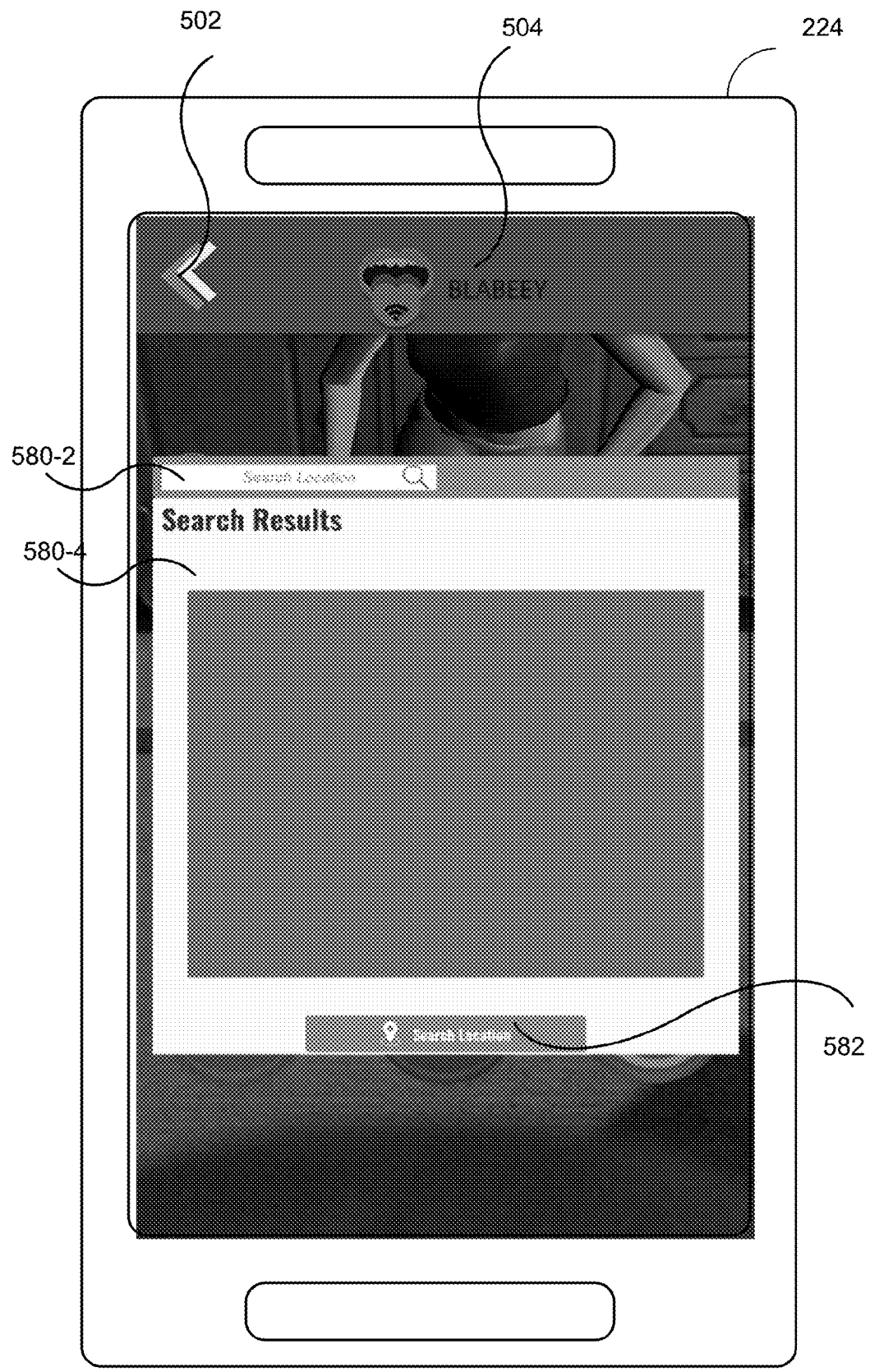
Figure 5T:
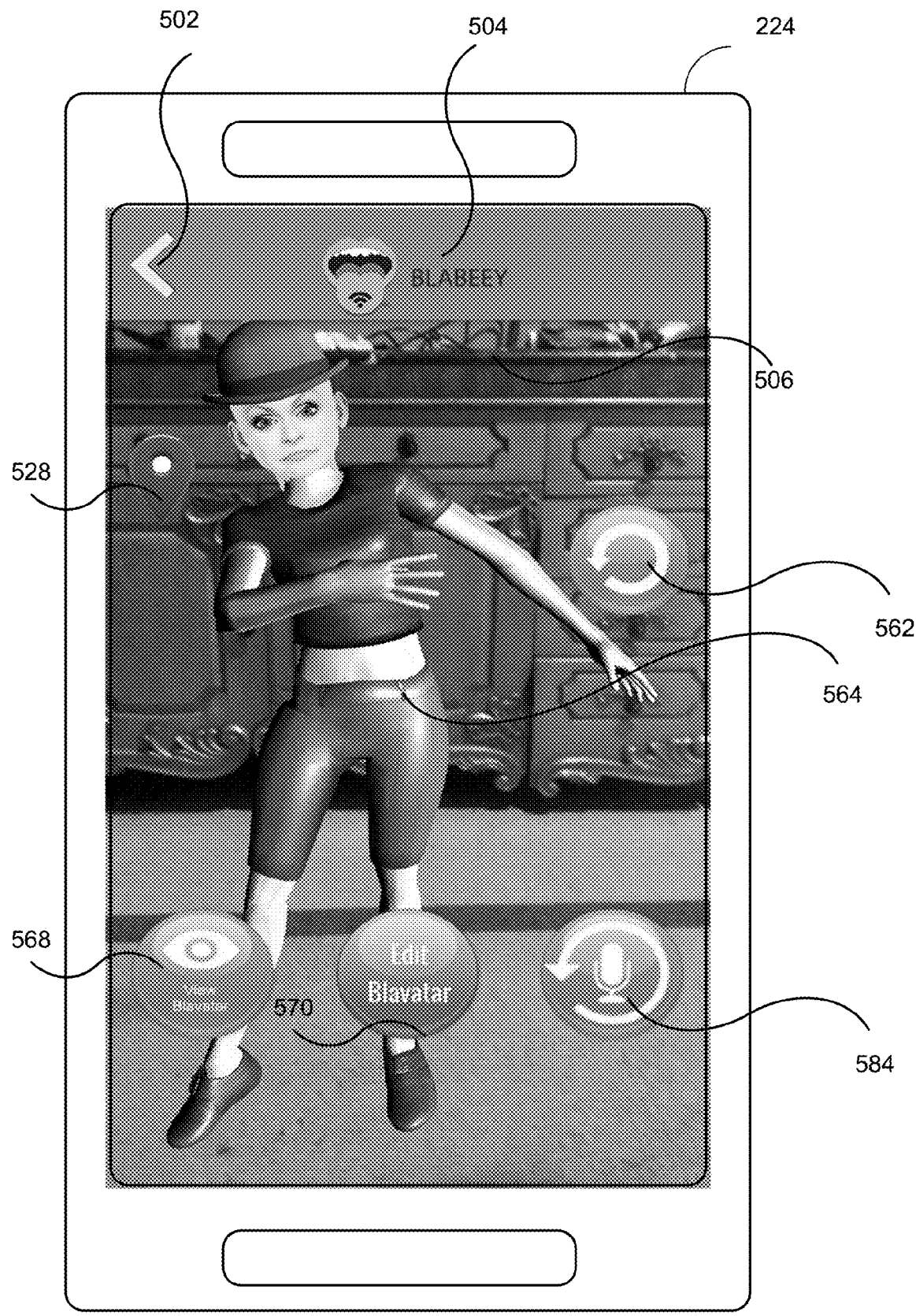
Figure 5U:
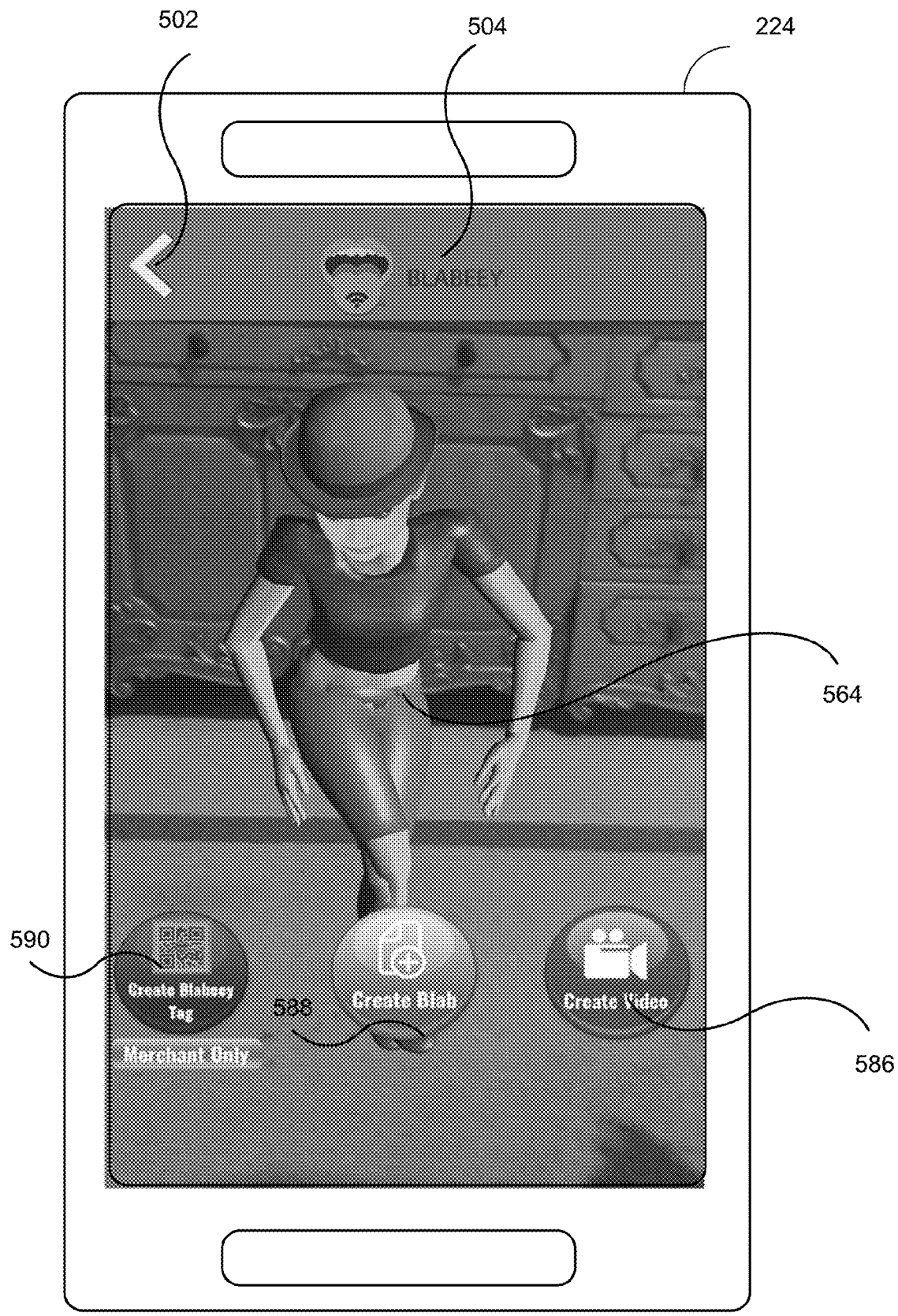
Figure 5V:
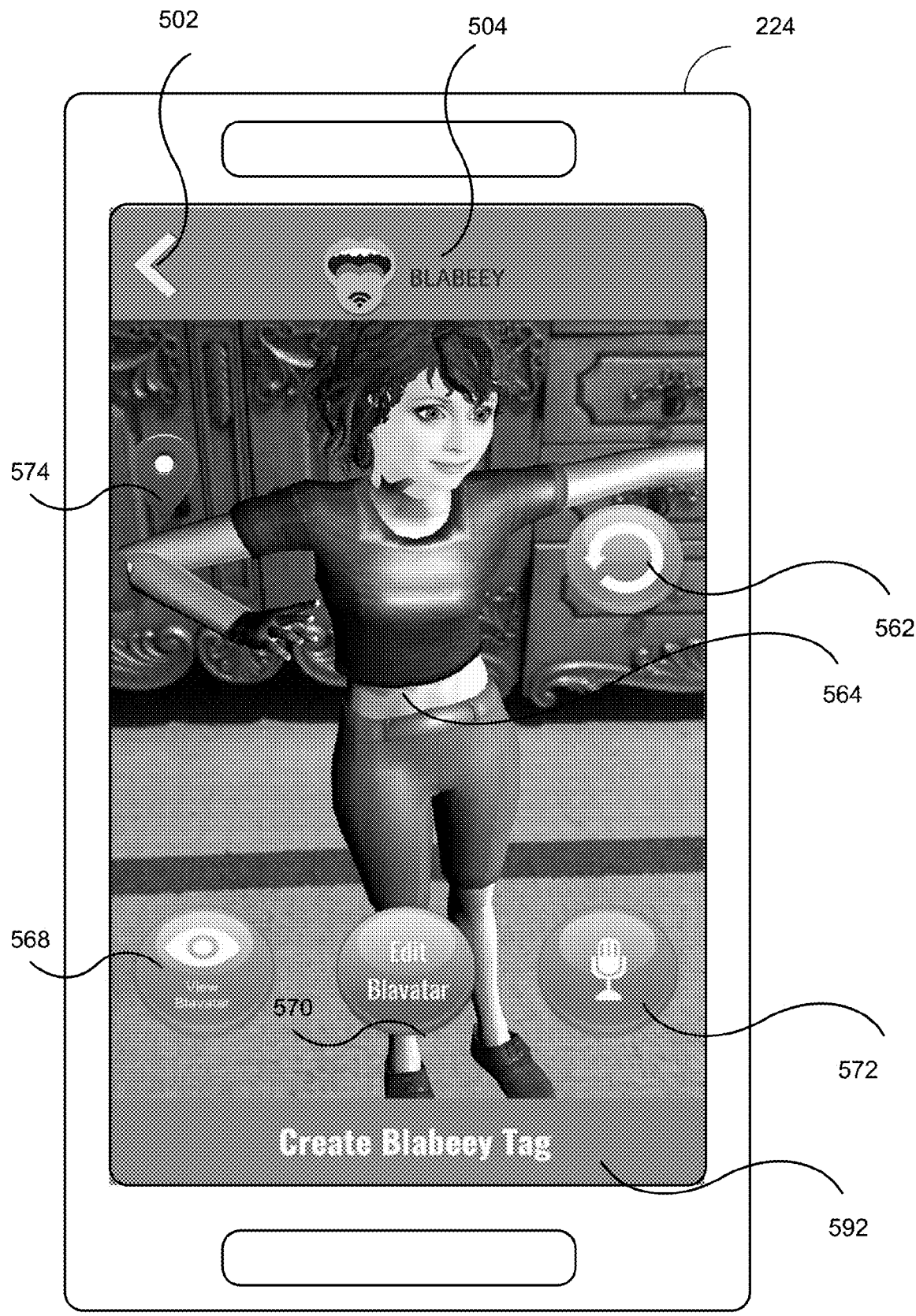
Figure 5W:
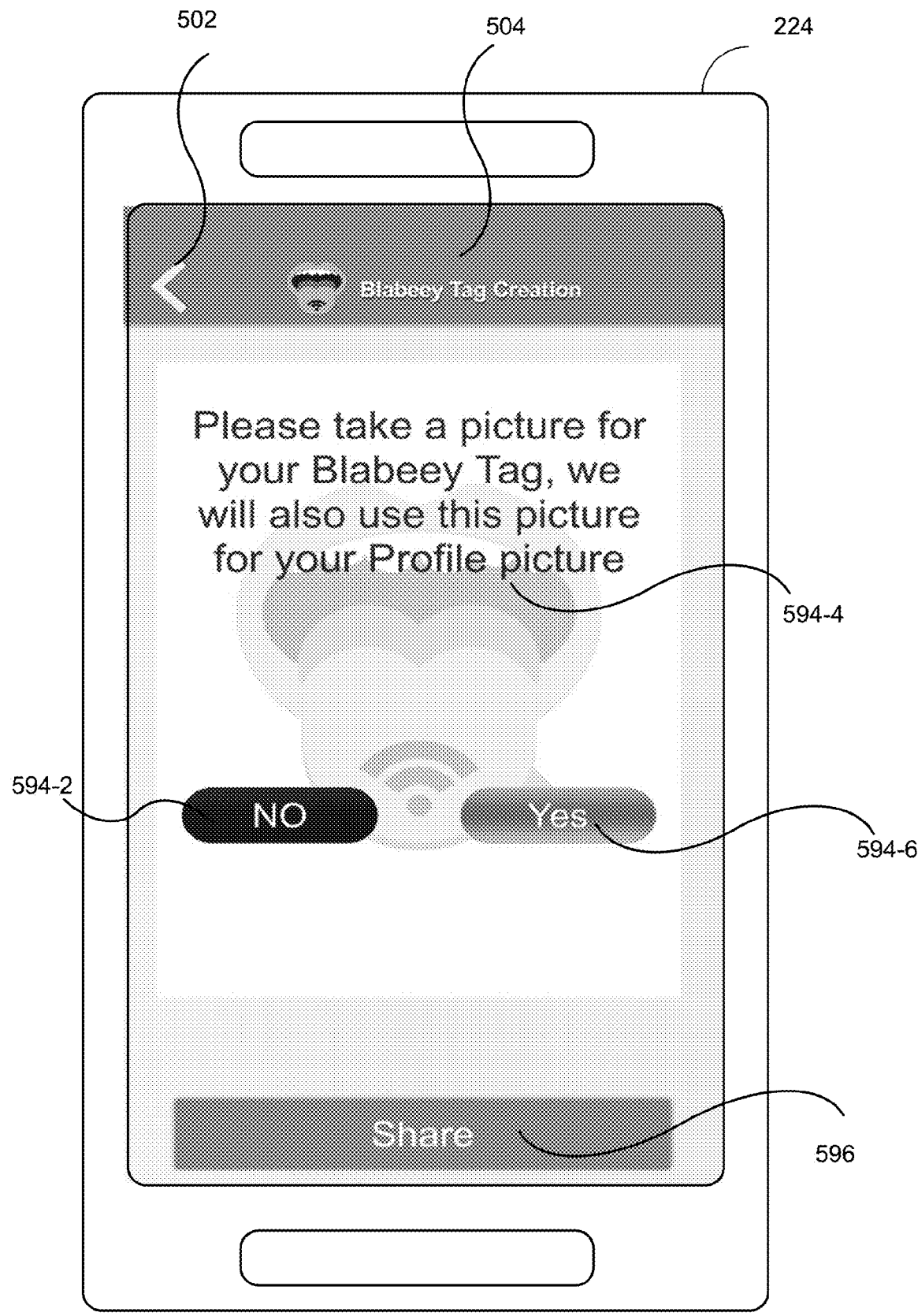
Figure 5X:
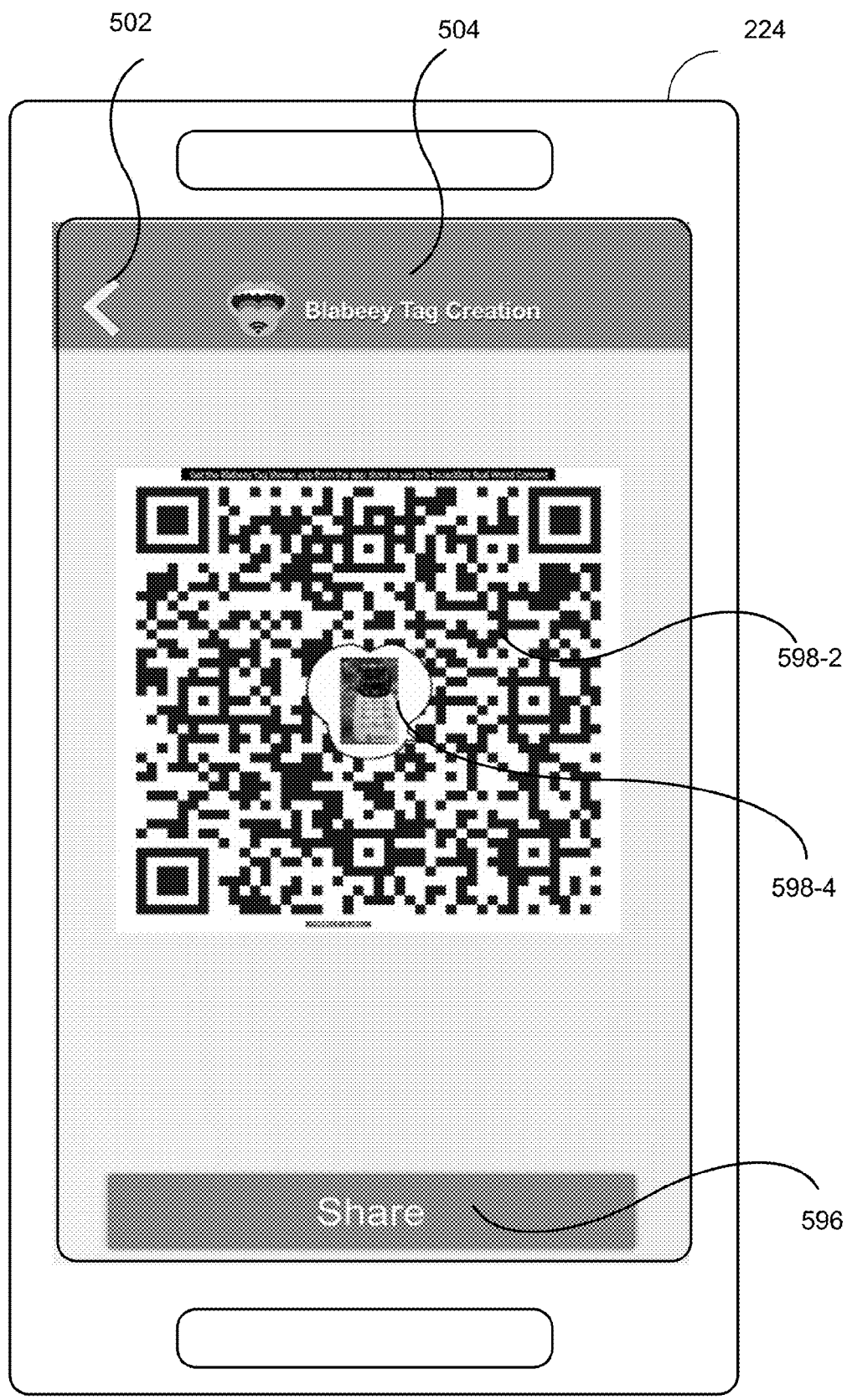
Figure 5Y:
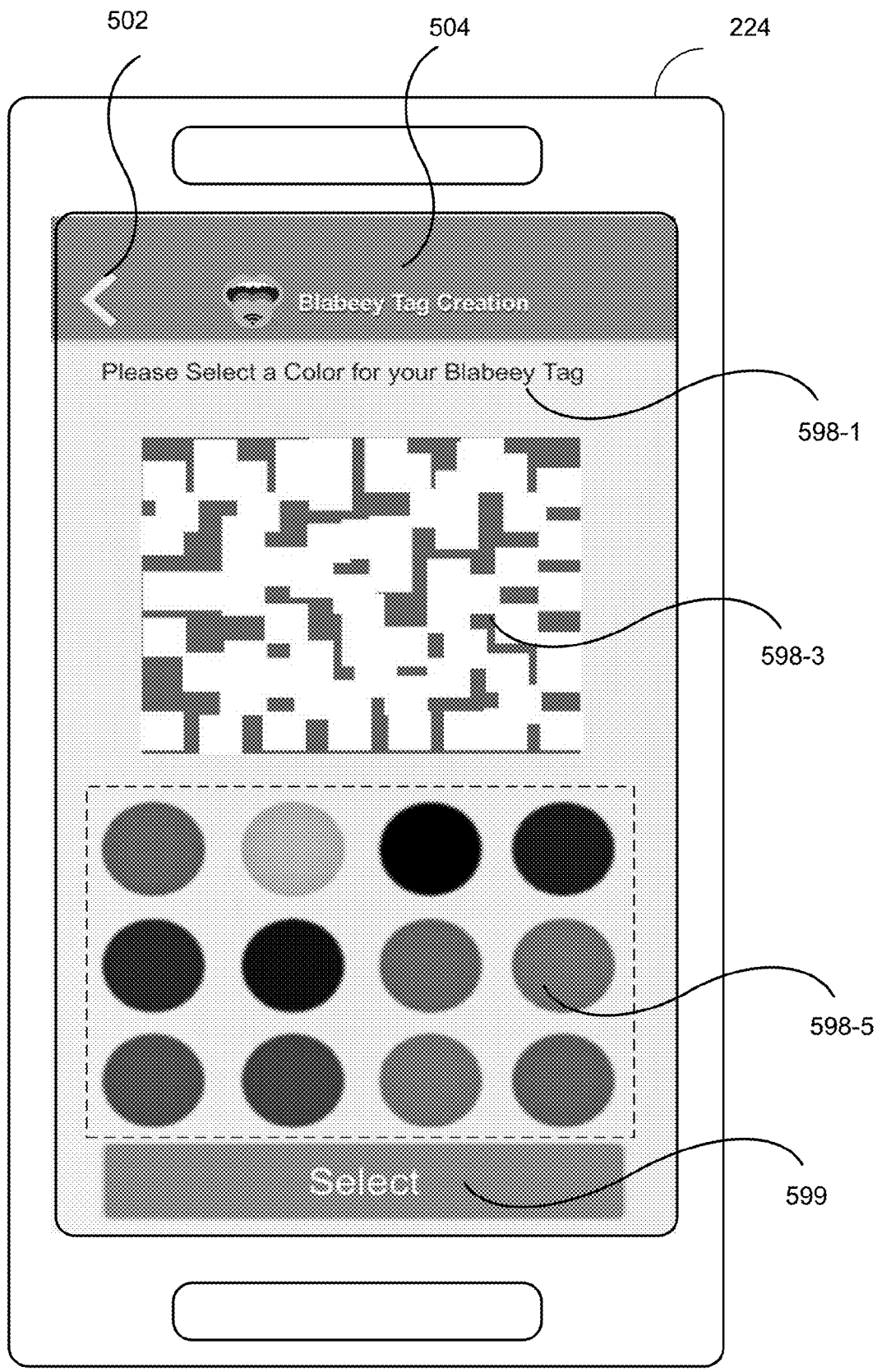
Figure 5Z:
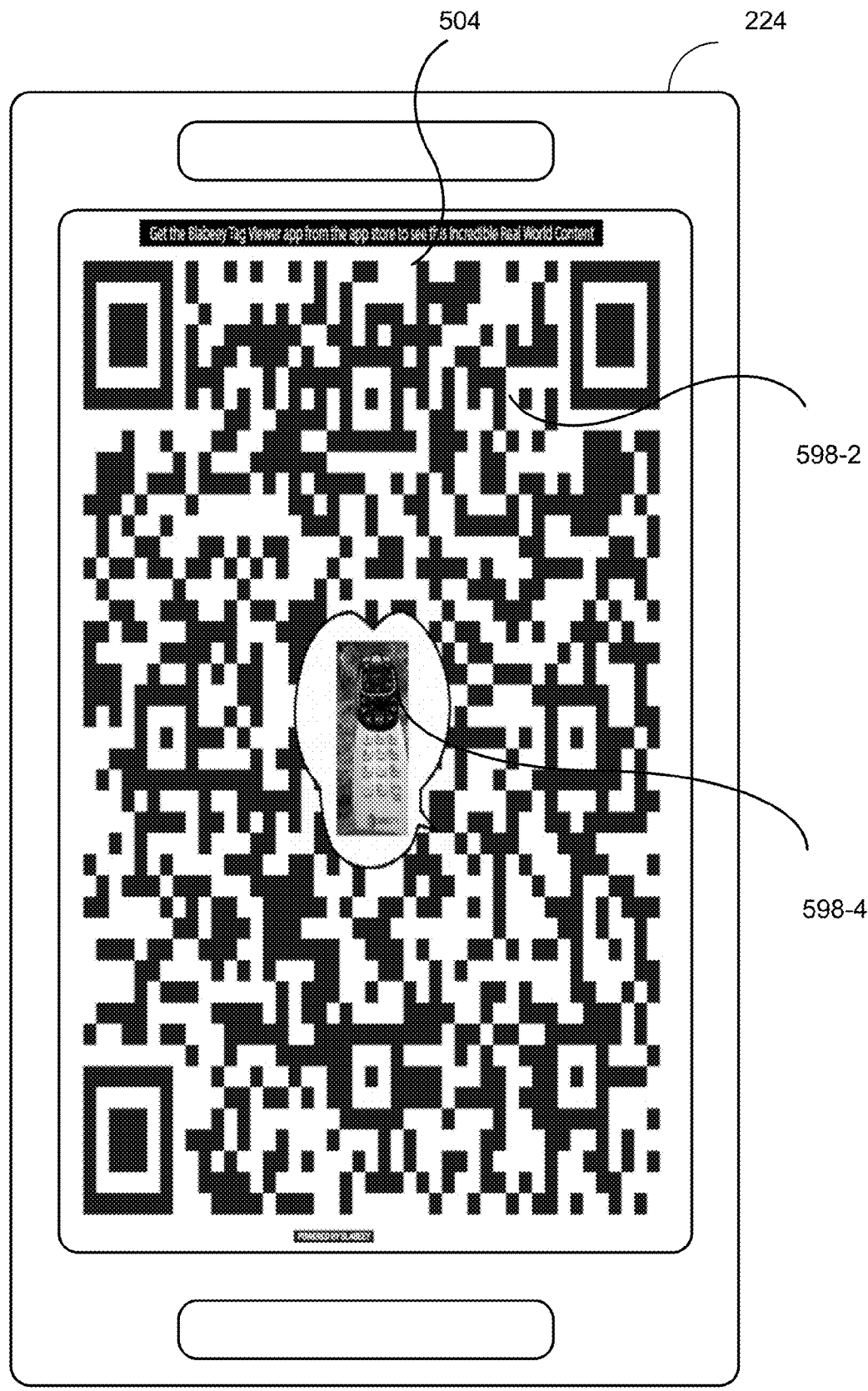

FIGS. 5A-5Z illustrate example user interfaces for avatar creation and placement, avatar-user interaction, avatar-avatar interaction, avatar-based tag creation, and interaction with avatar-based tags, in accordance with some implementations. As shown in FIG. 5A, some implementations provide a navigation button 502 (e.g., to reverse steps) in a user interface 504 that corresponding to a messaging application in a display 224. In the illustrated example, the displayed user interface 504 instructs the user to select a type of body 506, and offers the option 508 to use the user's face or to start with a stored set of avatars 510. A button/affordance 512 is provided to enable a user to proceed to the next step in avatar creation once the user has made the selections, according to some implementations. FIG. 5B continues the example. Display 224 shows an interface with options 514, 516, and 518 to select the type of body for the avatar. Once the user has made a selection, in FIG. 5C, an initial image 522 of the user is displayed with appropriate prompts 524 (e.g., to adjust lighting), and a camera icon 526, according to some implementations. In FIG. 5D, further controls 528 (for color or complexion adjustments), forward 532 and backward 530 navigation buttons to select between avatars, and an avatar 534-2 (of one or more avatar choices) are shown, according to some implementations. The user is also promoted 506 to select a hair style. FIG. 5E shows another avatar 534-4 based on the user selection in FIG. 5D. FIG. 5F shows yet another avatar 536 based on the selection in FIG. 5E. The interface shown in FIG. 5G allows the user to select emotions 506 (between choices 538-2, 538-4, 538-6, and 538-8), according to some implementations. Once the user selects an emotion (say 538-2), the interface updates to show the selection (as indicated by the green ring around emotion 538-2 and the avatar 540-2 in FIG. 5H), according to some implementations. Some implementations also show additional emotions as choices (e.g., emoticon 538-1). FIG. 5I shows a change in selection of emotion from 538-2 to 538-4 and an updated avatar 540-4 in response to the selection, according to some implementations. FIG. 5J, similarly, shows an updated avatar 540-6 based on user selection of emotion 538-6, according to some implementations.

As FIG. 5K illustrates, some implementations allow a user to select body type 506, with an initial avatar (e.g., a long shot of an avatar) 542. In some implementations, as shown in FIG. 5L, the application 504 shows one or more animation choices 546-2, . . . , 546-7 (e.g., rapping, talking, singing, a snake animation), and once the user has made a selection allows the user to see the avatar animation in real world 512 (e.g., a virtual world supported by the application). In some implementations, as shown in FIG. 5M, the user can select body tone 506, by sliding an affordance 548-4 (between options 548-2 and 548-6), and see the updated avatar 550. A shown in FIG. 5N, a user can additionally select a photo from a storage in the electronic device, choose an input type 552, take photo from camera 554, or cancel the process of creating an avatar by selecting an image 556, according to some implementations. In some implementations, as shown in FIG. 5O, a user can select a surface 560 after controlling the device to detect a specific surface 558. After creating and placing an avatar (e.g., 564, FIG. 5P) at location 574, a user can view avatar 568, edit the avatar 570, add audio via a microphone 572, associate an audio or music file 566 with the avatar, or reverse commands 562, according to some implementations.

Further, as shown in FIG. 5Q, the application 504 allows the user to leave the avatar (called a GeoBlab in the Figure) and alerts 576-2 the user that recipients of the avatar will get turn by turn directions (if needed) to the avatar once the user places or leaves the avatar at the selected location. The user can agree 576-4, in which case the avatar will be left at the chosen location, or decline 576-8 in which case the device or server will cancel the request. The user can also turn off this alert 576-6. Some implementations enable the user to either leave the avatar 578-2, or send the avatar 578-4 to another user, as shown in FIG. 5R. Some implementations provide an interface, as shown in FIG. 5S, to search 582 for avatars 580-2 in user selected locations, and returns or displays the search results in a window 580-4. The electronic device 190 sends the search locations to a messaging server 140 which returns any search results to the electronic device 190. The device 190 then displays an avatar 564 corresponding to the search results, as shown in FIG. 5T, according to some implementations. Again, some implementations provide a user with the option to view the location 528, view the avatar 568, edit the avatar 570, or play an audio file associated with the avatar 584.

In some implementations, application 504 allows a user to create a tag 590 (sometimes called a Blabeey tag), create an avatar 588, or create a video 586, as shown in FIG. 5U. FIG. 5V shows another interface with avatar 564, location 574, option 568 to view the avatar, edit the avatar 570, or record an audio 572, and finally click a create tag 592 to create the tag based on the selected features, according to some implementations. Some implementations allow a user to take a picture to super-impose on a tag 594-4, and provides options 594-2 and 594-6 to either agree or decline. A user can click a share button 596 to share the avatar, according to some implementations, as shown in FIG. 5W. Some implementations show the tag 598-2 (with a photo 598-4 selected by the user) to the user before he selects to share the tag 596, as shown in FIG. 5X. Some implementations allow a user select a color for the tag 598-1, gives a preview of a selected color 598-3, shows a palette of color choices 598-5, and allows the user to click a select button 599 to select a color, as shown in FIG. 5Y. FIG. 5Z shows an interface displaying the tag 598-2 created by another user. A second user viewing the tag can use a tag viewer application to view the content 598-4 related to the tag 598-2, according to some implementations.

FIGS. 6A-6E show a flow diagram illustrating a method for avatar creation and placement, in accordance with some implementations. User input processing is discussed above in reference to FIG. 2. In some implementations, one or more modules in memory 206 of an electronic device 190 interfaces with one or more modules in memory 306 of the messaging server 140 to receive and process avatar creation and placement, as discussed above in reference to FIG. 4A, in accordance with some implementations.

Figure 6A:
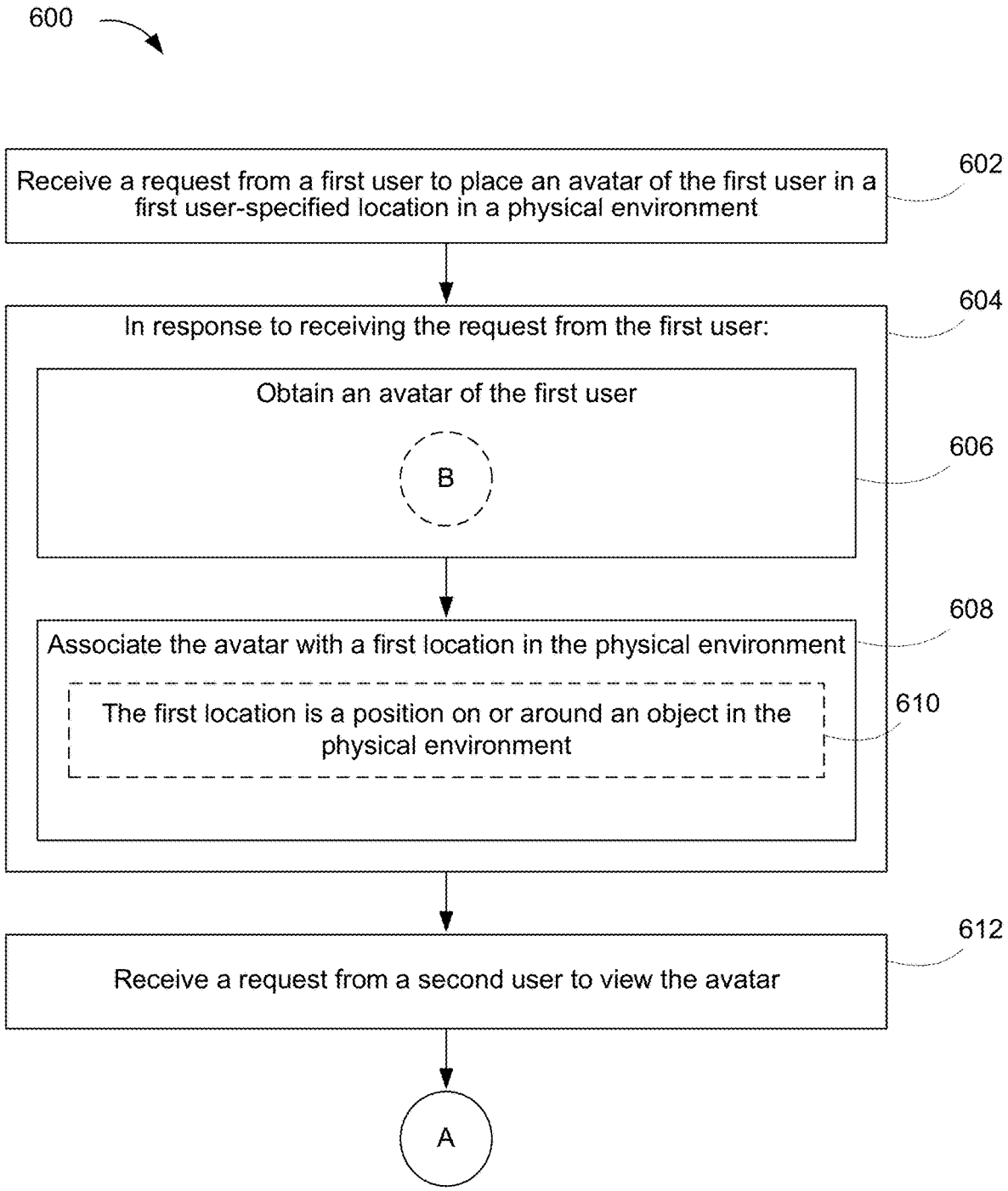
FIGS. 6A-6E show a flow diagram illustrating a method for avatar creation and placement, in accordance with some implementations.

In accordance with some implementations, a method 600 is provided for placing an avatar in a real world location. As shown in FIG. 6A, the method includes receiving (602) a request from a first user to place an avatar of the first user in a first user-specified location in a physical environment. In response (604) to receiving the request from the first user, the method includes obtaining (606) an avatar of the first user, and associating (608) the avatar with a first location in the physical environment (e.g., by using a geo-tagging technique). In some implementations, the first location is a position on or around an object in the physical environment (610). The method also includes receiving (612) a request from a second user to view the avatar.

Figure 6B:
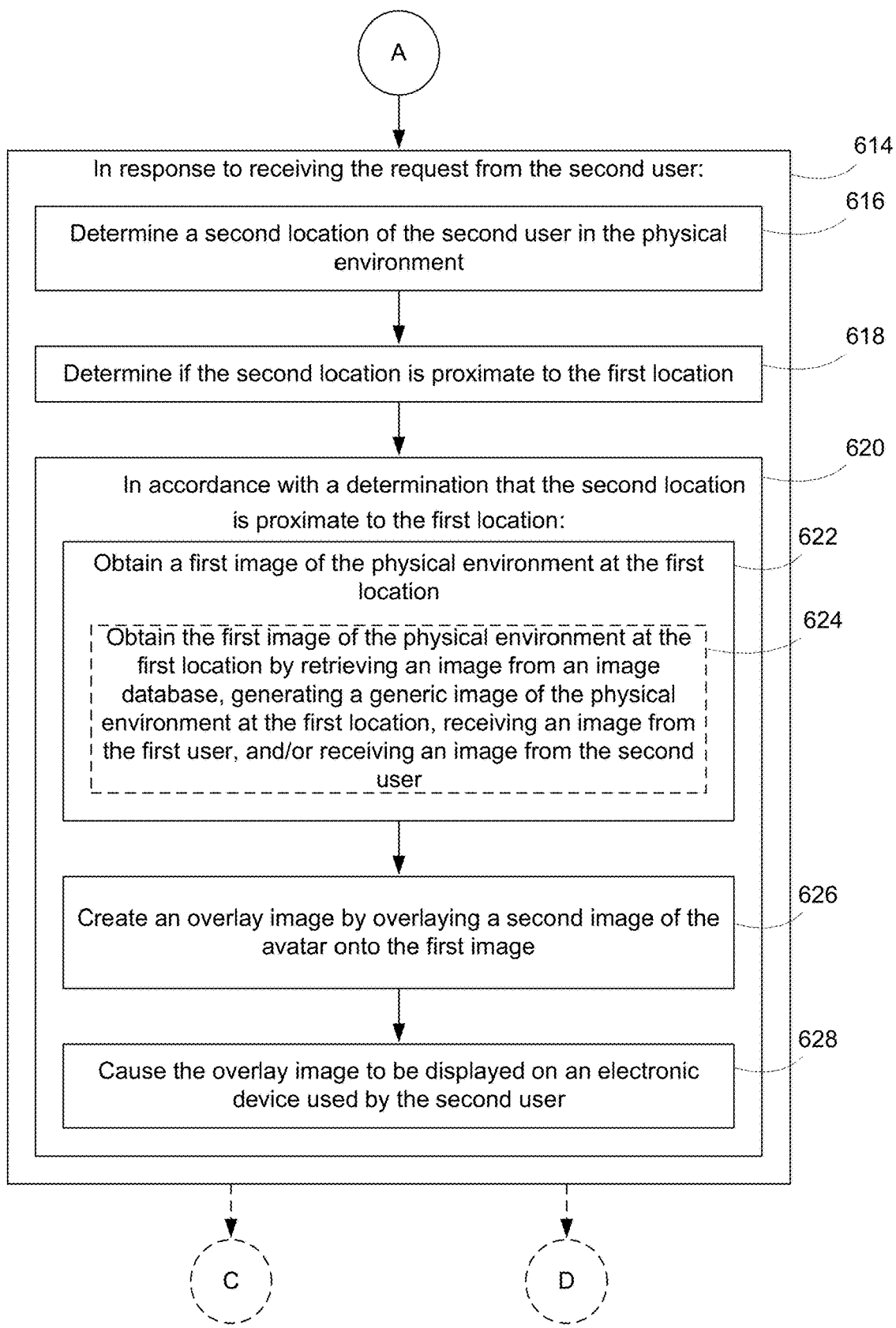
Figure 6C:
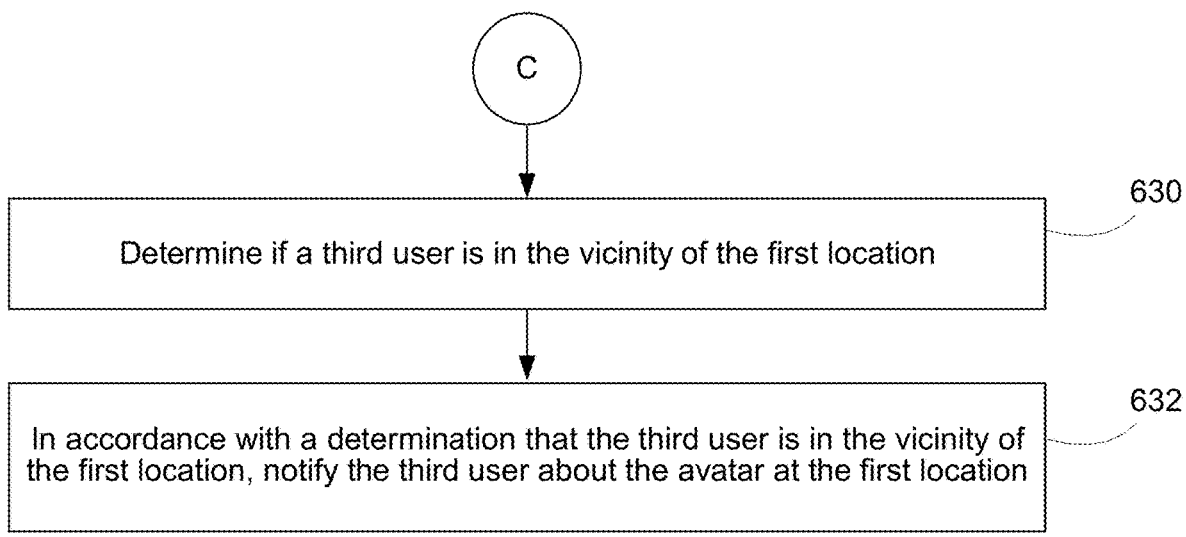

Referring next to FIG. 6B, in response (614) to receiving the request from the second user, the method includes determining (616) a second location of the second user in the physical environment, and determining (618) if the second location is proximate to the first location. In accordance with a determination (620) that the second location is proximate to the first location, the method includes obtaining (622) a first image of the physical environment at the first location, creating (626) an overlay image by overlaying a second image of the avatar onto the first image (e.g., in a manner consistent with an orientation of the second user), and causing (628) the overlay image to be displayed on an electronic device used by the second user. In some implementations, to obtain the first image of the physical environment at the first location, the method includes (624) retrieving an image from an image database, generating a generic image of the physical environment at the first location, receiving an image from the first user, and/or receiving an image from the second user Referring next to FIG. 6E, in some implementations, to obtain an avatar of the first user, the method includes capturing (640) an image of the first user using a camera application executed on a first electronic device, and generating (642) an avatar of the first user based on the image of the first user. In some implementations, generating the avatar of the first user includes applying (644) an algorithm that minimizes perception of an uncanny valley in the avatar. In some implementations, the avatar is (646) one of or more of an animated, emotional, and/or interactive three-dimensional (3D) representation of the first user. In some implementations, the method includes receiving (648) a user input from the first user corresponding to one or more animated, emotional, and/or interactive 3D representation of the first user, and generating (650) the avatar of the first user based on the user input. In some implementations, the method further includes uploading (652) the avatar to a computer distinct from the first electronic device.

Referring back to FIG. 6C, in some implementations, the method includes determining (630) if a third user is in the vicinity of the first location, and, in accordance with a determination that the third user is in the vicinity of the first location, notifying (632) the third user about the avatar at the first location.

Figure 6D:
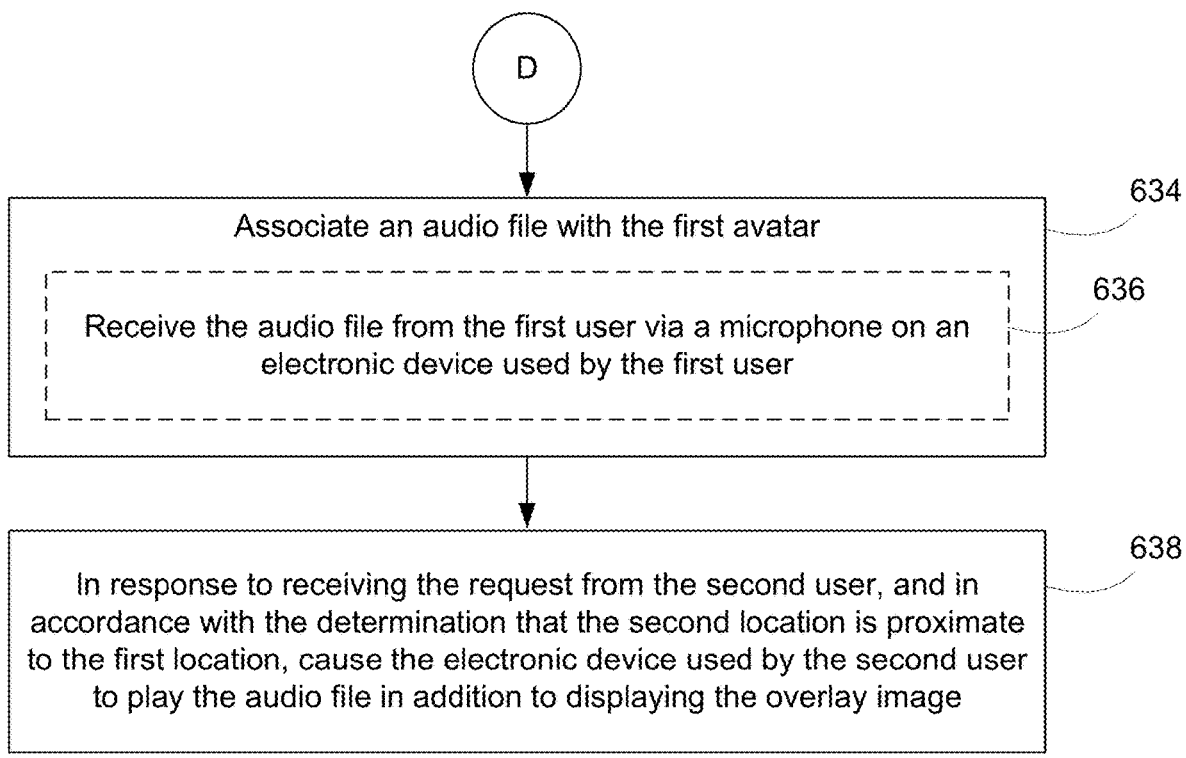
Figure 6E:
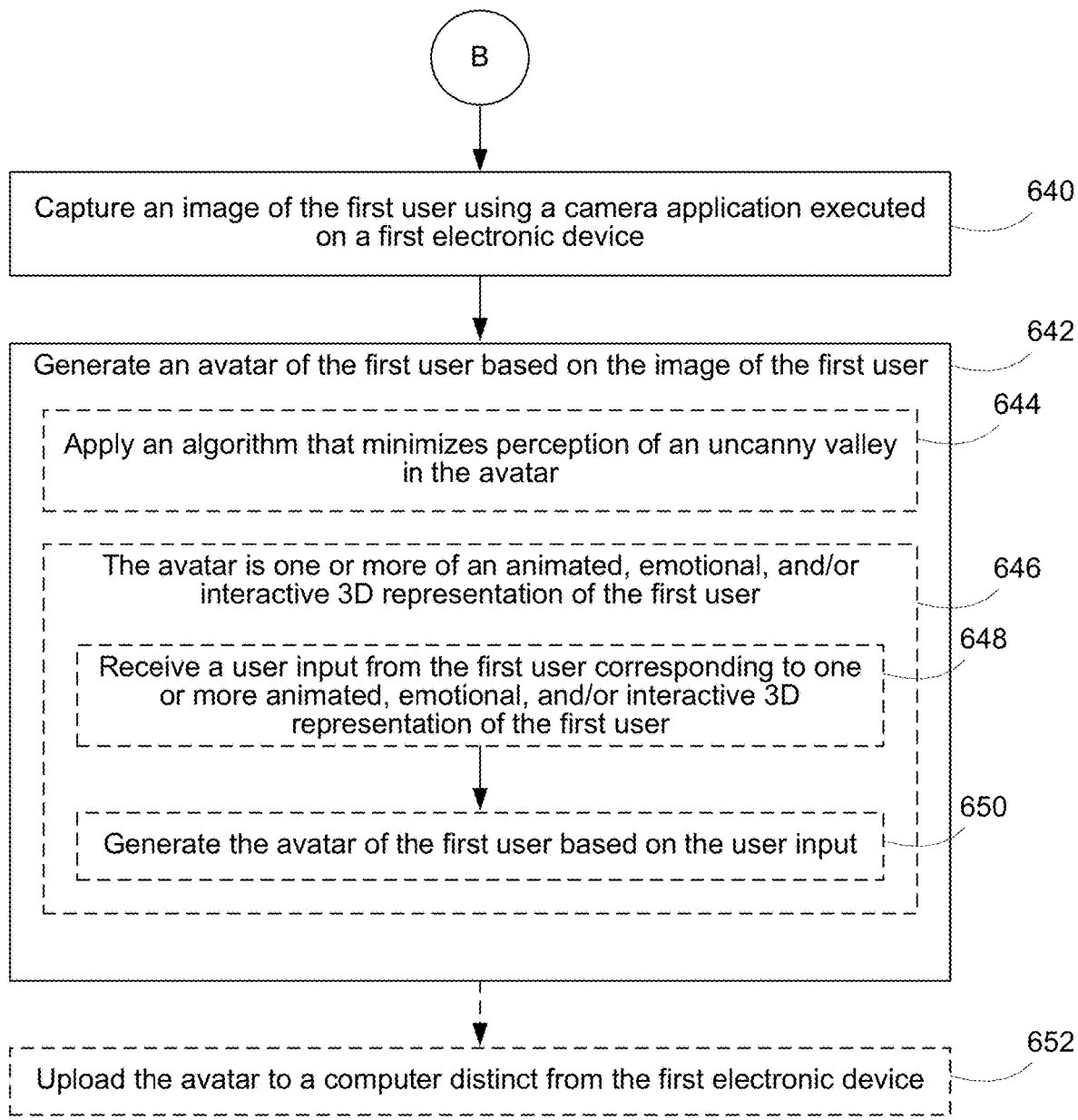

Referring next to FIG. 6D, in some implementations, the method includes associating (634) an audio file with the first avatar, and, in response to receiving the request from the second user, and in accordance with the determination that the second location is proximate to the first location, causing (638) the electronic device used by the second user to play the audio file in addition to displaying the overlay image. In some implementations, the method includes receiving the audio file from the first user via a microphone on an electronic device used by the first user.

Figure 7A:
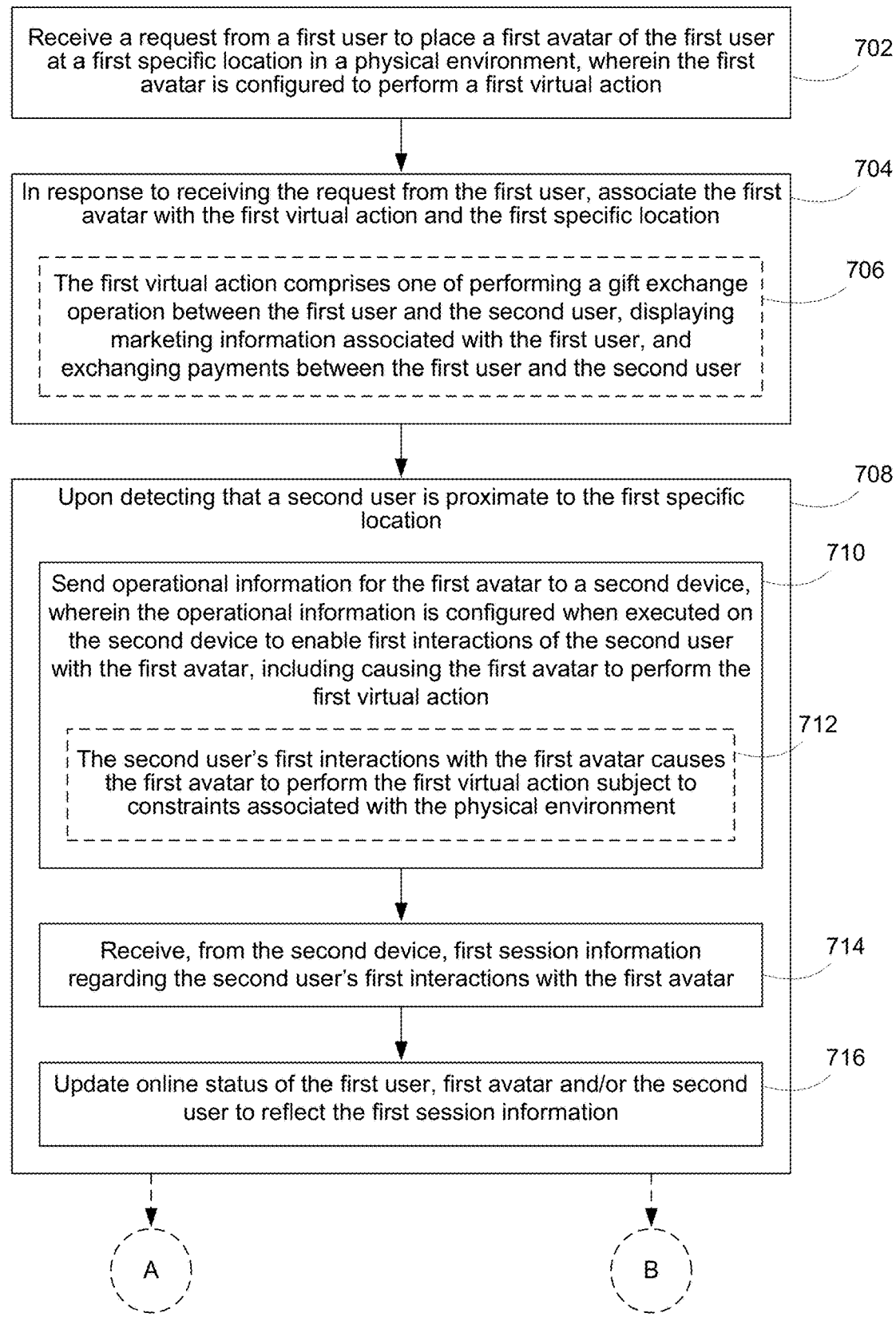
Figure 7B:
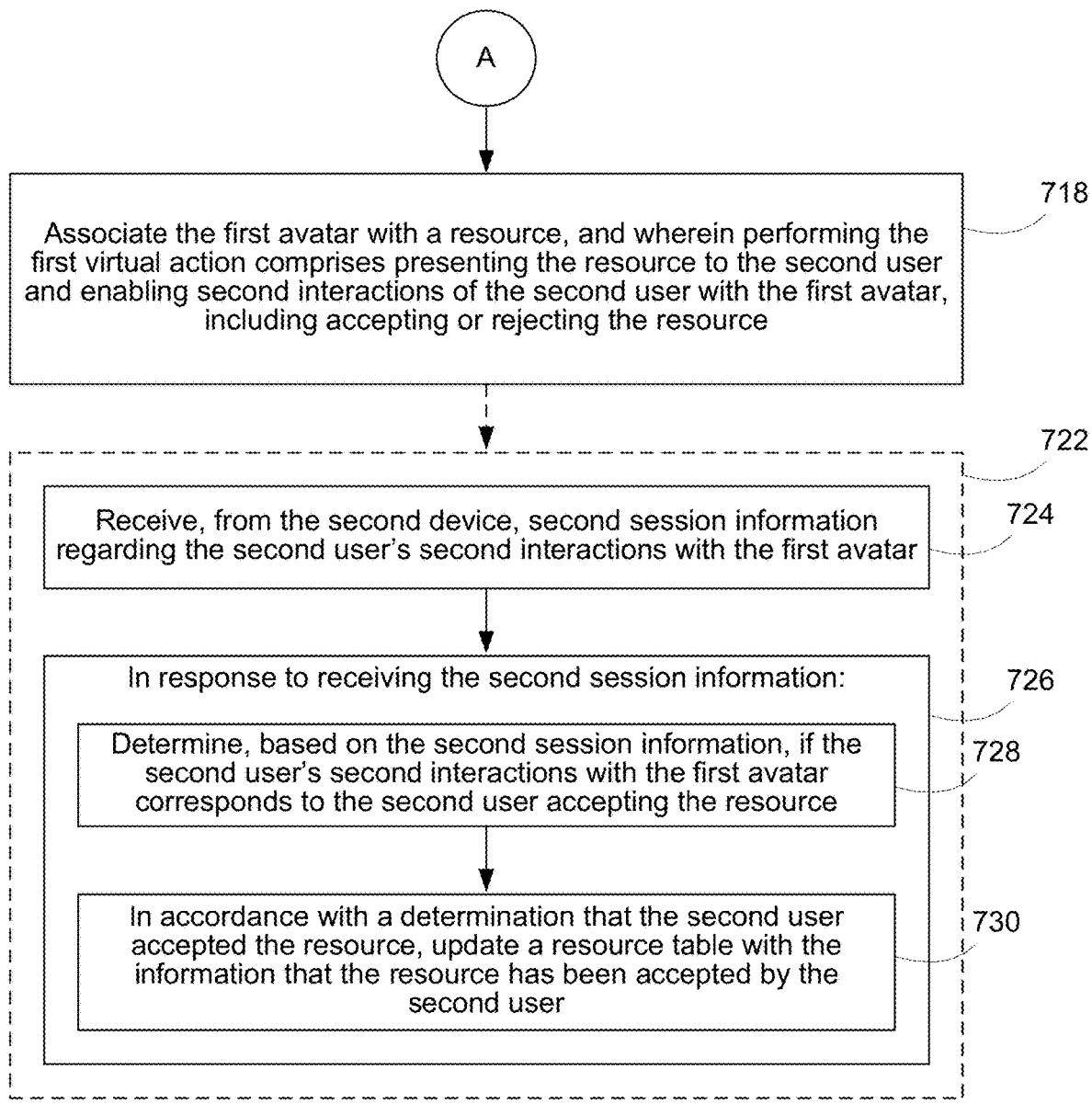

FIGS. 7A-7C show a flow diagram illustrating a method 700 for supporting avatar-user interactions and avatar-avatar interactions, in accordance with some implementations. User input processing is discussed above in reference to FIG. 2. In some implementations, one or more modules in memory 206 of an electronic device 190 interfaces with one or more modules in memory 306 of the messaging server 140 to process avatar-avatar interaction and avatar-user interaction, as discussed above in reference to FIGS. 4B-4D, in accordance with some implementations.

In accordance with some implementations, a non-transitory computer readable storage medium stores one or more programs. The one or more programs include instructions, which, when executed by a computing system cause the computing system to perform a method that supports user interaction with one or more avatars and/or interaction amongst the one or more avatars. The method includes receiving (702) a request from a first user to place a first avatar of the first user at a first specific location in a physical environment. The first avatar is configured to perform a first virtual action. In response to receiving the request from the first user, the method includes associating (704) (e.g., geo-tagging) the first avatar with the first virtual action and the first specific location. In some implementations, the first virtual action comprises (706) one of performing a gift exchange operation between the first user and the second user, displaying marketing information associated with the first user, and exchanging payments between the first user and the second user. In some implementations, the first virtual action includes a second user giving a thumbs up or a thumbs down to how the avatar looks.

In accordance with some implementations, upon detecting (708) that a second user is proximate to the first specific location, the method includes sending (710) operational information for the first avatar to a second device, wherein the operational information is configured when executed on the second device to enable first interactions of the second user with the first avatar, including causing the first avatar to perform the first virtual action. In some implementations, the second user's first interactions with the first avatar causes (712) the first avatar to perform the first virtual action subject to constraints associated with the physical environment. For example, the avatar is blocked by a wall and cannot walk through, but can lean on the wall. The method also includes receiving (714), from the second device, first session information regarding the second user's first interactions with the first avatar, and updating (716) online status of the first user, first avatar and/or the second user to reflect the first session information. In some implementations, the method includes updating (716) databases that store information corresponding to the first user, first avatar, and/or second user to reflect the first session information.

Referring next to FIG. 7B, in some implementations, the method includes associating (718) the first avatar with a resource (e.g., a gift), and performing the first virtual action comprises presenting the resource to the second user and enabling second interactions of the second user with the first avatar, including accepting or rejecting the resource. In some implementations, the method includes receiving (722), from the second device, second session information regarding the second user's second interactions with the first avatar. The method also includes, in response (726) to receiving the second session information, determining (728), based on the second session information, if the second user's second interactions with the first avatar corresponds to the second user accepting the resource, and, in accordance with a determination that the second user accepted the resource, updating (730) a resource table with the information that the resource has been accepted by the second user.

Referring next to FIG. 7C, in some implementations, the method includes receiving (732) a request from a third user to place a second avatar of the third user at a second specific location in a physical environment. The second avatar is configured to perform a second virtual action. In response (734) to receiving the request from the third user, the method includes associating the second avatar with the second virtual action and the second specific location. In some implementations, the first virtual action is (736) an action that relates to the second avatar and the second virtual action is an action that relates to the first avatar. Upon detecting (738) that the second specific location is proximate to the first specific location, the method includes sending (740) operational information for the first avatar and the second avatar to a third device used by the third user. The operational information is configured (742) when executed on the third device to cause the third device to display the first avatar and the second avatar, cause the first avatar to perform the first virtual action and the second avatar to perform the second virtual action, and display a result of the first virtual action and a result of the second virtual action, according to some implementations. In some implementations, the operational information causes the first avatar to perform the first virtual action and the second avatar to perform the second virtual action subject to constraints associated with the physical environment. In some implementations, the method includes determining whether the first virtual action and/or the second virtual action can be executed by the third device (e.g., by probing the third device). In accordance with a determination that the third device is unable to execute the first virtual action and/or the second virtual action, the method includes executing a part or whole of the first virtual action and/or the second virtual action on a fourth device distinct from the third device.

Figure 8A:
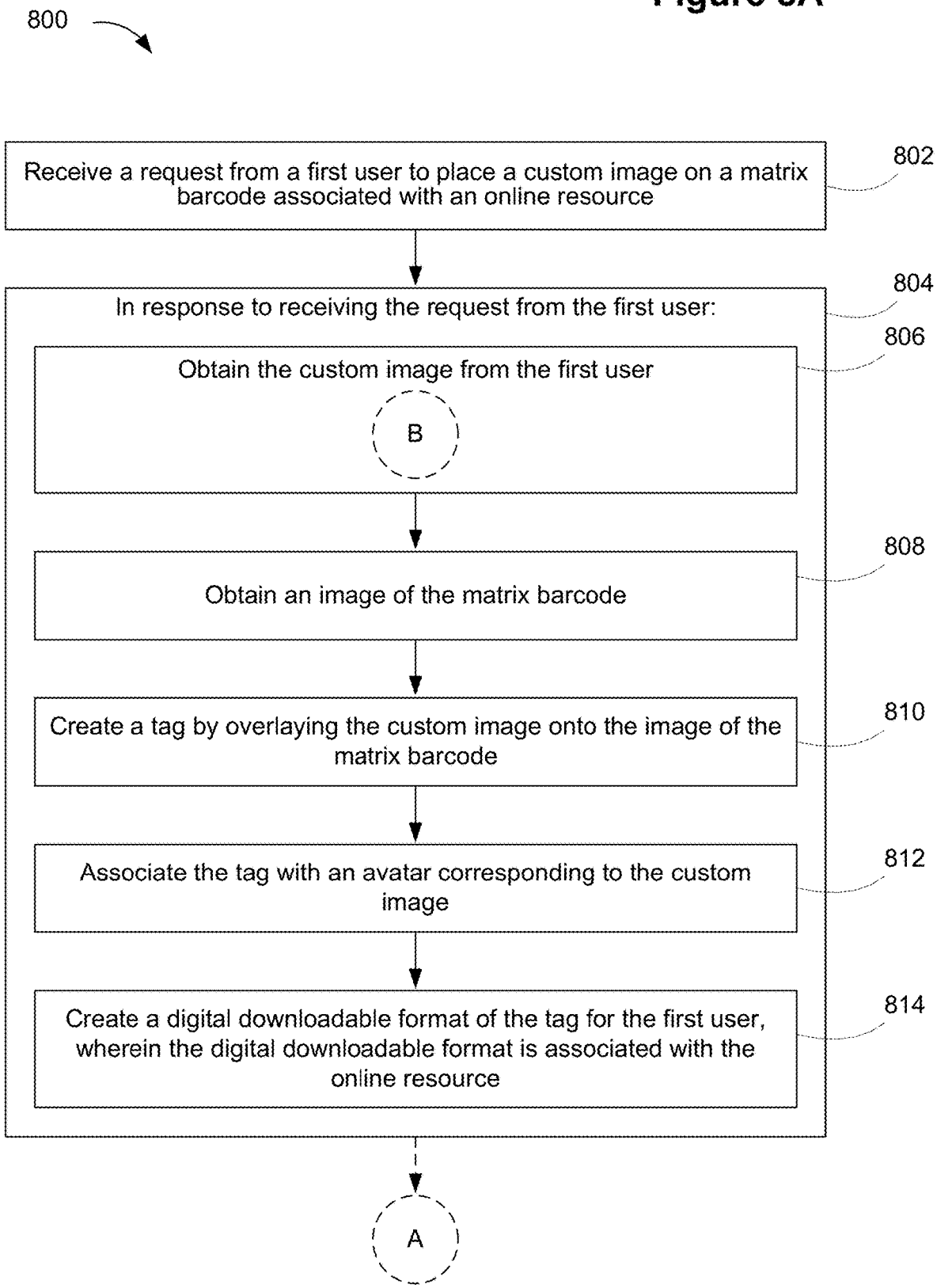
FIGS. 8A-8C show a flow diagram illustrating a method for avatar-based tag creation and user interaction with avatar-based tags, in accordance with some implementations.
Figure 8B:
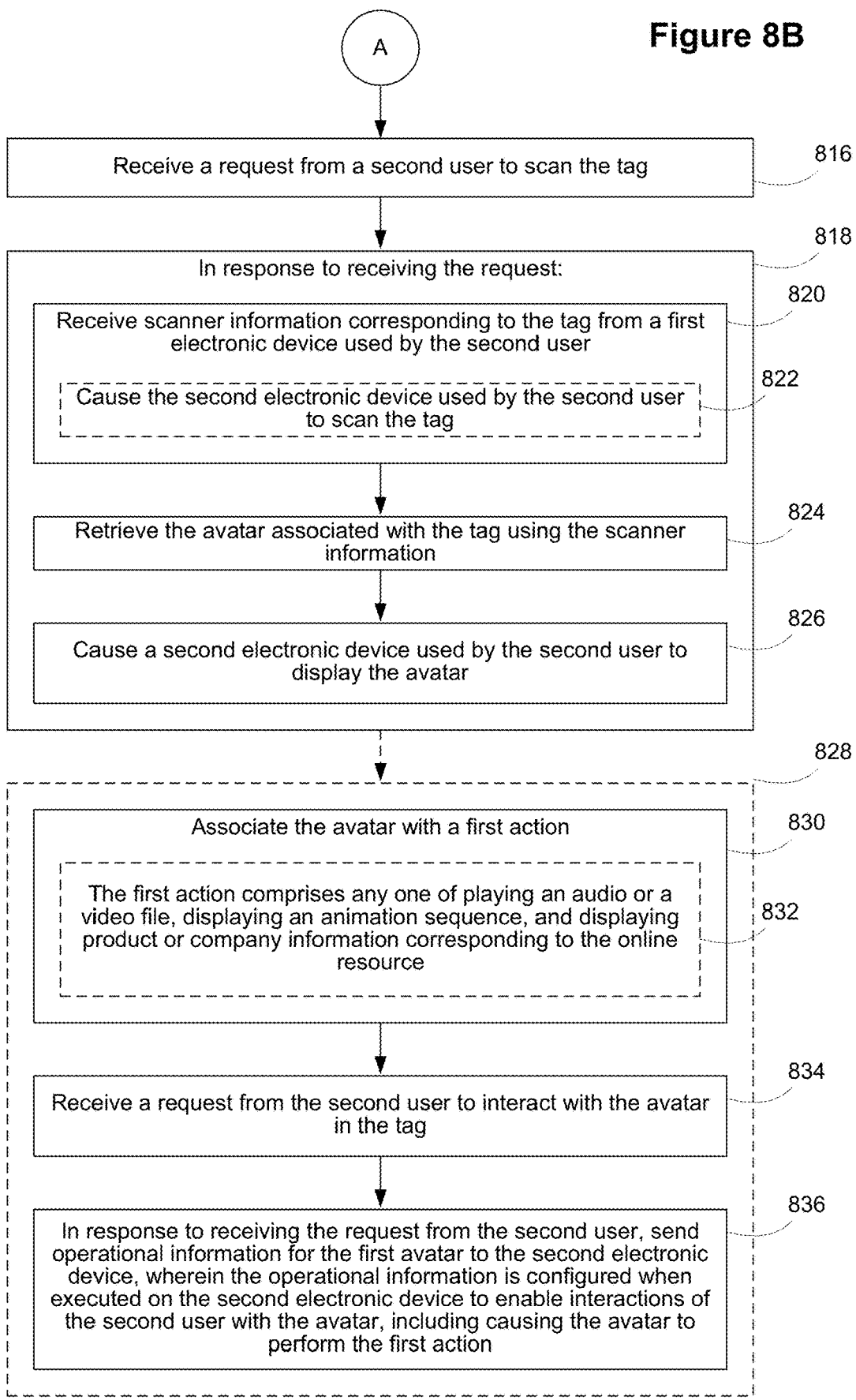
Figure 8C:
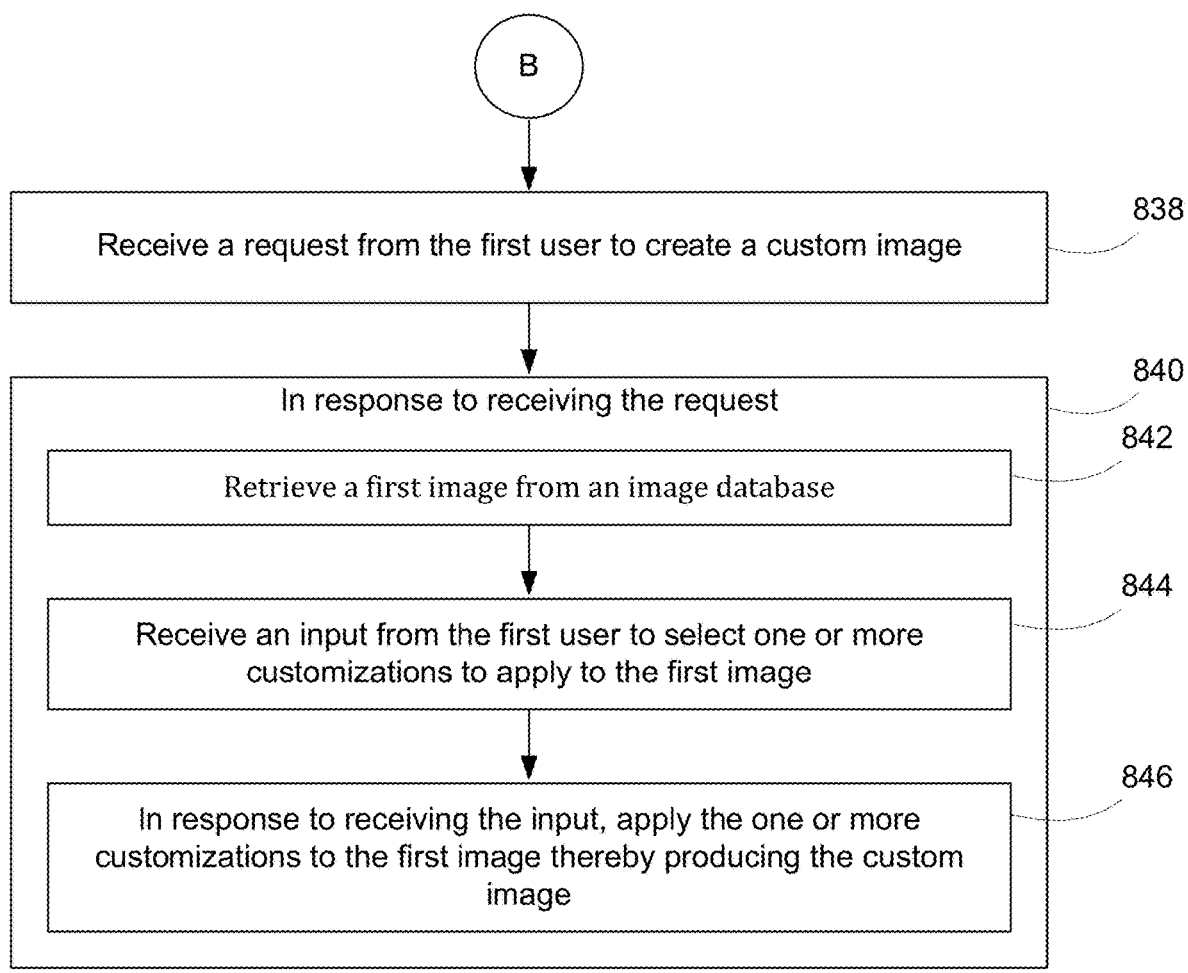

FIGS. 8A-8C show a flow diagram illustrating a method 800 for avatar-based tag creation and user interaction with avatar-based tags, in accordance with some implementations. User input processing is discussed above in reference to FIG. 2. In some implementations, one or more modules in memory 206 of an electronic device 190 interfaces with one or more modules in memory 306 of the messaging server 140 to process avatar-based tag creation and viewing, as discussed above in reference to FIG. 4E, in accordance with some implementations.

According to some implementations, an electronic device includes one or more processors, memory, a display, and one or more programs stored in the memory. The programs are configured for execution by the one or more processors and are configured to perform a method for generating and/or interacting with tags that embed avatars on matrix barcodes, according to some implementations. The method includes receiving (802) a request from a first user to place a custom image on a matrix barcode associated with an online resource. In response to receiving the request from the first user, the method includes obtaining (806) the custom image from the first user, obtaining (808) an image of the matrix barcode, creating (810) a tag by overlaying the custom image onto the image of the matrix barcode, associating (812) the tag with an avatar corresponding to the custom image, and creating (814) a digital downloadable format of the tag for the first user, wherein the digital downloadable format is associated with the online resource.

Referring next to FIG. 8B, in some implementations, the method includes receiving (816) a request from a second user to scan the tag. In response (818) to receiving the request, the method includes receiving (820) scanner information corresponding to the tag from a first electronic device used by the second user, retrieving (824) the avatar associated with the tag using the scanner information, and causing (826) a second electronic device used by the second user to display the avatar, according to some implementations. In some implementations, the first action comprises one of playing an audio or a video file, displaying an animation sequence, and displaying product or company information corresponding to the online resource. In some implementations, the method includes causing (822) the second electronic device used by the second user to scan the tag (e.g., using a barcode scanner). In some implementations, the method includes deciphering the avatar associated with the tag using a disambiguation algorithm (e.g., an algorithm that uses error codes to distinguish between barcodes).

In some implementations, as shown in block 828, the method further includes associating (830) the first avatar with a first action. In some implementations, the first action comprises (832) any one of playing an audio or a video file, displaying an animation sequence, and displaying product or company information corresponding to the online resource. In some implementations, the method includes receiving (834) a request from the second user to interact with the avatar in the tag, and in response to receiving the request from the second user, sending (836) operational information for the first avatar to the second electronic device, wherein the operational information is configured when executed on the second electronic device to enable interactions of the second user with the avatar, including causing the avatar to perform the first action Referring next to FIG. 8C, in some implementations, the method includes obtaining the custom image from the first user by receiving (838) a request from the first user to create a custom image, and, in response (840) to receiving the request, retrieving (842) a first image from an image database, receiving (844) an input from the first user to select one or more customizations to apply to the first image, and, in response to receiving the input, applying (846) the one or more customizations to the first image thereby producing the first image.

Figure 9A:
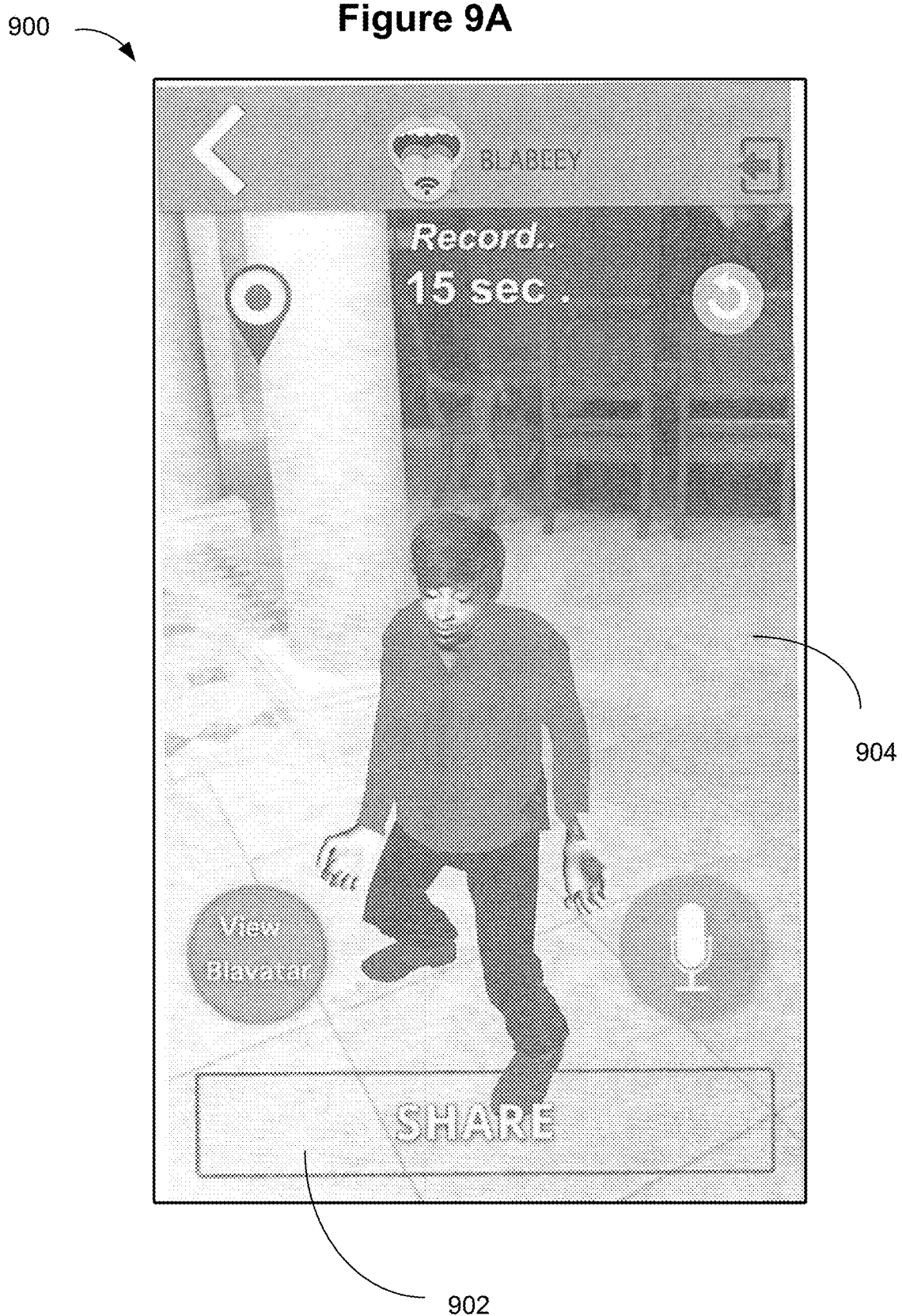
FIGS. 9A and 9B illustrate snapshots of an application for creating avatars and/or AR content, according to some implementations.
Figure 9B:
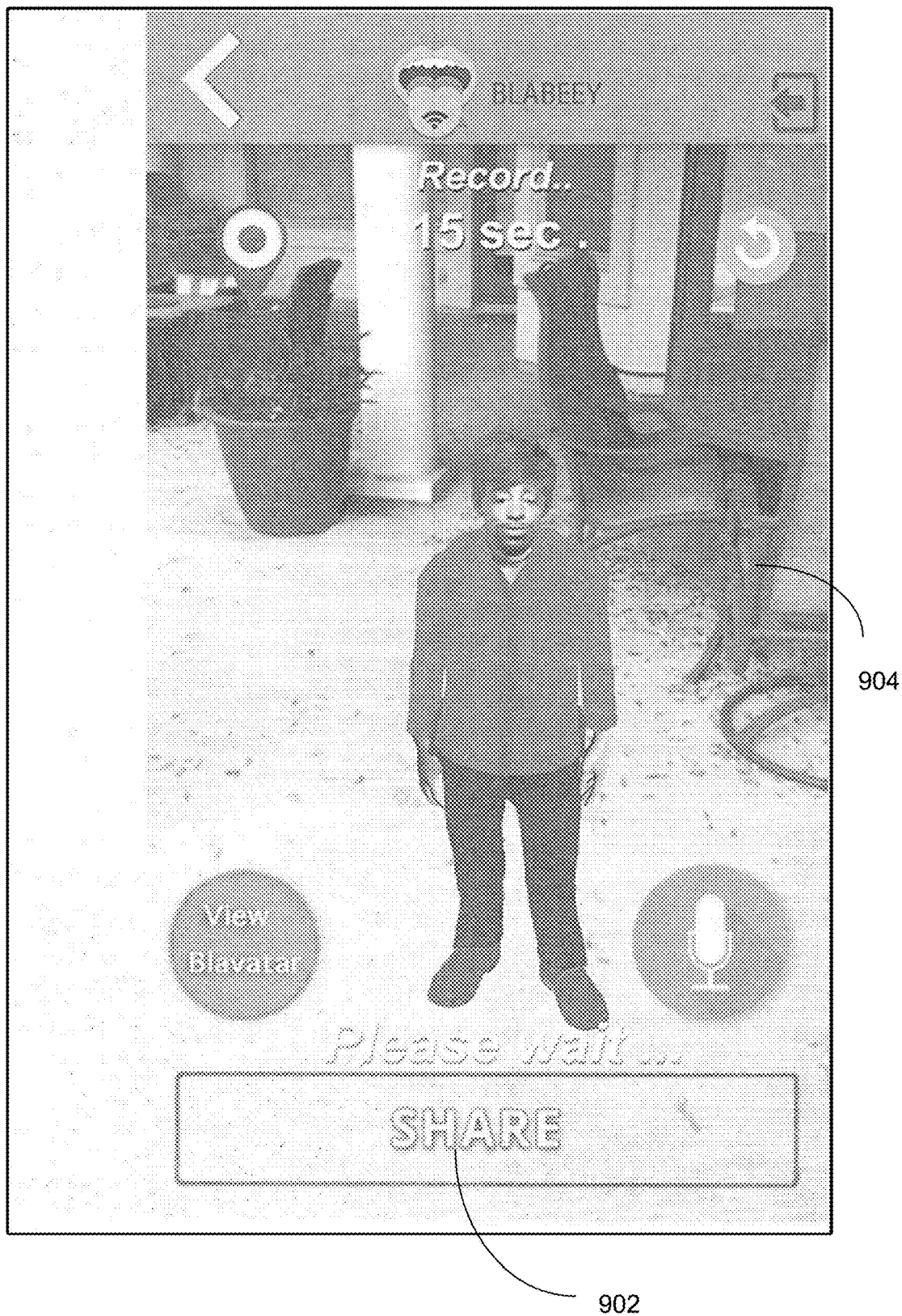

FIGS. 9A and 9B illustrate snapshots of an application for creating avatars and/or AR content, according to some implementations. As the Figures show, a user can record a video (e.g., using a camera application on their mobile device), associate the content with a location 904, and share the AR content with other users by selecting (e.g., clinking) a SHARE icon 902. Another user may then view or interact with the content when visiting the proximity of the location 904.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

The present application discloses subject-matter in correspondence with the following numbered clauses:

Clause A1. A method of placing an avatar in a real world location, the method comprising: receiving a request from a first user to place an avatar of the first user in a first user-specified location in a physical environment; in response to receiving the request from the first user: obtaining an avatar of the first user; and associating the avatar with a first location in the physical environment; receiving a request from a second user to view the avatar; and in response to receiving the request from the second user: determining a second location of the second user in the physical environment; determining if the second location is proximate to the first location; and in accordance with a determination that the second location is proximate to the first location: obtaining a first image of the physical environment at the first location; creating an overlay image by overlaying a second image of the avatar onto the first image; and causing the overlay image to be displayed on an electronic device used by the second user.

Clause A2. The method as recited in clause A1, further comprising: determining if a third user is in the vicinity of the first location; and in accordance with a determination that the third user is in the vicinity of the first location, notifying the third user about the avatar at the first location.

Clause A3. The method as recited in any of the preceding clauses, wherein obtaining the avatar of the first user comprises: capturing an image of the first user using a camera application executed on a first electronic device; and generating an avatar of the first user based on the image of the first user.

Clause A4. The method as recited in clause A3, further comprising uploading the avatar to a computer distinct from the first electronic device.

Clause A5. The method as recited in clause A3, wherein generating the avatar of the first user includes applying an algorithm that minimizes perception of an uncanny valley in the avatar.

Clause A6. The method as recited in any of the preceding clauses, wherein the avatar is one or more of an animated, emotional, and/or interactive 3D representation of the first user.

Clause A7. The method as recited in any of the preceding clauses, further comprising: receiving a user input from the first user corresponding to one or more animated, emotional, and/or interactive 3D representation of the first user; and generating the avatar of the first user based on the user input.

Clause A8. The method as recited in any of the preceding clauses, further comprising: associating an audio file with the first avatar; and in response to receiving the request from the second user, and in accordance with the determination that the second location is proximate to the first location, causing the electronic device used by the second user to play the audio file in addition to displaying the overlay image.

Clause A9. The method as recited in clause A8, further comprising receiving the audio file from the first user via a microphone on an electronic device used by the first user.

Clause A10. The method as recited in any of preceding the clauses, wherein the first location is a position on or around an object in the physical environment.

Clause A11. The method as recited in any of the preceding clauses, wherein obtaining the first image of the physical environment at the first location comprises retrieving an image from an image database, generating a generic image of the physical environment at the first location, receiving an image from the first user, and/or receiving an image from the second user.

Clause A12. A method of placing an avatar in a real world location, the method comprising: receiving a request from a first user to place an avatar of the first user in a first user-specified location in a physical environment; in response to receiving the request from the first user: capturing an image of the first user using a camera application; generating an avatar of the first user based on the image of the first user, wherein the avatar is one or more of an animated, emotional, and/or interactive 3D representation of the first user; and associating the avatar with a first location in the physical environment; receiving a request from a second user to view the avatar; and in response to receiving the request from the second user: determining a second location of the second user in the physical environment; determining if the second location is proximate to the first location; and in accordance with a determination that the second location is proximate to the first location: obtaining a first image of the physical environment at the first location by either retrieving an image from an image database, generating a generic image of the physical environment at the first location, receiving an image from the first user, or receiving an image from the second user; creating an overlay image by overlaying a second image of the avatar onto the first image; and displaying the overlay image to the second user.

Clause A13. A method comprising: receiving a request from a first user to place a first avatar of the first user at a first specific location in a physical environment, wherein the first avatar is configured to perform a first virtual action; in response to receiving the request from the first user, associating the first avatar with the first virtual action and the first specific location; and upon detecting that a second user is proximate to the first specific location: sending operational information for the first avatar to a second device, wherein the operational information is configured when executed on the second device to enable first interactions of the second user with the first avatar, including causing the first avatar to perform the first virtual action; receiving, from the second device, first session information regarding the second user's first interactions with the first avatar; and updating online status of the first user, first avatar and/or the second user to reflect the first session information.

Clause A14. The method as recited in clause A13, wherein the first virtual action comprises one of performing a gift exchange operation between the first user and the second user, displaying marketing information associated with the first user, and exchanging payments between the first user and the second user.

Clause A15. The method as recited in clause A13, wherein the second user's first interactions with the first avatar causes the first avatar to perform the first virtual action subject to constraints associated with the physical environment.

Clause A15. The method as recited in clause A13, wherein the one or more programs further comprise instructions for associating the first avatar with a resource, and wherein performing the first virtual action comprises presenting the resource to the second user and enabling second interactions of the second user with the first avatar, including accepting or rejecting the resource.

Clause A16. The method as recited in clause A15, wherein the one or more programs further comprise instructions for: receiving, from the second device, second session information regarding the second user's second interactions with the first avatar; in response to receiving the second session information: determining, based on the second session information, if the second user's second interactions with the first avatar corresponds to the second user accepting the resource; in accordance with a determination that the second user accepted the resource, updating a resource table with the information that the resource has been accepted by the second user.

Clause A17. The method as recited in any of preceding clauses A13-A16, wherein the one or more programs further comprise instructions for: receiving a request from a third user to place a second avatar of the third user at a second specific location in a physical environment, wherein the second avatar is configured to perform a second virtual action; in response to receiving the request from the third user, associating the second avatar with the second virtual action and the second specific location; and upon detecting that the second specific location is proximate to the first specific location: sending operational information for the first avatar and the second avatar to a third device used by the third user, wherein the operational information is configured when executed on the third device to cause the third device to display the first avatar and the second avatar, cause the first avatar to perform the first virtual action and the second avatar to perform the second virtual action, and display a result of the first virtual action and a result of the second virtual action.

Clause A18. The method as recited in clause A17, wherein the operational information causes the first avatar to perform the first virtual action and the second avatar to perform the second virtual action subject to constraints associated with the physical environment.

Clause A19. The method as recited in clause A17, wherein the first virtual action is an action that relates to the second avatar and the second virtual action is an action that relates to the first avatar.

Clause A20. A method comprising: receiving a request from a first user to place a custom image on a matrix barcode associated with an online resource; in response to receiving the request from the first user: obtaining the custom image from the first user; obtaining an image of the matrix barcode; creating a tag by overlaying the custom image onto the image of the matrix barcode; associating the tag with an avatar corresponding to the custom image; and creating a digital downloadable format of the tag for the first user, wherein the digital downloadable format is associated with the online resource.

Clause A21. The method as recited in clause A20, wherein the one or more programs further comprise instructions for: receiving a request from a second user to scan the tag; in response to receiving the request: receiving scanner information corresponding to the tag from a first electronic device used by the second user; retrieving the avatar associated with the tag using the scanner information; and causing a second electronic device used by the second user to display the avatar.

Clause A22. The method as recited in clause A21, wherein the one or more programs further comprise instructions for: associating the avatar with a first action; receiving a request from the second user to interact with the avatar in the tag; and in response to receiving the request from the second user, sending operational information for the first avatar to the first electronic device, wherein the operational information is configured when executed on the first electronic device to enable interactions of the second user with the avatar, including causing the avatar to perform the first action.

Clause A23. The method as recited in clause A22, wherein the first action comprises one of playing an audio or a video file, displaying an animation sequence, and displaying product or company information corresponding to the online resource.

Clause A24. The method as recited in clause A21, further comprising causing the second electronic device used by the second user to scan the tag.

Clause A25. The method as recited in clause A21, wherein obtaining the custom image from the first user comprises: receiving a request from the first user to create a custom image; in response to receiving the request: retrieving a first image from an image database; receiving an input from the first user to select one or more customizations to apply to the first image; and in response to receiving the input, applying the one or more customizations to the first image thereby producing the custom image.

Clause A26. An electronic device, comprising one or more processors, memory, and one or more programs, wherein the one or more programs are stored in the memory and configured to be executed by the one or more processors, the one or more programs including instructions for carrying out the method recited in any of clauses A1-A25.

Clause A27. A non-transitory computer readable storage medium, storing one or more programs configured for execution by one or more processors, the one or more programs including instructions, which when executed by the one or more processors, cause the one or more processors to perform the method recited in any of clauses A1-A25.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first device could be termed a second device, and, similarly, a second device could be termed a first device, without departing from the scope of the various described implementations. The first device and the second device are both types of devices, but they are not the same device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. An electronic device, comprising:
   one or more processors;
   memory; and
   one or more programs, wherein the one or more programs are stored in the memory and configured to be executed by the one or more processors, the one or more programs including instructions for:
   receiving a request from a first user to place a custom image on a matrix barcode associated with an online resource;
   in response to receiving the request from the first user:
   obtaining the custom image from the first user;
   obtaining an image of the matrix barcode;
   creating a tag by overlaying the custom image onto the image of the matrix barcode;
   associating the tag with an avatar corresponding to the custom image;
   creating a digital downloadable format of the tag for the first user, wherein the digital downloadable format is associated with the online resource;
   receiving a request from a second user to scan the tag;
   in response to receiving the request:
   receiving scanner information corresponding to the tag from a second electronic device used by the second user;
   retrieving the avatar associated with the tag using the scanner information; and
   causing the second electronic device used by the second user to display the avatar.

2. The electronic device of claim 1, wherein the one or more programs further comprise instructions for:
   associating the avatar with a first action;
   receiving a request from the second user to interact with the avatar in the tag; and
   in response to receiving the request from the second user, sending operational information for the first avatar to the second electronic device,
   wherein the operational information is configured when executed on the second electronic device to enable interactions of the second user with the avatar, including causing the avatar to perform the first action.

3. The electronic device of claim 2, wherein the first action comprises one of playing an audio or a video file, displaying an animation sequence, and displaying product or company information corresponding to the online resource.

4. The electronic device of claim 1, further comprising causing the second electronic device used by the second user to scan the tag.

5. The electronic device of claim 1, wherein obtaining the custom image from the first user comprises:
  receiving a request from the first user to create a custom image;
  in response to receiving the request:
    retrieving a first image from an image database;
    receiving an input from the first user to select one or more customizations to apply to the first image; and
    in response to receiving the input, applying the one or more customizations to the first image thereby producing the custom image.

* * * * *